(12) United States Patent
Davies et al.

(10) Patent No.: US 12,516,311 B2
(45) Date of Patent: Jan. 6, 2026

(54) IMMOBILIZED ENZYMES FOR BIOELECTROCATALYSIS

(71) Applicant: Anodyne Chemistries, Inc., Burnaby (CA)

(72) Inventors: Emmanuelle Davies, Burnaby (CA); Robert Greene, Burnaby (CA)

(73) Assignee: Anodyne Chemistries, Inc., Burnaby (CA)

( * ) Notice: Subject to any disclaimer, the term of this patent is extended or adjusted under 35 U.S.C. 154(b) by 0 days.

(21) Appl. No.: 18/731,571

(22) Filed: Jun. 3, 2024

(65) Prior Publication Data
US 2024/0401021 A1 Dec. 5, 2024

Related U.S. Application Data

(63) Continuation of application No. PCT/US2023/078253, filed on Oct. 30, 2023.

(60) Provisional application No. 63/420,521, filed on Oct. 28, 2022.

(51) Int. Cl.
| | |
|---|---|
| C12N 11/18 | (2006.01) |
| C12N 9/02 | (2006.01) |
| C12N 9/04 | (2006.01) |
| C12N 11/08 | (2020.01) |
| C12N 11/12 | (2006.01) |
| C12N 11/14 | (2006.01) |
| C12P 7/04 | (2006.01) |
| C12P 7/24 | (2006.01) |

(52) U.S. Cl.
CPC ............ *C12N 11/18* (2013.01); *C12N 9/0006* (2013.01); *C12N 9/0008* (2013.01); *C12N 11/08* (2013.01); *C12N 11/12* (2013.01); *C12N 11/14* (2013.01); *C12P 7/04* (2013.01); *C12P 7/24* (2013.01); *C12Y 101/01001* (2013.01); *C12Y 102/01046* (2013.01); *C12Y 102/02001* (2013.01)

(58) Field of Classification Search
CPC .... C12N 11/18; C12N 9/0006; C12N 9/0008; C12N 11/08; C12N 11/12; C12N 11/14; C12N 9/001; C12P 7/04; C12P 7/24; C12Y 101/01001; C12Y 102/01046; C12Y 102/02001; C12M 21/18
See application file for complete search history.

(56) References Cited

U.S. PATENT DOCUMENTS

| | | | |
|---|---|---|---|
| 7,928,076 B2 | 4/2011 | Cunningham | |
| 2006/0172282 A1* | 8/2006 | Naik | C12N 15/1037 435/6.12 |
| 2007/0141550 A1 | 6/2007 | Zare et al. | |
| 2018/0252713 A1 | 9/2018 | Weiss et al. | |

FOREIGN PATENT DOCUMENTS

| | | |
|---|---|---|
| WO | WO-03078451 A2 | 9/2003 |
| WO | WO-2023173098 A1 | 9/2023 |
| WO | WO-2024092281 A2 | 5/2024 |

OTHER PUBLICATIONS

Jonathan A. Davies (herein after JA Davies) (Characterization of the reversible formate dehydrogenase of Shewanella. Ph. D. Thesis, University of East Anglia, 2017 (p. 1-234). (Year: 2017).*

Chen et al. "Fundamentals Applications and Future Directions of Bioelectrocatalysis" Chemical Reviews (2020); 120(23):12903-12993.

Cui et al. "Rapid and Oriented Immobilization of Laccases on Electrodes via Methionine-Rich Peptide" ACS Catalysis (2021); 11(4):2445-2453.

Kamathewatta et al. "Self-Immobilized Putrescine Oxidase Biocatalyst System Engineered with a Metal Binding Peptide" Langmuir (2020); 36:11908-11917.

Kumada et al. "High biological activity of a recombinant protein immobilized onto polystyrene" Biotechnology Journal (2009); 4(8):1178-1189.

Sakai et al. "Direct electron transfer-type four-way bioelectrocatalysis of CO2/formate and NAD+/NADH redox couples by tungsten-containing formate dehydrogenase adsorbed on gold nanoparticle-embedded mesoporous carbon electrodes modified with 4-mercaptopyridine" Electrochemistry Communications (2017); 84:75-79.

Yucesoy et al. "Direct bioelectrocatalysis at the interfaces by genetically engineered dehydrogenase" Bioinspired Biomimetic and Nanobiomaterials (2014); 4(1):79-89.

International Search Report and Written Opinion for PCT Application No. PCT/US2023/078253 dated Apr. 4, 2024, 11 pages.

Xu et al. "Immobilization of Multi-Enzymes on Support Materials for Efficient Biocatalysis" Frontiers in Bioengineering and Biotechnology (2020); 8(660):1-17.

International Preliminary Report on Patentability for PCT Application No. PCT/US2023/078253 mailed May 8, 2025, 7 pages.

Banerjee et al., "Cu nanocrystal growth on peptide nanotubes bybiomineralization: Size control of Cu nanocrystalsby tuning peptide conformation," Proceedings of the National Academy of Sciences, Dec. 9, 2003, vol. 100, No. 25, p. 14678-82.

Bar-Or et al., "Characterization of the Co2+ and Ni2+ binding aminoacid residues of the Nterminus of human albumin: An insight into the mechanism of a new assay for myocardial ischemia," European Journal of Biochemistry, Jan. 2001, vol. 268, No. 1, pp. 42-48.

Braun et al., "Peptides as biosorbents-promising tools for resource recovery," Research in microbiology, Dec. 1, 2018, vol. 169, No. 10, pp. 649-658.

Brown, "Metal-recognition by repeating polypeptides," Nature Biotechnology, Mar. 1, 1997, vol. 15, No. 3, pp. 269-272.

(Continued)

*Primary Examiner* — Iqbal H Chowdhury
(74) *Attorney, Agent, or Firm* — COOLEY LLP

(57) ABSTRACT

The present invention relates to enzymatic reactor cells and related methods of use, e.g., to produce a compound or product by using an enzymatic reactor cell, wherein the enzymatic reactor cell includes a surface, a linker, and one or more enzymes.

32 Claims, 27 Drawing Sheets

Specification includes a Sequence Listing.

(56) References Cited

OTHER PUBLICATIONS

Cao et al., "Preparation and analysis of a new bioorganic metallic material," RSC Adv., Sep. 4, 2015, vol. 5, p. 78030-78037.

Chen, H. et al., "QCM-D Analysis of Binding Mechanism of Phage Particles Displaying a Constrained Heptapeptide with Specific Affinity to SiO2 and TiO2," Analytical Chemistry, Jun. 6, 2006, vol. 78, No. 14, pp. 4872-4879.

Coyle et al., "Direct and reversible immobilization and microcontact printing of functional proteins on glass using a genetically appended silica-binding tag," Chemical Communications, May 2016, vol. 52, No. 43, pp. 7001-7004.

Davis et al., "Evidence of extensive diversity in bacterial adherence mechanisms that exploit unanticipated stainless steel surface structural complexity for biofilm formation," Acta biomaterialia, Apr. 1, 2013, vol. 9, No. 4, pp. 6236-6244.

Eteshola et al., "Selection and characteristics of peptides that bind thermally grown silicon dioxide films," Biomolecular engineering, Dec. 1, 2005, vol. 22, Nos. 5-6, pp. 201-204.

Giltner et al., "The Pseudomonas aeruginosa type IV pilin receptor binding domain functions as an adhesin for both biotic and abiotic surfaces," Molecular Microbiology, Feb. 2006, vol. 59, No. 4, pp. 1083-1096.

Heinz et al., "Nature of Molecular Interactions of Peptides with Gold, Palladium, and Pd-Au Bimetal Surfaces in Aqueous Solution," Journal of the American Chemical Society, Jun. 24, 2009, vol. 131, No. 28, pp. 9704-9714.

Hnilova et al., "Effect of molecular conformations on the adsorption behavior of gold-binding peptides, " Langmuir, Nov. 4, 2008, vol. 24, No. 21, p. 12440-5.

Huang, Yu et al., "Programmable Assembly of Nanoarchitectures Using Genetically Engineered Viruses," Nano Letters, Jun. 3, 2005, vol. 5, No. 7, pp. 1429-1434.

International Search Report and Written Opinion for PCT/CA2025/050646 mailed Jul. 23, 2025, 12 pages.

Kilper et al., "Peptide controlled shaping of biomineralized tin (II) oxide into flower-like particles," Materials, Mar. 18, 2019, vol. 12, No. 6, p. 904, 11 p.

Kim et al., "Correlating single-molecule and ensemble-average measurements of peptide adsorption onto different inorganic materials," Physical Chemistry Chemical Physics, 2016, vol. 18, No. 21, p. 14454-9.

Kroger et al., "Polycationic Peptides from Diatom Biosilica That Direct Silica Nanosphere Formation," Science, Nov. 5, 1999, vol. 286, No. 5442, pp. 1129-1132.

Kulp, John L., et al., "Characterization of the integral sequence repeat from the E. coli gold binding protein," Journal of Materials Chemistry, 2004, vol. 14, pp. 2325-2332.

Kulp, John L., et al., "Molecular characterization of a prokaryotic polypeptide sequence that catalyzes Au crystal formation," Journal of Materials Chemistry, 2004, vol. 14, No. 14, pp. 2325-2332.

Liebana et al., "Bioconjugation and stabilisation of biomolecules in biosensors," Essays in Biochemistry, Jun. 30, 2016, vol. 60, No. 1, pp. 59-68.

Lim et al., "A Review on the Design and Performance of Enzyme-Aided Catalysis of Carbon Dioxide in Membrane, Electrochemical Cell and Photocatalytic Reactors," Y Membranes, Dec. 27, 2021, vol. 12, No. 28, pp. 1-28.

Lower et al., "In vitro evolution of a peptide with a hematite binding motif that may constitute a natural metal-oxide binding archetype," Environmental science & technology, May 15, 2008, vol. 42, No. 10, pp. 3821-3827.

Mejare et al., "Metal-binding proteins and peptides in bioremediation and phytoremediation of heavy metals," TRENDS in Biotechnology, Feb. 1, 2001, vol. 19, No. 2, pp. 67-73.

Mikami et al., "A novel biofunctionalizing peptide for metallic alloy," Biotechnology Letters, May 2020, vol. 42, No. 5, pp. 747-756.

Muruve et al., "Peptide-based biocoatings for corrosion protection of stainless steel biomaterial in a chloride solution," Materials Science and Engineering, Nov. 1, 2016, vol. 68, pp. 695-700.

Okamoto et al., "Silicon-dioxide-specific peptides for biological nanofabrication: Selecting aptamers for target-specific ferritin supramolecule delivery," IEEE Nanotechnology Magazine, Oct. 8, 2019, vol. 13, No. 6, pp. 43-48.

Pham et al., "Synthesis and Characterization of Novel Core-Shell Zno@SiO2 Nanoparticles and Application in Antibiotic and Bacteria Removal," ACS Omega, Nov. 9, 2022, vol. 7, No. 46, p. 42073-82.

Rothenstein et al., "Isolation of ZnO-binding 12-mer peptides and determination of their binding epitopes by NMR spectroscopy," Journal of the American Chemical Society, Aug. 1, 2012, vol. 134, No. 30, p. 12547-56.

Rouf, S. et al., "Immobilization of formate dehydrogenase in metal organic frameworks for enhanced conversion of carbon dioxide to formate," Chemosphere, Nov. 10, 2020, vol. 267, p. 128921, 19 pages.

Rubsam et al., "Directed evolution of polypropylene and polystyrene binding peptides," Biotechnology and bioengineering, Feburary 2018, vol. 115, No. 2, pp. 321-330.

Sanghvi et al., "Biomaterials functionalization using a novel peptide that selectively binds to a conducting polymer," Nature materials, Jun. 1, 2005, vol. 4, No. 6, pp. 496-502.

Sarikaya et al., "Molecular biomimetics: nanotechnology through biology," Nature materials, Sep. 1, 2003, vol. 2, No. 9, pp. 577-585.

Slocik et al., "Biomimetic mineralization of noble metal nanoclusters," Biomacromolecules, Sep. 8, 2003, vol. 4, No. 5, pp. 1135-1141.

Tanaka et al., "Array-based functional peptide screening and characterization of gold nanoparticle synthesis," Acta biomaterialia, Feb. 1, 2017, vol. 49, pp. 495-506.

Tulek, A. et al., "Sustainable production of formic acid from CO2 by a novel immobilized mutant formate dehydrogenase," Separation and Purification Technology, Mar. 2023, vol. 309, No. 11, p. 123090, 14 pages.

Vreuls et al., "Inorganic-binding peptides as tools for surface quality control," Journal of Inorganic Biochemistry, Oct. 1, 2010, vol. 104, No. 10, pp. 1013-1021.

Zuo et al., "Aluminum- and mild steel-binding peptides from phage display," Applied Genetics and Molecular Biotechnology, Feb. 10, 2005, vol. 68, pp. 505-509.

* cited by examiner

Fig 1: producing hydrogen from protons and electrons
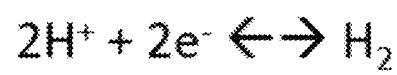
Enzyme: Hydrogenase
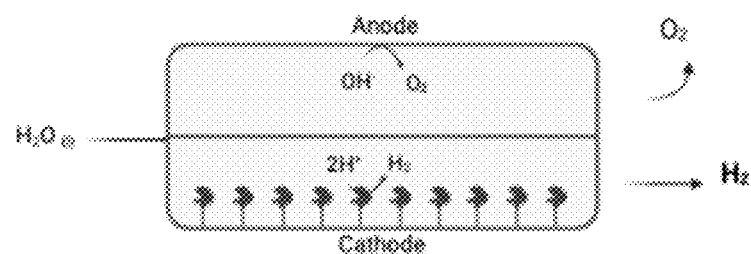

IMMOBILIZED ENZYMES FOR BIOELECTROCATALYSIS

CROSS-REFERENCE TO RELATED APPLICATIONS

This application is a continuation of International Patent Application No. PCT/US2023/078253, filed Oct. 30, 2023, which claims priority and benefit of U.S. Provisional Application No. 63/420,521, filed Oct. 28, 2022, the disclosure of each of which is herein incorporated by reference in their entirety for all purposes

REFERENCE TO AN ELECTRONIC SEQUENCE LISTING

The contents of the electronic sequence listing (ANOD_001_01US_SeqList_ST26.xml; Size: 80,296 bytes; and Date of Creation: May 31, 2024) are herein incorporated by reference in its entirety.

BACKGROUND OF THE INVENTION

Enzymatic bioelectrocatalysis is increasing in popularity for the production of various commodities such as methanol, or other forms of energy. Oxidoreductase enzymes are key enzymes in microorganisms and have been utilized or mutated to catalyze crucial redox reactions. Cofactors and/or electrodes can also be utilized to enable electron transfer from the active site of the enzyme and the substrate. The overall reaction pathway to create a single commodity, however, can be complex, as it can require multiple enzymes, cofactors and substrates, adding to the complexity of enzymatic bioelectrocatalysis to create a final product or commodity. Use of multiple such oxidoreductase enzymes and cofactors or other enzymes has been used for example in bioreactors or fermenters with limited success, as it has been difficult to manipulate and control the intended reactions. The use of such enzymatic bioelectrocatalysis to provide efficient and intended production of commodities needs improvement. Such ideas include the use of a reactor cell or multiple reactor cells wherein an enzyme is immobilized to a surface, and the reaction is supported by an electrode for controlled and efficient electron transfer in the reaction. Improvements in this field are still needed.

SUMMARY OF THE INVENTION

The disclosure provides enzymatic reactor cells and related methods of use, e.g., to produce a compound or product by using an enzymatic reactor cell. In a specific embodiment, the enzymatic reactor cell, includes a surface, a surface linker or electrode surface linker, and one or more enzymes, wherein the surface is directly linked to the surface or electrode surface linker and the surface linker is further directly linked to the enzyme. In a specific embodiment, the surface linker may be an electrode surface linker. In a specific embodiment, the enzymatic reactor cell has the following formula I:

surface-electrode surface linker-enzyme (Formula I).

In a specific embodiment, Formula I can specifically be as follows:

[surface-electrode surface linker-enzyme]$_{n(1-10)}$ (Formula I);

wherein when n is 2-10, each of the 2-10 [surface-electrode surface linker-enzyme] comprises a different surface, electrode surface linker and/or enzyme from the other [surface-electrode surface linker-enzyme].

In a specific embodiment, Formula II can specifically be as follows:

[surface-surface linker-enzyme]$_{n(1-10)}$ (Formula II);

wherein when n is 2-10, each of the 2-10 [surface-surface linker-enzyme] comprises a different surface, surface linker and/or enzyme from the other [surface-electrode surface linker-enzyme].

In another specific embodiment, n of Formula I or Formula II is 1, 2, 3, 4, 5, 6, 7, 8, 9, or 10. In another specific embodiment, n of Formula I or Formula II is 11, 12, 13, 14, 15, 16, 17, 18, 19, or 20.

In another embodiment, the surface is conductive, thereby allowing electron transfer between the enzyme and the surface or electrode surface. In another specific embodiment the electron transfer travels from the enzyme to the surface. In another specific embodiment the electron transfer travels from the surface to the enzyme. In a specific embodiment, the enzyme is an oxidoreductase enzyme.

In a specific embodiment, the electrode surface linker is conductive, thereby allowing electron transfer from the oxidoreductase enzyme and the electrode surface and comprises a surface binding moiety (SBM), and in a specific embodiment the electrode surface linker providing election transfer comprises a peptide, protein, a chemical polymer, or polynucleotide described herein.

In one embodiment, the oxidoreductase enzyme comprises hydrogenase, formate dehydrogenase, formaldehyde dehydrogenase, and/or alcohol dehydrogenase. In a specific embodiment, the oxidoreductase enzyme comprises hydrogenase. Thus in one embodiment, the enzymatic reactor cell produces hydrogen. In another embodiment, the enzymatic reactor cell produces methanol.

In another embodiment, the enzymatic reactor cell comprises methane monooxygenase. In a specific embodiment, the enzymatic reactor cell produces methanol, preferably from methane.

In another embodiment, the enzymatic reactor cell produces $H_2$, wherein the enzyme hydrogenase is linked to the electrode surface catalyzing protons and elections to hydrogen as follows: ($2H^+ + 2e^-$ to $H_2$).

In a specific embodiment, the enzyme may be formate dehydrogenase, formaldehyde dehydrogenase, and/or alcohol dehydrogenase. In a specific embodiment, the enzymatic reactor cell comprises methane monooxygenase. In one embodiment, the methane monooxygenase is immobilized or not immobilized on the electrode surface. In a specific embodiment, the present invention includes methods of using enzymatic reactor cells described herein for producing hydrogen or methanol.

In a specific embodiment, the oxidoreductase enzyme comprises formate dehydrogenase. Thus in one embodiment, the enzymatic reactor cell produces formate or formi acid. In another specific embodiment, the reactor cell comprises formate dehydrogenase and formaldehyde dehydrogenase. Thus in one embodiment the enzymatic reactor cell produces formaldehyde. In a specific embodiment, the enzymatic reactor cell comprises formate dehydrogenase, formaldehyde dehydrogenase, and alcohol dehydrogenase. Thus in one embodiment, the enzymatic reactor cell produces methanol. In another embodiment, the enzymatic reactor cell produces hydrogen.

In a specific embodiment, the enzyme reactor cell comprises formate dehydrogenase. In another embodiment, the enzymatic reactor cell produces formate or formic acid. In a specific embodiment, the enzyme reactor cell comprises formate dehydrogenase and formaldehyde dehydrogenase. In a specific embodiment, the enzymatic reactor cell produces formate, formic acid, and/or formaldehyde. In a specific embodiment, the enzyme reactor cell comprises the enzyme comprises formate dehydrogenase, formaldehyde dehydrogenase, and/or alcohol dehydrogenase. In another specific embodiment, the enzymatic reactor cell produces formate, formic acid, formaldehyde, and/or methanol.

BRIEF DESCRIPTION OF THE DRAWINGS

Further features and advantages of the present disclosure will become apparent from the following detailed description, taken in combination with the appended drawings, in which:

FIG. 1 illustrate a reactor cell for producing hydrogen from a feed of water and the use of the enzyme hydrogenase.

DETAILED DESCRIPTION

Figure 2:
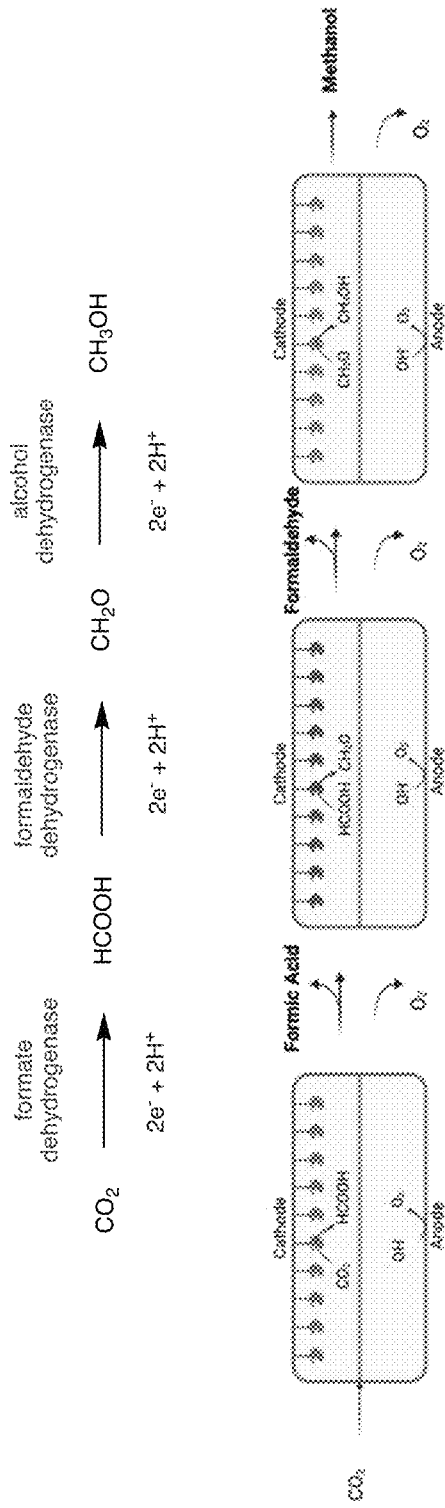
FIG. 2 illustrates a series of reactor cells for producing methanol from carbon dioxide.

The following terms are defined below.
Definitions

For convenience, certain terms employed in the specification, examples and claims are collected here. Unless defined otherwise, all technical and scientific terms used in this disclosure have the same meanings as commonly understood by one of ordinary skill in the art to which this disclosure belongs.

Throughout the present specification, the terms "about" and/or "approximately" may be used in conjunction with numerical values and/or ranges. The term "about" is understood to mean those values near to a recited value. Furthermore, the phrases "less than about [a value]" or "greater than about [a value]" should be understood in view of the definition of the term "about" provided herein. The terms "about" and "approximately" may be used interchangeably.

Throughout the present specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may be an endpoint for the range encompassed thereby (e.g., the range 50-80 includes the ranges with endpoints such as 55-80, 50-75, etc.).

The term "a" or "an" refers to one or more of that entity; the terms "a" (or "an"), "one or more" and "at least one" are used interchangeably herein. In addition, reference to "an inhibitor" by the indefinite article "a" or "an" does not exclude the possibility that more than one of the inhibitors is present, unless the context clearly requires that there is one and only one of the inhibitors. As used herein, the verb "comprise" as is used in this description and in the claims and its conjugations are used in its non-limiting sense to mean that items following the word are included, but items not specifically mentioned are not excluded. The present invention may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

The term "a linker sequence" is intended to mean a sequence that bridges the surface binding entity, e.g., inorganic surface entity, with the organic binding entity, such as an enzyme. As used herein, a linker sequence may comprise one or both of an active linker and/or a passive linker. Thus, a linker sequence may, for example, comprise the amino acid sequence of protein G from *Streptococcus* or streptavidin from Streptomyce, or may be a simple amino acid sequence or simply a single bond, such as a covalent bond. The linkage can also be a non-covalent bond to the enzyme and/or surface. Organic binding entities include both synthetic carbon-based compounds as well as biologically-derived molecules. The linker may include additional functional features, such as being a cofactor for an enzyme, including the enzyme directly linked to the linker.

The term "surface binding motif" or SBM is intended to mean a molecule with specific and selective affinity for an organic or inorganic substance, such as, e.g., gold, silica, silver, plastic, polystyrene, cellulose (e.g., nitrocellulose), and graphene. An SBM may be a peptide or polypeptide.

The term "covalent fusion" is intended to mean the joining of two or more genes that encode separate peptides or proteins. The terms "polypeptide", "protein" and "peptide" are used interchangeably and mean a polymer of amino acids not limited to any particular length. The term does not exclude modifications such as myristylation, sulfation, glycosylation, phosphorylation and addition or deletion of signal sequences. The terms "polypeptide" or "protein" or "peptide" means one or more chains of amino acids, wherein each chain comprises amino acids covalently linked by peptide bonds, and wherein said polypeptide or protein or peptide can comprise a plurality of chains non-covalently and/or covalently linked together by peptide bonds, that is, proteins produced by naturally-occurring and specifically non-recombinant cells, or genetically-engineered or recombinant cells, and comprise molecules having the amino acid sequence of the native protein, or molecules having deletions from, additions to, and/or substitutions of one or more amino acids of the native sequence. Thus, a "polypeptide" or a "protein" can comprise one (termed "a monomer") or a plurality (termed "a multimer") of amino acid chains.

The term "fusion protein" means a protein comprised of at least two different amino acid sequences and generated within an organism such as *E. coli*. An inorganic surface binding peptide expressed with an A or G protein or a linker is an example of a fusion protein.

As used herein, the "alignment" of two or more protein/amino acid sequences may be performed using the alignment program ClustalW2, available online. The following default parameters may be used for Pairwise alignment: Protein Weight Matrix=Gonnet; Gap Open=10; Gap Extension=0.1. Any sequence alignment or determination of sequence identity of proteins or amino acid sequences is determined by the software or alignment program described herein.

The term "specifically binds" means that a molecule reacts or associates more frequently, more rapidly, with greater duration and/or with greater affinity with a particular target molecule, e.g., a pathogen or surface, than it does with alternative molecules, e.g., pathogens or other surfaces. It is also understood by reading this definition that, a molecule that specifically or preferentially binds to a first target may or may not specifically or preferentially bind to a second target. As such, "specific binding" does not necessarily require (although it can include) exclusive binding.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

In this disclosure, the word "comprising" is used in a non-limiting sense to mean that items following the word are included, but items not specifically mentioned are not excluded.

It will be understood that in embodiments which comprise or may comprise a specified feature or variable or parameter, alternative embodiments may consist, or consist essentially of such features, or variables or parameters. A reference to an element by the indefinite article "a" does not exclude the possibility that more than one of the elements is present, unless the context clearly requires that there be one and only one of the elements.

In this disclosure the recitation of numerical ranges by endpoints includes all numbers subsumed within that range including all whole numbers, all integers and all fractional intermediates (e.g., 1 to 5 includes 1, 1.5, 2, 2.75, 3, 3.80, 4, and 5, etc). In this disclosure the singular forms an "an", and "the" include plural referents unless the content clearly dictates otherwise. Thus, for example, reference to a composition containing "a compound" includes a mixture of two or more compounds.

In this disclosure term "or" is generally employed in its sense including "and/or" unless the content clearly dictates otherwise.

Embodiments of the Invention

Bioelectrocatalysis includes reactions that are catalyzed by biologically active materials in association with electrically conductive electrodes.

Enzymatic bioelectrocatalysis is a specific form of bioelectrocatalysis or electrocatalysis using an enzyme for catalyzing a certain reaction. In one general example of enzymatic bioelectrocatalysis, enzymes are associated with an electrode, including electrode linkers, in a manner that allows electron transfer between the electrode and the enzymes. Such electron transfer allows the continued function of each enzyme over many catalyzed reactions, including a series of reactions to obtain a final desired compound or product. The term "enzyme(s)" as used herein thus relates to a biologically based catalytic mechanism, and can comprise a protein that is both wild-type or mutated for any intended reaction by the user. Nonlimiting examples of other biologically based catalytic materials can include eukaryotic cells, prokaryotic cells, cellular organelles, nucleic acid enzymes (i.e. deoxyribozymes), and the like.

Oxidoreductase enzymes are specific biocatalytic proteins that can catalyse the coupled oxidation and reduction with a substrate and/or cofactor, thus, transferring an electron(s) with the involvement of an electrode linker and/or a cofactor of the enzyme. In a specific embodiment of the present invention, the oxidoreductase enzyme can be used in a single reaction or in a series of reactions with other enzymes or oxidoreductase enzymes wherein the oxidoreductase enzyme is directly linked to, for example, an electrode linker. In a specific embodiment, the enzymes or oxidoreductase enzyme is directly linked to an electrode linker in a device, biodevice or reactor cell that contains the reaction or series of reactions if more than one enzyme or oxidoreductase enzyme is used.

In a specific embodiment, the device, biodevice or reactor cell allows for the immobilization of an enzyme or oxidoreductase enzymes. In a specific embodiment, the device, biodevice or reactor cell comprises a surface that allows for immobilization of the enzyme or oxidoreductase enzyme. In another embodiment, the surface may be an electrode surface. This surface may include conductive or non-conductive material.

In another embodiment, the surface may have active groups or other means for attaching an enzyme or other means for linking the enzyme to the surface. In one specific embodiment, a linker is specifically used to link to the surface (such as covalently or non-covalently) and then link to the enzyme. In a specific embodiment, the linker is covalently linked to the surface and covalently linked to the enzyme. In another embodiment, the linker can be covalently linked to just the surface or the enzyme. In another embodiment, the linker may be linked to the surface or enzyme by non-covalent means.

In one embodiment, the enzymatic process can utilise more than one device, biodevice or reactor cell. In one embodiment, several enzymatic reactor cells are constructed in series or in parallel. In another embodiment, several enzymatic reactor cells are constructed in series or in parallel each allowing for a different catalytic reaction. In a specific embodiment, a series of reactor cells can be used to comprise more than one enzymatic reactions to carry out a an enzymatic pathway, i.e., there is more than one enzyme used to achieve an end product or compound from a starting compound.

In one embodiment, the enzymatic bioelectrocatalysis is performed in an enzymatic reactor cell.

In a specific embodiment, the enzymatic reactor cell, comprises a surface, such as an electrode surface, or non-electrode surface; a linker or electrode surface linker; and one or more enzymes, wherein the electrode surface is linked to the electrode surface linker and the surface linker is further directly linked to the oxidoreductase enzyme.

In a specific embodiment, the enzymatic reactor cell has the following formula I:

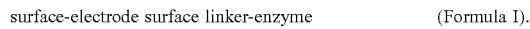

surface-electrode surface linker-enzyme    (Formula I).

In a specific embodiment, Formula I can specifically be as follows:

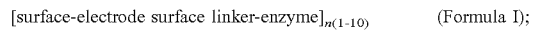

[surface-electrode surface linker-enzyme]$_{n(1-10)}$    (Formula I);

wherein when n is 2-10, each of the 2-10 [surface-electrode surface linker-enzyme] comprises a different surface, electrode surface linker and/or enzyme from the other [surface-electrode surface linker-enzyme].

In a specific embodiment, Formula II can specifically be as follows:

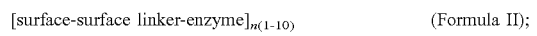

[surface-surface linker-enzyme]$_{n(1-10)}$    (Formula II);

wherein when n is 2-10, each of the 2-10 [surface-surface linker-enzyme] comprises a different surface, surface linker and/or enzyme from the other [surface-electrode surface linker-enzyme].

In another specific embodiment, n of Formula I or Formula II is 1, 2, 3, 4, 5, 6, 7, 8, 9, or 10. In another specific embodiment, n of Formula I or Formula II is 11, 12, 13, 14, 15, 16, 17, 18, 19, or 20.

In other words, the reactor cells or a single reactor cell, can include multiple types of surfaces or multiple types of linker or electrode surface linkers, and/or multiple enzymes. For example, a single reactor cell can include more than one enzyme from an enzymatic pathway, wherein the different enzymes in the pathway are attached to the surface of the reactor cell. In a specific embodiment, the different enzymes use different electrode surface linkers and/or different surfaces for a specific linkage for each enzyme, thereby partitioning or separating the different enzymes in the reactor cell as needed.

In a specific embodiment, the surface is attached or immobilized to the reactor cell. In another embodiment, the surface is free from and not attached to the reactor cell, such as being free flowing in a solution in the reactor cell.

In a specific embodiment, the surface or electrode surface is planar, non-planar, spherical, in the shape of nanoparticles, an aerogel, fibrous, or incorporated in a polymer. In a specific embodiment, the surface is a planar surface.

In a specific embodiment, the reactor call may have at least one surface or electrode surface that is an organic or inorganic surface and can be selected based on various advantages, including conductivity, ease of use in a reactor cell, and ease of attachment of the enzyme with the use of a linker. In a specific embodiment, the reactor cell may include more than one type of surface such as a planar surface at one end of the reactor cell and the use of beads in a different portion of the reactor cell.

In another embodiment, the surface or electrode surface of the reactor cell comprises a metal, a polymer, or a biological surface. In a specific embodiment, the reactor surface can include at least one surface or electrode surface that comprises one or more selected from the group consisting of graphite, platinum, zinc oxide, cellulose, polystyrene, gold, gold alloy, gold palladium alloy, and metal oxides such as iron oxide, titanium oxide, manganese oxide, etc. In another specific embodiment, the reactor surface can include at least one surface or electrode surface that comprises one or more selected from the group consisting of various carbon surfaces such as graphite, graphene, carbon paper, or carbon felt, platinum, zinc oxide, cellulose, polystyrene, gold, gold alloy, gold palladium alloy, and metal oxides such as iron oxide, titanium, titanium oxide, manganese oxide, silica, etc. Depending on the need of use, such as multiple enzymatic steps and pathways, multiple surfaces can be used, for example to attach to linkers that are specific to that surface. Those specific linkers can then also be attached to a specific enzyme. The attachment of the linkers and thus the specific enzymes can then be partitioned based on the surface in the reactor cell.

In a specific embodiment of the reactor cell, the reactor cell may include at least one form of surface attached to an electrode surface linker that is conductive, thereby allowing electron transfer between the enzyme and the surface or electrode surface. In another specific embodiment the electron transfer travels from the enzyme to the surface. In another specific embodiment the electron transfer travels from the surface to the enzyme. In a specific embodiment, the enzyme is an oxidoreductase enzyme.

In a specific embodiment, the enzymatic reactor cells can utilize any form of linker as described herein, including a linker that includes a surface binding moiety (SBM) or a material binding peptide, a peptide, protein, a chemical, or polynucleotide. In a specific embodiment, the reactor cells utilize linkers that include a peptide or protein or a protein or peptide nanowire base. In a specific embodiment, these proteins or peptides are conductive and allow for electron transfer between an enzyme and the surface or other intended target in the reactor cell. In a specific embodiment, the linker that allows for electron transfer from the enzyme (such as an oxidoreductase enzyme) and the surface or electrode surface. In a specific embodiment the linkers are electrode surface linkers.

In one embodiment, the use of a peptide or protein in the linker thus allows fusion of the protein, i.e., the linker and the enzyme is a fusion protein, and can be expressed together, thereby allowing a single step of immobilizing the fusion protein to the intended surface.

In a specific embodiment, the reactor cells may comprise cells that allow for linkers bind to the surface and or the enzyme by covalent binding, cross-linking and/or entrapment. In a specific embodiment, the linker attaches by click chemistry, dithiol bond formation, Michael addition, a metal-sulfur bond linkage, nucleophilic substitution or enzyme catalyzed conjugation to the surface and/or the enzyme.

In one embodiment, the linker may comprise a chemical nanowire or DNA nanowire type base. In a specific embodiment, the chemical nanowire base can include polymer containing compounds (e.g., MAL-PEG-NHS), cyclic carbon containing compounds (e.g., Succinimidyl 4-(N-malcimidomethyl) cyclohexane-1-carboxylate), or dithiol containing compounds (e.g., 1,6-hexanedithiol). In another specific embodiment, the linker may use, be or include glutaraldehyde nanowires. In another specific embodiment, the linkers or nanowires may, use, be or include SMCC Succinimidyl 4-(N-maleimidomethyl) cyclohexane-1-carboxylate,bis-MAL-dPEG$_3$. TFP-dPEG$_2$Mal, MBS (m-malcimidobenzoyl-N-hydroxysuccinimide ester) or a maleimide.

In a specific embodiment, the nanowire is a PEG based nanowire. In another embodiment, nanowire uses PEG with dithiol such as 1,6-hexanedithiol.

In one embodiment, the linker links by reversible mobilization, wherein the reversible mobilization includes binding by physisorption, bioaffinity, a metal-sulfur bond linkage, and chelation/metal binding. In a specific embodiment, the bioaffinity reversible mobilization is by biotin/streptavidin, or a His-tag. In other words, the reactor cells, can utilize protein/peptide technology to link to either the surface either covalently or non-covalently such as by high affinity binding moieties that are specific to that surface, or to the enzyme, either covalently (such as a fusion protein) or non-covalently such as by high affinity binding moieties that are specific to that enzyme, or a tag on that enzyme, such as a protein G/antibody or streptavidin/biotin system.

As described herein, the enzymatic reactor cells of the present invention can include one or more enzymes, including oxidoreductase enzymes. The reactor cells may be used for single reaction, using a single enzyme, for example, Example 1 described herein. The reactor cells can also be used for multiple reactions, using multiple enzymes in an enzymatic pathway, for example, Examples 2-4 described herein. In a specific embodiment, the pathway can be performed in single reactor cell (such as Example 3 herein) or more than one reactor cell may be used for the pathway, wherein different enzymes are used in different reactor cells. See Example 2 and 4 herein.

Accordingly, one embodiment of the present invention is a system with more than one reactor cells, wherein each reactor cell comprises a different enzymatic reaction or the same enzymatic reaction. In a specific embodiment, the reactor cell comprises one oxidoreductase enzyme and performs a single enzymatic reaction in said enzymatic reactor cell.

In another embodiment, the enzymatic reactor cell comprises more than one oxidoreductase enzyme and performs more than one enzymatic reaction in said enzymatic reactor cell. In another embodiment, the more than one enzymatic reaction in said enzymatic reactor cell is a multi-step pathway. In another specific embodiment, the multi-step pathway is a biological pathway.

In another embodiment, the reactor cells comprise enzymes that are not attached to any surface. In a specific embodiment, the reactor cells may have one or more enzymes that are attached to the surface and another set of enzymes (such as different enzymes in that pathway) that are not attached to the surface. In a specific embodiment, the oxidoreductase enzyme is linked to the electrode surface by the electrode surface linker, and one or more enzymes that are not linked to the surface.

In embodiment of the reactor cells of the present invention, the electrode surface is the cathode, the anode or both. In another specific embodiment, the reactor cells can utilize different electrodes known in the art. For example, the electrode can be made from a carbon-based material such as, for example, CNTs, carbon infiltrated CNTs (CI-CNTs), SWCNTs, MWCNTs, graphene, carbon black, carbon felt, carbon powder, carbon fiber, carbon paper (Toray, ELAT, etc.), pyrolytic carbon, carbon cloth, screen printed carbon, doped diamond, doped diamond-like carbon (DLC), doped polycrystalline diamond (PCD), graphene-coated diamond, DLC, or PCD, and the like.

Electrodes can additionally be made from semiconductive materials, and any semiconductor material capable of electron transport/tunneling to and from the bioelectric material is considered to be within the present scope. Nonlimiting examples of semiconductor materials can include silicon, germanium, which can be doped with elements such as antimony, arsenic, boron, indium, gallium, phosphorus, or combinations thereof.

Electrodes made from conductive metals can also be used in the embodiments of the present disclosure. Any metal or metal alloy material that is electrically conductive, that can support a bioelectric material as described herein, and is capable of enzymes immobilized with a linked or adjacent redox linker or polymer.

Additionally, the present electrodes can be made from metal oxides, metal sulfides, and the like. Any oxide material that is electrically conductive, that can support a bioelectric material as described herein, and is capable of enzymes immobilized in with a linked or adjacent redox linker or polymer is considered to be within the present scope. Nonlimiting examples of oxides can include boron nitride materials, cerium oxide materials, indium-tin oxide (ITO), molybdenum sulfide, titanium oxides, including nanoporous titanium oxide, tin oxides, including tin oxide coated glass, and the like, including combinations thereof.

In another embodiment, the reactor cells can use an electrode such as a 3-electrode cell, a rotating disk electrode, a rotating ring disk electrode, a through plane conductivity test set up, or other standard electrochemistry set up.

In a specific embodiment, the reactor cell of the present invention includes an enzyme and/or oxidoreductase enzyme that produces methanol. In another specific embodiment, the enzyme and/or oxidoreductase enzyme are an enzyme and/or oxidoreductase enzymes from a pathway that produces hydrogen.

In another specific embodiment, the enzyme and/or oxidoreductase enzyme are an enzyme and/or oxidoreductase enzymes from a pathway that produces formate, formic acid and/or formaldehyde.

In another embodiment, the enzymes of the reactor cell or multiple reactor cells comprise hydrogenase, formate dehydrogenase, formaldehyde dehydrogenase, and/or alcohol dehydrogenase.

In another embodiment, the enzyme or enzymes are provided in the reactor cell to produce hydrogen. In another embodiment, the enzymes or the oxidoreductase enzymes of the reactor cells of the present invention comprises hydrogenase.

In another embodiment, the reactor cells include an enzyme or enzymes to produce methanol, which can be performed in one reactor cell or multiple reactor cells. In a specific embodiment, the reactor cell or multiple reactor cells comprise formate dehydrogenase, formaldehyde dehydrogenase, and/or alcohol dehydrogenase. In another embodiment, reactor cell includes methane monooxygenase. In a specific embodiment, the enzyme reactor cell comprises formate dehydrogenase. In another embodiment, the enzymatic reactor cell produces formate and/or formic acid.

In a specific embodiment, the enzyme reactor cell comprises formate dehydrogenase and formaldehyde dehydrogenase. In a specific embodiment, the enzymatic reactor cell produces formate, formic acid and/or formaldehyde.

In a specific embodiment, the enzyme reactor cell comprises the enzyme comprises formate dehydrogenase, formaldehyde dehydrogenase, and alcohol dehydrogenase. In another specific embodiment, the enzymatic reactor cell produces formate, formic acid, formaldehyde, and/or methanol.

In another embodiment, the reactor cell may be as depicted in Example 1. In another embodiment the reactor cell(s) may be as depicted in Examples 2, 3 or 4. In another specific embodiment, the reactor cell or reactor cells may be primed or introduced with a starting material, substrate or any cofactors needed for the enzymatic reaction or pathway to proceed. In a specific embodiment, the reactor cells may initially comprise carbon dioxide. In another embodiment, the reactor cell or cell may initially comprise carbon dioxide and/or methane.

In another embodiment, the reactor cells are primed or introduced with other reagents in a reaction. For example, the starting pathway in the reaction cell for producing methanol could be using, formic acid, formaldehyde or methane.

In a specific embodiment, one reactor cell comprises one oxidoreductase enzyme and performs a single enzymatic reaction in said enzymatic reactor cell.

In one embodiment of the present invention is a system with more than one reactor cell, wherein each reactor cell comprises a different enzymatic reaction or the same enzymatic reaction. In a specific embodiment, the plurality of the enzymatic reactor cells are in a series or are in parallel. Accordingly, the present invention may include a plurality of enzymatic reactor cells described herein.

The present invention also includes methods of using the reactor cells and enzymatic pathways described herein. In a specific embodiment, the methods include the use of a reactor cell as described herein to produce hydrogen. In a specific embodiment, the methods include the use of a reactor cell as described herein to produce methanol. In a specific embodiment, the methods herein produce hydrogen at a yield of about 50-90% and a purity of about 50-90%. In a specific embodiment, the methods herein produce methanol at a yield of about 50-90% and a purity of about 50-90%.

Surfaces of the Present Invention

Surfaces of the present invention may include an electrode or non-electrode surface depending on the needs to the enzymatic reaction or enzymatic pathway. In a specific embodiment, the surface is an electrode surface, and can function as either the anode, the cathode, or both in the enzymatic reactor cell. In a specific embodiment, the surface may include graphite, platinum, zinc oxide, cellulose (such as nitrocellulose), polystyrene, gold, gold alloy, gold palladium alloy, and metal oxides such as iron oxide, titanium oxide, manganese oxide, etc., or any combination thereof. In another specific embodiment, the surface may include graphite, platinum, zinc oxide, cellulose (such as nitrocellulose, microcrystalline cellulose, or paper), polystyrene, gold, gold alloy, gold palladium alloy, and metal oxides such as iron oxide, titanium, titanium oxide, manganese oxide, silica, silica coated zinc oxide, etc., or any combination thereof. In another specific embodiment, the reactor surface can include at least one surface or electrode surface that comprises one or more selected from the group consisting of various carbon surfaces such as graphite, graphene, carbon paper, or carbon felt, platinum, zinc oxide, cellulose, polystyrene, gold, gold alloy, gold palladium alloy, and metal oxides such as iron oxide, titanium, titanium oxide, manganese oxide, silica, etc. In another specific embodiment, the surface may be titanium, cellulose, polystyrene, carbon surfaces, and/or silica. In a specific embodiment, the surface may allow for a specific binding peptide to bind, wherein the binding peptide is the linker or a portion of the linker. In a specific embodiment, the surface may be for example gold, cellulose, or polystyrene, thereby allowing for affinity binding to a specific binding motif, or a covalent bond to the surface.

In another embodiment, the surfaces may be in various shapes or forms to facilitate immobilization of the enzyme and/or the reaction as desired. For example, the surface may be planar, non-planar, spherical, in the shape of nanoparticles, in the shape of beads, an aerogel, fibrous, or be or include a polymer. In a specific embodiment, the surface may be planar allowing for one or more types of enzymes to be immobilized to the surface. In a specific embodiment, the surface may be in the form of nanoparticles. In another embodiment, the nanoparticles may be silica coated zinc oxide nanoparticles.

Linkers of the Present Invention

Linkers may be included in the present invention. In one or more embodiment, the linkers of the present invention may have one or more of the following features: 1) a means for linking to the surface; 2) a means for linking to the enzyme, thereby providing a link between the surface and the enzyme; and 3) the linker is, or comprises a portion of the linker that allows for electron transfer between the enzyme (such as an oxidoreductase enzyme) and the surface or electrode surface. In a specific embodiment, the linker allows for electron transfer from the enzyme to the surface or from the surface to the enzyme.

In a specific embodiment the linkers are electrode surface linkers and are conductive. In a specific embodiment, the electrode surface linkers allow for electron transfer from the oxidoreductase enzyme and the surface or electrode surface.

In one embodiment, the linker binds on one end to the surface, and the other end to the enzyme, thereby immobilizing the enzyme to the surface. In a specific embodiment, the linker is an electrode surface linker, thereby allowing electron transfer from the enzyme to the surface, or vice-versa. In a specific embodiment, the electrode surface linker is conductive, thereby allowing electron transfer from the oxidoreductase enzyme and the electrode surface.

In one embodiment, the linker or electrode surface linker binds to the surface.

In one embodiment, the linker or electrode surface linker comprises a surface binding moiety (SBM). In a specific embodiment, the surface binding moiety provide a means for binding to the surface, which may include various methods, including irreversible and reversible immobilization of the linker and enzyme to the surface. Irreversible immobilization includes covalent binding, cross-linking and entrapment, while reversible methods include physisorption, bioaffinity (biotin/streptavidin and protein A/G), chelation/metal binding, a metal-sulfur bond linkage, and disulfide bonds (LIÉBANA; DRAGO, 2016).

In a specific embodiment, the linker is an electrode surface linker linked to the surface or electrode surface by irreversible or reversible immobilization. In another embodiment, the surface binding moiety (SBM) is immobilized to the surface or electrode surface by irreversible mobilization, wherein the irreversible mobilization is by covalent binding, cross-linking and/or entrapment. In a specific embodiment the surface binding moiety (SBM) is covalently bonded to the electrode surface. In another embodiment, the surface binding moiety (SBM) attaches by click chemistry, dithiol bond formation, Michael addition (for example, the use of an acrylamide linkage), a metal-sulfur bond linkage, nucleophilic substitution or enzyme catalyzed conjugation. In another embodiment, the immobilization or binding may be by physiosorption.

In another embodiment, the surface binding moiety (SBM) may be or include a material binding protein or peptide. In a specific embodiment, the linker or electrode surface linker comprises a peptide for binding to the surface.

In another embodiment, the linker or electrode surface linker comprises a gold binding peptide, a graphite/graphene binding motif, a PDMS binding motif, a silica binding motif, a cellulose binding peptide, a polystyrene binding motif, a zinc oxide binding peptide, a platinum binding motif, or a AuPd binding peptide. In another embodiment, the linker or electrode surface linker comprises a titanium binding peptide. In a specific embodiment, the surface binding moiety of the linkers may comprise one or more of the material binding peptide (MBP) amino acid sequences from Table 1.

TABLE 1

MBP Sequences

| ID | Target | Peptide Sequence | Length (aa) | Molecular weight (Dalton) | Reference | SEQ ID NO: |
|---|---|---|---|---|---|---|
| EMT014 | Gold | MHGKTQATSGTIQSMHGKTQATSGTIQSMHGKTQATSGTIQS | 42 | 4303.752 | (KULP; SARIKAYA; EVANS, 2004) | SEQ ID NO: 1 |
| EMT015 | Gold | MHGKTQATSGTIQSMHGKTQATSGTIQSMHGKTQATSGTIQSMHGKTQATSGTIQSMHGKTQATSGTIQSMHGKTQATSGTIQS | 98 | 10018.0684 | (BROWN, 1997) | SEQ ID NO: 2 |
| EMT016 | Gold | WAGAKRLVLRRE | 12 | 1454.7371 | (HNILOVA; OREN; SEKER; WILSON et al., 2008) | SEQ ID NO: 3 |
| EMT017 | Gold | HFSSWETQQG | 10 | 1206.2336 | (TANAKA; HIKIBA; YAMASHITA; MUTO et al., 2017) | SEQ ID NO: 4 |
| EMT018 | Gold | WYEKWQKANW | 10 | 1438.6042 | | SEQ ID NO: 5 |
| EMT019 | Gold | VSGSSPDS | 8 | 734.716 | (HUANG; CHIANG; LEE; GAO et al., 2005) | SEQ ID NO: 6 |
| EMT020 | Silicon | SSKKSGSYSGSKGSRRILGGGGMHGKTQATSGTIQS | 36 | 3541.8909 | (KROGER; DEUTZMANN; SUMPER, 1999) | SEQ ID NO: 7 |
| EMT021 | Silicon | MSPHPHPRHHHTGGGGMHGKTQATSGTIQS | 30 | 3127.4165 | (NAIK; BROTT; CARSON; AL., 2012) | SEQ ID NO: 8 |
| EMT022 | Silicon | RGRRRRLSCRLLGGGGMHGKTQATSGTIQS | 30 | 3198.6687 | | SEQ ID NO: 9 |

TABLE 1-continued

MBP Sequences

| ID | Target | Peptide Sequence | Length (aa) | Molecular weight (Dalton) | Reference | SEQ ID NO: |
|---|---|---|---|---|---|---|
| EMT023 | Silicon | DSARGFKKPGKRGGGG MHGKTQATSGTIQS | 30 | 3003.3374 | (COYLE; BANEY X, 2016) | SEQ ID NO: 10 |
| EMT024 | Silicon | HPPMNASHPHMHGGGG MHGKTQATSGTIQS | 30 | 3049.3582 | (ETESHOLA; BRILLSON; LEE, 2005) | SEQ ID NO: 11 |
| EMT025 | Silicon | HKDHHANQHVHMGGGG MHGKTQATSGTIQS | 30 | 3147.4045 | (OKAMOTO; IWAHORI; YAMASHITA, 2019) | SEQ ID NO: 12 |
| EMT026 | Silicon | HPPMNASHPHMHGGGG | 16 | | | SEQ ID NO: 13 |
| Cellulose binding motif 1 | Cellulose | PTTGSCAVTYTANGWSG GFTAAVTLTNTGTTALSG WTLGFAFPSGQTLTQGW SARWAQSGSSVTATNEA WNAVLAPGASVEIGFSG THTGTNTAPATFTVGGA TCTTR | 108 | | | SEQ ID NO: 14 |
| Cellulose binding motif 2 | Cellulose | SGPAGCQVLWGVNQWN TGFTANVTVKNTSSAPV DGWTLTFSFPSGQQVTQ AWSSTVTQSGSAVTVRN APWNGSIPAGGTAQFGF NGSHTGTNAAPTAFSLN GTPCTVG | 108 | | | SEQ ID NO: 15 |
| Poly-styrene binding motif 1 | Poly-styrene | RAFIASRRIRRP | 12 | | | SEQ ID NO: 16 |
| Poly-styrene binding motif 2 | Poly-styrene | RIIIRRIR | 9 | | | SEQ ID NO: 17 |
| Silica Binding Motif 1 | Silica | RGRRRLSCRLL | 12 | | | SEQ ID NO: 18 |
| Silica Binding Motif 2 | Silica | SSKKSGSYSGSKGSRRIL | 18 | | | SEQ ID NO: 19 |
| Silica Binding Motif 3 | Silica | MSPHPHPRHHHT | 12 | | | SEQ ID NO: 20 |
| Silica Binding Motif 4 | Silica | DSARGFKKPGKR | 12 | | | SEQ ID NO: 21 |
| Silica Binding Motif 5 | Silica | HPPMNASHPHMH | 12 | | | SEQ ID NO: 22 |
| Silica Binding Motif 6 | Silica | HKDHHANQHVHM | 12 | | | SEQ ID NO: 23 |
| Silver Binding Motif 1 | Silver | NPSSLFRYLPSD | 12 | | | SEQ ID NO: 24 |

TABLE 1-continued

MBP Sequences

| ID | Target | Peptide Sequence | Length (aa) | Molecular weight (Dalton) | Reference | SEQ ID NO: |
|---|---|---|---|---|---|---|
| Graphene Binding Motif | Graphene | HSSYWYAFNNKT | 12 | | | SEQ ID NO: 25 |
| Zinc Oxide Binding Motif 1 | Zinc Oxide | EAHVMHKVAPRP | 12 | | | SEQ ID NO: 26 |
| Zinc Oxide Binding Motif 2 | Zinc Oxide | HHGHSPTSPQVR | 12 | | | SEQ ID NO: 27 |
| PDMS Binding Motif 1 | PDMS (Poly-dimethyl-siloxane) | MVMPGDNIKMVVTLIHPIAMDDGLRFAIRE | 30 | | | SEQ ID NO: 28 |
| PDMS Binding Motif 2 | PDMS (Poly-dimethyl-siloxane) | VGPNNVPYIVATITSNSAGGQPVSLANLKAMYSIAKKYDIPVVMD | 45 | | | SEQ ID NO: 29 |
| PDMS Binding Motif 3 | PDMS (Poly-dimethyl-siloxane) | NNSWTRVAFAGLKFQDVGSFDYGRNYGVVYD | 31 | | | SEQ ID NO: 30 |
| Gold binding motif 1 | Gold 1 | QVQLVESGAEVKKPGESLKISCKGSGYSFPSYWINWVRQMPGKGLEWMGMIYPADSDTRYSPSFQGHVTISADKSINTAYLQWAGLKASDTAIYYCARLGIGGRYMSRWGQGTLVTVSSA | 120 | | | SEQ ID NO: 31 |
| Platinum binding motif 1 | Platinum | LEYKRGYKPR | 10 | | | SEQ ID NO: 32 |
| AuPd binding motif 1 | AuPd | DYKDDDDKAYSSGAPPMPPF | 20 | | | SEQ ID NO: 33 |
| Ti binding motif 1 | Titanium | RKLPDA | 6 | | | SEQ ID NO: 50 |
| Graphite/graphene binding peptide 1 | Graphite | EPLQLKM | 7 | | | SEQ ID NO: 54 |
| Graphite/graphene binding peptide 2 | Graphite | GAMHLPWHMGTL | 12 | | | SEQ ID NO: 55 |
| Graphite/graphene binding peptide 3 | Graphite | IMVTASSAYRRY | 12 | | | SEQ ID NO: 56 |
| Graphite/graphene binding peptide 4 | Graphite | VIAGASLWWSEKLVIA | 16 | | | SEQ ID NO: 57 |
| Graphite/graphene binding peptide 5 | Graphite | CALNNDEVDKFAM | 13 | | | SEQ ID NO: 58 |

TABLE 1-continued

MBP Sequences

| ID | Target | Peptide Sequence | Length (aa) | Molecular weight (Dalton) | Reference | SEQ ID NO: |
|---|---|---|---|---|---|---|
| Graphite/graphene binding peptide 6 | Graphite | KKNYSSSISSIHC | 13 | | | SEQ ID NO: 59 |
| Graphite/graphene binding peptide 7 | Graphite | CGGHSSKLQFWYFWY | 15 | | | SEQ ID NO: 60 |
| Graphite/graphene binding peptide 8 | Graphite | HWSAWWIRSNQS | 12 | | | SEQ ID NO: 61 |
| Graphite/graphene binding peptide 9 | Graphite | IMVTESSDYSSY | 12 | | | SEQ ID NO: 62 |
| Graphite/graphene binding peptide 10 | Graphite | IMVTASSAYDDY | 12 | | | SEQ ID NO: 63 |
| Graphite/graphene binding peptide 11 | Graphite | IMVTQSSNYSSY | 12 | | | SEQ ID NO: 64 |
| Graphite/graphene binding peptide 12 | Graphite | IMVTKSSDYSSY | 12 | | | SEQ ID NO: 65 |
| Graphite/graphene binding peptide 13 | Graphite | HSSAAAAFNNKT | 12 | | | SEQ ID NO: 66 |
| Graphite/graphene binding peptide 14 | Graphite | HTSYWYAFNTKT | 12 | | | SEQ ID NO: 67 |
| Graphite/graphene binding peptide 15 | Graphite | YTTHVLPFAPSS | 12 | | | SEQ ID NO: 68 |
| Graphite/graphene binding peptide 16 | Graphite | HAWVDWIRPIH | 11 | | | SEQ ID NO: 69 |
| Graphite/graphene binding peptide 17 | Graphite | HWKHPWGAWDTL | 12 | | | SEQ ID NO: 70 |
| Graphite/graphene binding peptide 18 | Graphite | QQQLSTH | 7 | | | SEQ ID NO: 71 |
| Graphite/graphene binding peptide 19 | Graphite | GGPDSARGFKKPGKRGPC | 18 | | | SEQ ID NO: 72 |
| Cellulose binding peptide 1 | cellulose | GGGMHPNAGHGSLMR | 15 | | | SEQ ID NO: 73 |

TABLE 1-continued

MBP Sequences

| ID | Target | Peptide Sequence | Length (aa) | Molecular weight (Dalton) | Reference | SEQ ID NO: |
|---|---|---|---|---|---|---|
| CBD$_{CBH1}$ | cellulose | TPQSHYGQCGGGYSGPT VCASGTTCQVLNPYYSQ CL | 36 | | | SEQ ID NO: 74 |
| CBD$_{ClpC}$ | | GVVSVQFNNGSSPASSNS IYARFKVTNTSGSPINLA DLKLRYYYTQDADKPLT FWCDHAGYMSGSNYID ATSKVTGSFKAVSPAVT NADHYLEVALNSDAGSL PAGGSIEIQTRFARNDWS NFDQSNDWSYTAAGSY MDWQKISAFVGGTLAYG STP | 157 | | | SEQ ID NO: 75 |
| Ti binding motif 2 | Titanium | QPYLFATDSLIK | 12 | | | SEQ ID NO: 76 |
| Ti binding motif 3 | Titanium | GHTHYHAVRTQT | 12 | | | SEQ ID NO: 77 |
| Poly-styrene binding motif 3 | Poly-styrene | RLLLRRLRR | 9 | | | SEQ ID NO: 78 |
| Poly-styrene binding motif 4 | Poly-styrene | KRAFIASRRIRRP | 13 | | | SEQ ID NO: 79 |

In another embodiment, electrode surface linker comprises a protein wherein the peptide or protein is a protein or peptide nanowire base.

The linkers may be conductive and may allow for electron transfer. In a specific embodiment, the linker that allows for electron transfer between the enzyme (such as an oxidoreductase enzyme) and the surface or electrode surface. In a specific embodiment the linkers are electrode surface linkers. In another specific embodiment, linker allows for electron transfer from the enzyme (such as an oxidoreductase enzyme) to the surface or electrode surface and/or for electron transfer from the surface to the enzyme.

In one embodiment, the linker may comprise a chemical nanowire, a means for chemical linkage, or a DNA nanowire type base. In a specific embodiment, the chemical nanowire base can include polymer containing compounds (e.g., MAL-PEG-NHS), cyclic carbon containing compounds (e.g., Succinimidyl 4-(N-maleimidomethyl) cyclohexane-1-carboxylate), or dithiol containing compounds (e.g., 1,6-hexanedithiol), or a means for a metal-sulfur bond linkage.

In another specific embodiment, the linker may use, be, or include glutaraldehyde nanowires. In another specific embodiment, the nanowires may, use, be, or include SMCC Succinimidyl 4-(N-maleimidomethyl)cyclohexane-1-carboxylate, MBS (m-maleimidobenzoyl-N-hydroxysuccinimide ester) or a maleimide. In a specific embodiment, chemical modification may be used to link two portions of the linker or a portion of the linker to the surface, or a portion of the linker to the enzyme. In a specific embodiment, In another embodiment, the linker may comprise a DNA nanowire base, such as double stranded DNA, such as DNA composed of G and C bases ranging in length from about 4.08 nm to about 16 μm. In another embodiment, the linker may comprise a DNA nanowire base, such as double stranded DNA, such as DNA composed of G and C bases ranging in length from about 0.1 nm to about 10 μm or any length therebetween. In another embodiment, the length is from about 1.00 nm to about 1.0 μm. In another embodiment, the length is from about 1.00 nm to about 10 nm. In another embodiment, the length is from about 1.5 nm to about 5 nm. In another embodiment, the length is from about 1.00 nm to about 3 nm. In another embodiment, the length is about 1.00 nm, 2 nm, 3 nm, 4 nm, 5 nm, 6 nm, 7 nm, 8 nm, 9 nm, or 10 nm. In another embodiment, the DNA is single stranded DNA, such as single stranded DNA composed of G and C bases ranging in length from about 4.08 nm to about 16 μm. In another embodiment, the DNA is single stranded DNA, such as single stranded DNA composed of G and C bases ranging in length from about 0.1 nm to about 10 μm or any length therebetween. In another embodiment, the length is from about 1.00 nm to about 1.0 μm. In another embodiment, the length is from about 1.00 nm to about 10 nm. In another embodiment, the length is from about 1.5 nm to about 5 nm. In another embodiment, the length is from about 1.00 nm to about 3 nm. In another embodiment, the length is about 1.00 nm, 2 nm, 3 nm, 4 nm, 5 nm, 6 nm, 7 nm, 8 nm, 9 nm, or 10 nm.

In another embodiment, the DNA of the nanowire base is a polynucleotide of at least 2, 3, 4, 5, 6, 7, 8, 9, 10, 11, 12, 13, 14, or 15 nucleotides in length. In another embodiment, the polynucleotide sequences are single stranded or double stranded. In another embodiment, the nanowires comprise a nucleotide sequence of Table 3. In a specific embodiment, the nucleotide sequence may be any of the single stranded sequences of Table 3 or together as a double stranded sequence such as, for example, a double stranded sequence comprising SEQ ID NOs: 52 and 53.

TABLE 3

Nanowire Polynucleotide Sequences

| ID | Nucleotide Sequence 5' to 3' | SEQ ID NO: |
|---|---|---|
| SSDNA1 | GGATGC | SEQ ID NO: 52 |
| SSDNA2 | GCATCC | SEQ ID NO: 53 |
| SSDNA3 | GCAACTAGGCTCG | SEQ ID NO: 86 |
| SSDNA4 | CGAGCCTAGTTGC | SEQ ID NO: 87 |
| SSDNA5 | GCACCTGAACCGCATGGACTCG | SEQ ID NO: 88 |
| SSDNA6 | CGAGTCCATGCGGTTCAGGTGC | SEQ ID NO: 89 |

In another embodiment, the present invention may comprise a nucleotide as in Table 3. In another embodiment, the present invention includes nucleotide sequence of about 75% to about 99.9% identical to one or more of SEQ ID Nos 52-53 or SEQ ID Nos 86-89. In another embodiment, the present invention includes a nucleotide sequence of about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 98%, about 93%, about 94%, about 95%, about 96%, about 97%, about 98%, about 99%, about 99.1%, about 99.2%, about 99.3%, about 99.4%, about 99.5%, about 99.6%, about 99.7%, about 99.8%, or about 99.9% to one or more of SEQ ID Nos 52-53 or SEQ ID Nos 86-89.

In another embodiment, the protein or peptide nanowire base includes a material binding peptide, a short conductive peptide, a metal-sulfur bond linkage, and/or one or more ferredoxins. In another embodiment, the one or more ferredoxins comprises a chain of ferredoxins. In another specific embodiment, the protein nanowire comprises ferredoxins, with 1 FeS cluster, more than 1 FeS cluster, a chain of ferredoxins with 1 FeS clusters, a chain of ferredoxins with more than 1 FeS clusters, or a chain of ferredoxins that includes a combination of ferredoxins with 1 FeS cluster and ferredoxins with >1 FeS cluster.

In another embodiment, the ferredoxin is from *Chlamydomonas reinhardtii* and/or *Clostridium pasteurianum*, in one or more clusters or chains as described above. In another embodiment, the linker or electrode surface linker may comprise one or more conductive proteins from *E. coli*. In a specific embodiment, the *E. coli* is *E. coli* C321, and the linker is the fimA protein. In another embodiment, the fimA protein is wildtype or a mutant. In a specific embodiment, the fimA is a mutant and point mutations at the following residues: A80, A109, and/or H82. In a specific embodiment, the mutations may be as follows: *E. coli* C321 fimA protein with A80F point mutation; *E. coli* C321 fimA protein with A109F point mutation; *E. coli* C321 fimA protein with A80F and A109F point mutation; *E. coli* C321 fimA protein with A80F, H82F and A109F point mutation; *E. coli* C321 fimA protein with A80F, H82F and A109Y point mutation; *E. coli* C321 fimA protein with A80Y point mutation; *E. coli* C321 fimA protein with A109Y point mutation; *E. coli* C321 fimA protein with A80Y and A109Y point mutations; *E. coli* C321 fimA protein with A80W point mutation; *E. coli* C321 fimA protein with A109W point mutation; *E. coli* C321 fimA protein with A80W and A109W point mutations; *E. coli* C321 fimA protein with A80Y, H82F and A80Y point mutations; *E. coli* C321 fimA protein with A80Y, H82Y and A109Y point mutations; or *E. coli* C321 fimA protein with a A109 2NaA point mutation.

In another embodiment, the linker or electrode surface linker may comprise one or more conductive proteins from pili/archaelum (e.g., from *Syntrophus aciditrophicus, Methanospirillum hungatei, Geobacter metallireducens*) or other conductive extracellular proteins (e.g., OmcS cytochrome, OmcZ cytochrome).

In another embodiment, the linkers comprise one or more short conductive peptides known in the art, including one or more conductive peptides with the amino acid sequence as in Table 2.

TABLE 2

Conductive Peptide Sequences

| ID | Peptide Sequence | SEQ ID NO: |
|---|---|---|
| Conductive Peptide 1 | FTLIELLIVVAIIGILAAIAIPQFSAYRVKAYNSAA SSDLRNLKTALESAFADDQTYPPES | SEQ ID NO: 34 |
| Conductive Peptide 2 | FTLIELMIVVAIIGILAAIAIPQYQNYVARSEGAS ALASVNPLKTTVEEALSRGWSVKSGTGTEDAT KKEVPLGVAADANKLGTIALKPDPADGTADITL TFTMGGAGPKNKGKIITLTRTAADGLWKCTSD QDEQFIPKGCSR | SEQ ID NO: 35 |
| Conductive Peptide 3 | MASNFKFKLLSQLKKRAEGGFTLIELLVVVIIIG VLAAIALPNLLGQVGKARESEAKSTIGALNRAQ QGYFTEKGTFATDTETLEVPAPDGNFFSFAVNT ADNTEAIQDATALNWEADGTRSMSGGTFYDSG TRAFSTVVCRAEAGSEDTPPTPGGANDCGGAEV IK | SEQ ID NO: 36 |
| Conductive Peptide 4 | ELKAIAQEFKAIAKEFAIAFEFKAIAQK | SEQ ID NO: 37 |
| Conductive Peptide 5 | YYACAYY | SEQ ID NO: 38 |
| Conductive Peptide 6 | GNNQQNY | SEQ ID NO: 39 |

TABLE 2-continued

Conductive Peptide Sequences

| ID | Peptide Sequence | SEQ ID NO: |
|---|---|---|
| Conductive Peptide 7 | KVQIINKKL | SEQ ID NO: 40 |
| Conductive Peptide 8 | VGGLG | SEQ ID NO: 41 |
| Conductive Peptide 9 | VGGLGHHH | SEQ ID NO: 42 |
| Conductive Peptide 10 | VGGLGWWW | SEQ ID NO: 43 |
| Conductive Peptide 11 | VGGLGYYY | SEQ ID NO: 44 |
| Conductive Peptide 12 | VGGLFFF | SEQ ID NO: 45 |
| Conductive Peptide 13 | SVNVTQVGFP | SEQ ID NO: 46 |
| Conductive Peptide 14 | SVNVTQVGFPHHH | SEQ ID NO: 47 |
| Conductive Peptide 15 | SVNVTQVGFPWWW | SEQ ID NO: 48 |
| Conductive Peptide 16 | SVNVTQVGFPYYY | SEQ ID NO: 49 |
| Conductive peptide 17 | PPPYPPPWC | SEQ ID NO: 51 |

In another embodiment, the present invention may comprise a peptide or an amino acid sequence as in Table 2. In another specific embodiment, the peptide consists of the amino acid sequences as in Table 2. In another embodiment, the present invention includes a peptide or an amino acid sequence of about 75% to about 99.9% identical to one or more of SEQ ID Nos 34-51. In another embodiment, the present invention includes a peptide or an amino acid sequence of about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 98%, about 93%, about 94%, about 95%, about 96%, about 97%, about 98%, about 99%, about 99.1%, about 99.2%, about 99.3%, about 99.4%, about 99.5%, about 99.6%, about 99.7%, about 99.8%, or about 99.9% to one or more of SEQ ID Nos 34-51.

In another embodiment, the present invention includes a peptide or an amino acid sequence of about 75% to about 99.9% identical to SEQ ID No. 49. In another embodiment, the present invention includes a peptide or an amino acid sequence of about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 98%, about 93%, about 94%, about 95%, about 96%, about 97%, about 98%, about 99%, about 99.1%, about 99.2%, about 99.3%, about 99.4%, about 99.5%, about 99.6%, about 99.7%, about 99.8%, or about 99.9% to SEQ ID No. 49.

In another embodiment, the present invention includes a peptide or an amino acid sequence of about 75% to about 99.9% identical to SEQ ID No. 48. In another embodiment, the present invention includes a peptide or an amino acid sequence of about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 98%, about 93%, about 94%, about 95%, about 96%, about 97%, about 98%, about 99%, about 99.1%, about 99.2%, about 99.3%, about 99.4%, about 99.5%, about 99.6%, about 99.7%, about 99.8%, or about 99.9% to SEQ ID No. 48.

In another embodiment, the present invention includes a peptide or an amino acid sequence of about 75% to about 99.9% identical to SEQ ID No. 47. In another embodiment, the present invention includes a peptide or an amino acid sequence of about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 98%, about 93%, about 94%, about 95%, about 96%, about 97%, about 98%, about 99%, about 99.1%, about 99.2%, about 99.3%, about 99.4%, about 99.5%, about 99.6%, about 99.7%, about 99.8%, or about 99.9% to SEQ ID No. 47.

In another embodiment, the present invention includes a peptide or an amino acid sequence of about 75% to about 99.9% identical to SEQ ID No. 51. In another embodiment, the present invention includes a peptide or an amino acid sequence of about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 98%, about 93%, about 94%, about 95%, about 96%, about 97%, about 98%, about 99%, about 99.1%, about 99.2%, about 99.3%, about 99.4%, about 99.5%, about 99.6%, about 99.7%, about 99.8%, or about 99.9% to SEQ ID No. 51.

The linkers and electrode surface linkers of the present invention may also include any appropriate amino acid sequence required to control steric hindrance and/or chemical interactions (organic or inorganic materials, peptides and proteins, cross-linking reagents, etc.).

The linker sequences of the present invention may include one or more passive linkers and/or active linkers. In certain embodiments, a passive linker is fused to an active linker, e.g., to link the SBM to the active portion of the linker. As used herein, a passive linker does not specifically bind to the surface or enzyme and is typically present between two polypeptide sequences to control steric hindrance, e.g., to retain activity of the two linked polypeptides. In particular embodiments, a passive linker may be a single bond or an amino acid sequence that links the SBM to another portion of the linker or directly to the enzyme. A passive linker may also be present between the enzyme and a member of a binding pair to which it is fused. The linker may be a covalent bond, an ionic bond, a non-covalent bond such as with the use of high-affinity molecules.

As used herein, an active linker may be fused to the SBM and/or enzyme and may be present to functionally link the SBM to the enzyme. In particular embodiments, an active linker binds to the enzyme. In certain embodiments, an active linker is a member of a binding pair, such as streptavidin/biotin. The link may be a covalent bond, an ionic bond, a non-covalent bond such as with the use of high-affinity molecules.

In another embodiment, the linker sequence may include other amino acid sequences, such as passive linkers, a linear tandem repeat polypeptides, a linear non-repeating polypeptides or linkers that allow for additional flexibility or rigidity to the overall linker system.

In one embodiment, the linker or electrode surface linker binds to the enzyme or an oxidoreductase enzyme.

As described above the linker or electrode surface linker may comprise a surface binding moiety (SBM) that binds to the surface. The SBM may then also bind to a separate portion of the linker, e.g., a passive portion or active portion of the linker, or to the enzyme directly.

The linker or electrode surface linker thus provides a means for binding to the enzyme, which may include various methods, including irreversible and reversible immobilization of the linker to the enzyme. Irreversible immobilization includes covalent binding, cross-linking and entrapment, while reversible methods include random physisorption, bioaffinity (biotin/streptavidin and protein A/G), a metal-sulfur bond linkage, chelation/metal binding and disulfide bonds (LIÉBANA; DRAGO, 2016).

In a specific embodiment, the linker is an electrode surface linker linked to the enzyme by irreversible or reversible immobilization. In another embodiment, linker, including potentially the SBM of the linker, is immobilized to the enzyme by irreversible mobilization, wherein the irreversible mobilization is by covalent binding, cross-linking and/or entrapment. In a specific embodiment the surface binding moiety (SBM) or another portion of the linker is covalently bonded to the enzyme. In another embodiment, the surface binding moiety (SBM) or another portion of the linker is covalently attached by click chemistry, dithiol bond formation, Michael addition (for example, the use of an acrylamide linkage), a metal-sulfur bond linkage, nucleophilic substitution or enzyme catalyzed conjugation.

The link to the enzyme may be a covalent bond, an ionic bond, a non-covalent bond such as with the use of high-affinity molecules.

In a specific embodiment, the high affinity molecule in the linker may be an amino acid sequence comprising protein G from Streptococcus, or an amino acid sequence comprising streptavidin from Streptomyces for binding to the enzyme. In another embodiment, the linker comprises a binding tag, such as a His tag or biotin tag or other tag that allows for binding to the enzyme. In another embodiment, the tags may be on the enzyme, and therein the linker comprises the portion for binding to the tag. In other words, the linker may comprise streptavidin or biotin or the enzyme may comprise biotin or streptavidin respectively.

Enzymes and Enzymatic Pathways of the Present Invention

Enzymatic bioelectrocatalysis is a specific form of electrocatalysis using an enzyme for catalyzing a certain reaction. In one general example of enzymatic bioelectrocatalysis, enzymes are associated with an electrode, including electrode linkers, in a manner that allows electron transfer between the electrode and the enzymes. Such electron transfer allows the continued function of each enzyme over many catalyzed reactions, including a series of reaction to obtain a final desired compound or product. The term "enzyme(s)" as used herein thus relates to a biologically based catalytic mechanism, and can comprise a protein that is both wild-type or mutated for any intended reaction by the user. Nonlimiting examples of other biologically based catalytic materials can include eukaryotic cells, prokaryotic cells, cellular organelles, nucleic acid enzymes (i.e. deoxyribozymes), and the like.

Oxidoreductase enzymes are biocatalytic proteins that can catalyse the coupled oxidation and reduction with a substrate, thus, transferring an electron(s) with the involvement of an electrode linker and/or a cofactor of the enzyme. In a specific embodiment of the present invention, the oxidoreductase enzyme can be used in a single reaction or in a series of reactions with other enzymes or oxidoreductase enzymes wherein the oxidoreductase enzyme is directly linked to an electrode linker. In a specific embodiment, the enzyme or oxidoreductase enzyme is directly linked to an electrode linker in a device, biodevice or reactor cell that contains the reaction or series of reactions if more than one enzyme or oxidoreductase enzyme is used.

In a specific embodiment, the enzyme can be an oxidoreductase enzyme. In another embodiment, the enzyme and/or oxidoreductase enzyme is one of a set or multiple enzymes and/or oxidoreductase enzymes. In another embodiment, the set of or multiple enzymes and/or oxidoreductase enzymes or apart of an enzymatic pathway.

In a specific embodiment, the enzyme and/or oxidoreductase enzyme are enzyme and/or oxidoreductase enzymes from a pathway that produces methanol. In another specific embodiment, the enzyme and/or oxidoreductase enzyme are enzyme and/or oxidoreductase enzymes from a pathway that produces hydrogen.

In another embodiment, the enzyme or oxidoreductase enzyme may be glucose oxidase, glucose dehydrogenase, cholesterol oxidase, cholesterol esterase, ascorbate oxidase, choline oxidase, and/or tyrosinase.

In another embodiment, the enzymes or the oxidoreductase enzymes of the present invention comprises hydrogenase, formate dehydrogenase, formaldehyde dehydrogenase, and/or alcohol dehydrogenase.

In a specific embodiment, the oxidoreductase enzyme comprises formate dehydrogenase. Thus in one embodiment, the enzymes are provided to produce formate or formic acid. In another specific embodiment, enzyme or enzymes include formate dehydrogenase and/or formaldehyde dehydrogenase. Thus in one embodiment the enzymes are provided to produce formaldehyde. In another specific embodiment, the enzymes may include formate dehydrogenase, formaldehyde dehydrogenase, and/or alcohol dehydrogenase. Thus in one embodiment, the enzymes are provided to produce methanol. In a specific embodiment, enzyme includes formate dehydrogenase. In another embodiment, the enzyme is provided to produce formate or formic acid. In a specific embodiment, the enzymes are formate dehydrogenase and formaldehyde dehydrogenase. In a specific embodiment, the enzymes are provided to produce formate, formic acid and/or formaldehyde. In a specific embodiment, the enzyme is formate dehydrogenase, formaldehyde dehydrogenase, and/or alcohol dehydrogenase. In another specific embodiment, the enzyme is provided to produce formate, formic acid, formaldehyde, and/or methanol. In a specific embodiment, the enzymes as mentioned above may be wild-type. In another embodiment, the enzymes may a mutant. In another embodiment, the enzymes may have one or more amino acid residues mutated to a cysteine residue. In another specific embodiment, the mutation to a cysteine residue is on the outer surface of the folded enzyme, thereby allowing easy access to binding or reactive groups for linking to the thiol of the cysteine residue. In a specific embodiment, the enzyme may be that of any sequence in Table 4.

TABLE 4

Enzyme Sequences

| ID | AA Sequence | SEQ ID NO: |
|---|---|---|
| Formaldehyde dehydrogenase R374C with His tag *Pseudomonas putida* | MHHHHHHENLYFQSGNRGVVYLGSGKVEVQKI DYPKMQDPRGKKIEHGVILKVVSTNICGSDQHM VRGRTTAQVGLVLGHEITGEVIEKGRDVENLQI GDLVSVPFNVACGRCRSCKEMHTGVCLTVNPA RAGGAYGYVDMGDWTGGQAEYVLVPYADEN LLKLPDRDKAMEKIRDLTCLSDILPTGYHGAVT AGVGPGSTVYVAGAGPVGLAAAASARLLGAA VVIVGDLNPARLAHAKAQGFEIADLSLDTPLHE QIAALLGEPEVDCAVDAVGFEARGHGHEGAKH EAPATVLNSLMQVTRVAGKIGIPGLYVTEDPGA VDAAAKIGSLSIRFGLGWAKSHSFHTGQTPVMK YNRALMQAIMWDRINIAEVVGVQVISLDDAP<u>C</u> GYGEFDAGVPKKFVIDPHKTFSAA | SEQ ID NO: 80 |
| alcohol dehydrogenase R108C with His Tag *Geobacillus stearothermophilus* (formerly *Bacillus stearothermophilus*) | MHHHHHHENLYFQMKAAVVEQFKKPLQVKEV EKPKISYGEVLVRIKACGVCHTDLHAAHGDWP VKPKLPLIPGHEGVGVIEEVGPGVTHLKVGDRV GIPWLYSACGHCDYCLSGQETLCE<u>C</u>QQNAGYS VDGGYAEYCRAAADYVVKIPDNLSFEEAAPIFC AGVTTYKALKVTGAKPGEWVAIYGIGGLGHVA VQYAKAMGLNVVAVDLGDEKLELAKQLGADL VVNPKHDDAAQWIKEKVGGVHATVVTAVSKA AFESAYKSIRRGGACVLVGLPPEEIPIPIFDTVLN GVKIIGSIVGTRKDLQEALQFAAEGKVKTIVEVQ PLENINDVFDRMLKGQINGRVVLKVD | SEQ ID NO: 81 |
| Formate dehydrogenase With His Tag *Candida boidinii* | MHHHHHHENLYFQMKIVLVLYDAGKHAADEE KLYGCTENKLGIANWLKDQGHELITTSDKEGG NSVLDQHIPDADIIITTPFHPAYITKERIDKAKKL KLVVVAGVGSDHIDLDYINQTGKKISVLEVTGS NVVSVAEHVLMTMLVLVRNFVPAHEQIINHDW EVAAIAKDAYDIEGKTIATIGAGRIGYRVLERLV PFNPKELLYYDYQALPKDAEEKVGARRVENIEE LVAQADIVTINAPLHAGTKGLINKELLSKFKKG AWLVNTARGAICVAEDVAAALESGQLRGYGG DVWFPQPAPKDHPWRDMRNKYGAGNAMTPH YSGTTLDAQTRYAEGTKNILESFFTGKFDYRPQ DIILLNGEYITKAYGKHDKK | SEQ ID NO: 82 |
| Formaldehyde dehydrogenase R374C *Pseudomonas putida* | MSGNRGVVYLGSGKVEVQKIDYPKMQDPRGK KIEHGVILKVVSTNICGSDQHMVRGRTTAQVGL VLGHEITGEVIEKGRDVENLQIGDLVSVPFNVAC GRCRSCKEMHTGVCLTVNPARAGGAYGYVDM GDWTGGQAEYVLVPYADFNLLKLPDRDKAME KIRDLTCLSDILPTGYHGAVTAGVGPGSTVYVA GAGPVGLAAAASARLLGAAVVIVGDLNPARLA HAKAQGFEIADLSLDTPLHEQIAALLGEPEVDC AVDAVGFEARGHGHEGAKHEAPATVLNSLMQ VTRVAGKIGIPGLYVTEDPGAVDAAAKIGSLSIR FGLGWAKSHSFHTGQTPVMKYNRALMQAIMW DRINIAEVVGVQVISLDDAP<u>C</u>GYGEFDAGVPKK FVIDPHKTFSAA | SEQ ID NO: 83 |
| alcohol dehydrogenase R108C *Geobacillus stearothermophilus* (formerly | MKAAVVEQFKKPLQVKEVEKPKISYGEVLVRIK ACGVCHTDLHAAHGDWPVKPKLPLIPGHEGVG VIEEVGPGVTHLKVGDRVGIPWLYSACGHCDY CLSGQETLCE<u>C</u>QQNAGYSVDGGYAEYCRAAAD YVVKIPDNLSFEEAAPIFCAGVTTYKALKVTGA KPGEWVAIYGIGGLGHVAVQYAKAMGLNVVA | SEQ ID NO: 84 |

TABLE 4-continued

Enzyme Sequences

| ID | AA Sequence | SEQ ID NO: |
|---|---|---|
| Bacillus stearothermo-philus) | VDLGDEKLELAKQLGADLVVNPKHDDAAQWI KEKVGGVHATVVTAVSKAAFESAYKSIRRGGA CVLVGLPPEEIPIPIFDTVLNGVKIIGSIVGTRKDL QEALQFAAEGKVKTIVEVQPLENINDVFDRMLK GQINGRVVLKVD | |
| Formate dehydrogenase Candida boidinii | MKIVLVLYDAGKHAADEEKLYGCTENKLGIAN WLKDQGHELITTSDKEGGNSVLDQHIPDADIIIT TPFHPAYITKERIDKAKKLKLVVVAGVGSDHID LDYINQTGKKISVLEVTGSNVVSVAEHVLMTML VLVRNFVPAHEQIINHDWEVAAIAKDAYDIEGK TIATIGAGRIGYRVLERLVPFNPKELLYYDYQAL PKDAEEKVGARRVENIEELVAQADIVTINAPLH AGTKGLINKELLSKFKKGAWLVNTARGAICVA EDVAAALESGQLRGYGGDVWFPQPAPKDHPW RDMRNKYGAGNAMTPHYSGTTLDAQTRYAEG TKNILESFFTGKFDYRPQDIILLNGEYITKAYGK HDKK | SEQ ID NO: 85 |

In another embodiment, the present invention includes a peptide or an amino acid sequence of about 75% to about 99.9% identical to SEQ ID NO. 80, 81, 82, 83, 84, or 85. In another embodiment, the present invention includes a peptide or an amino acid sequence of about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 98%, about 93%, about 94%, about 95%, about 96%, about 97%, about 98%, about 99%, about 99.1%, about 99.2%, about 99.3%, about 99.4%, about 99.5%, about 99.6%, about 99.7%, about 99.8%, or about 99.9% to SEQ ID NO. SEQ ID NO. 80, 81, 82, 83, 84, or 85.

In another embodiment, the enzyme or enzymes are provided to produce hydrogen. In another embodiment, the enzymes or the oxidoreductase enzymes of the present invention comprises hydrogenase. In another embodiment, the enzyme or enzymes are provided to produce methanol. In a specific embodiment, the enzymes or the oxidoreductase enzymes comprises formate dehydrogenase, formaldehyde dehydrogenase, and/or alcohol dehydrogenase. In another embodiment, the enzymes or the oxidoreductase enzymes include methane monooxygenase. In another embodiment, the enzyme hydrogenase is used as in Example 1. In another embodiment, the enzyme and/or oxidoreductase enzyme are enzymes and/or oxidoreductase enzymes from a pathway that produces methanol as in Examples 2-4. In another embodiment, the enzyme and/or oxidoreductase enzyme are enzymes and/or oxidoreductase enzymes as in Examples 12-18.

Embodiments of the present invention also include:

Embodiment 1: An enzymatic reactor cell, comprising: a surface, a linker or electrode surface linker, and one or more enzymes, wherein the surface is directly linked to the linker or electrode surface linker, and the linker or electrode surface linker is further directly linked to the enzyme.

Embodiment 2: The enzymatic reactor cell of embodiment 1, wherein the enzymatic reactor cell has the following Formula I: [surface-electrode surface linker-enzyme]$_{n(1-10)}$ (Formula I); wherein when n is 2-10, each of the 2-10 [surface-electrode surface linker-enzyme] comprises a different surface, electrode surface linker and/or enzyme from the other [surface-electrode surface linker-enzyme].

Embodiment 3: The enzymatic reactor cell of embodiment 2, wherein the surface is an electrode surface.

Embodiment 4: The enzymatic reactor cell of any one of embodiments 1-3, wherein the surface or electrode surface is an organic or inorganic surface.

Embodiment 5: The enzymatic reactor cell of embodiment 4, wherein the surface or electrode surface is a metal, a polymer, a biological surface and/or crystalline.

Embodiment 6: The enzymatic reactor cell of any one of embodiments 1-4, wherein the surface or electrode surface comprises one or more selected from the group consisting of graphite, platinum, zinc oxide, cellulose, polystyrene, gold, gold alloy, gold palladium alloy, and the metal oxides iron oxide, titanium oxide, and manganese oxide.

Embodiment 7: The enzymatic reactor cell of embodiment 6, wherein the surface or electrode surface is planar, non-planar, spherical, in the shape of nanoparticles, an aerogel, and fibrous.

Embodiment 8: The enzymatic reactor cell of any one of embodiments 1-7, wherein the surface or electrode surface is planar.

Embodiment 9: The enzymatic reactor cell of any one of embodiments 1-8, wherein the surface is conductive, thereby allowing electron transfer from the enzyme, and the surface, and wherein the enzyme can be an oxidoreductase enzyme.

Embodiment 10: The enzymatic reactor cell of any one of embodiments 1-9, wherein the linker or electrode surface linker comprises a surface binding moiety (SBM).

Embodiment 11: The enzymatic reactor cell of embodiment 10, wherein the surface binding moiety (SBM) comprises a material binding peptide (MBP).

Embodiment 12: The enzymatic reactor cell of embodiment 9, wherein the linker or electrode surface linker is conductive, thereby allowing electron transfer from the enzyme and the surface and comprises a surface binding moiety (SBM).

Embodiment 13: The enzymatic reactor cell of embodiment 9, wherein the linker or electrode surface linker allowing election transfer comprises a peptide, protein, a chemical polymer, or polynucleotide.

Embodiment 14: The enzymatic reactor cell of embodiment 13, wherein the linker or electrode surface linker comprises a peptide.

Embodiment 15: The enzymatic reactor cell of embodiment 13, wherein the linker or electrode surface linker comprises a gold binding motif, graphene binding motif, platinum binding motif, AuPD binding motif, cellulose binding motif, silica binding motif, PDMS binding motif, ZnO binding motif, or polystyrene binding motif.

Embodiment 16: The enzymatic reactor cell of embodiment 13, wherein the linker or electrode surface linker comprises a protein.

Embodiment 17: The enzymatic reactor cell of embodiment 14 or 16, wherein the peptide or protein is a protein or peptide nanowire base.

Embodiment 18: The enzymatic reactor cell of embodiment 17, wherein the protein or peptide nanowire base comprises a material binding peptide, a short conductive peptide, and/or one or more ferredoxins.

Embodiment 19: The enzymatic reactor cell of embodiment 18, wherein the one or more ferredoxins comprises one or more FeS clusters.

Embodiment 20: The enzymatic reactor cell of embodiment 18 or 19, wherein the one or more ferredoxins comprises a chain of ferredoxins.

Embodiment 21: The enzymatic reactor cell of embodiment 18, wherein the protein or peptide nanowire base is a short conductive peptide.

Embodiment 22: The enzymatic reactor cell of embodiment 21, wherein the short conductive peptide is a peptide comprising W, Y and F residues.

Embodiment 23: The enzymatic reactor cell of embodiment 21, wherein the short conductive peptide comprises one or more amino acid sequences from SEQ ID Nos: 1-49.

Embodiment 24: The enzymatic reactor cell of any one of embodiments 10-23, wherein the surface binding moiety (SBM) is immobilized to the linker or electrode surface linker by irreversible or reversible immobilization.

Embodiment 25: The enzymatic reactor cell of embodiment 24, wherein the surface binding moiety (SBM) is immobilized to the surface or electrode surface, and/or the enzyme by irreversible mobilization, wherein the irreversible mobilization is by covalent binding, cross-linking and/or entrapment.

Embodiment 26: The enzymatic reactor cell of embodiment 25, wherein the surface binding moiety (SBM) is covalently bonded to the surface or electrode surface, another portion of the linker, and/or the enzyme.

Embodiment 27: The enzymatic reactor cell of embodiment 26, wherein the surface binding moiety (SBM) is covalently bonded by click chemistry, dithiol bond formation, Michael addition, nucleophilic substitution, a metal-sulfur bond linkage, or enzyme catalyzed conjugation.

Embodiment 28: The enzymatic reactor cell of embodiment 26, wherein the surface binding moiety (SBM) is covalently bonded by continuous protein expression wherein the surface binding moiety (SBM) is a continuous protein with another portion of the linker or electrode surface linker; the surface binding moiety (SBM) is a continuous protein with the enzyme; or the surface binding moiety (SBM) is a continuous protein with another portion of the linker or electrode surface linker, and the enzyme.

Embodiment 29: The enzymatic reactor cell of embodiment 24, wherein the surface binding moiety (SBM) is bound to the electrode surface/surface or enzyme by reversible mobilization, wherein the reversible mobilization comprises binding by physisorption, bioaffinity, a metal-sulfur bond linkage, and chelation/metal binding.

Embodiment 30: The enzymatic reactor cell of embodiment 29, wherein the bioaffinity reversible mobilization is by biotin/streptavidin, or a His tag.

Embodiment 31: The enzymatic reactor cell of any one of embodiments 1-30, wherein the enzymatic reactor cell comprises one enzyme and performs a single enzymatic reaction in said enzymatic reactor cell.

Embodiment 32: The enzymatic reactor cell of any one of embodiment 1-30, wherein the enzymatic reactor cell comprises more than one enzyme and performs more than one enzymatic reaction in said enzymatic reactor cell.

Embodiment 33: The enzymatic reactor cell of embodiment 32, wherein the more than one enzymatic reaction in said enzymatic reactor cell is a multi-step pathway.

Embodiment 34: The enzymatic reactor cell of embodiment 31 or 32, wherein the enzymes are mutant and/or wild-type enzymes.

Embodiment 35: The enzymatic reactor cell of embodiment 33, wherein the multi-step pathway is a biological pathway.

Embodiment 36: The enzymatic reactor cell of any one of embodiments 31-35, wherein one or more enzymes are linked to the electrode surface, and one or more enzymes are not linked to the surface or electrode surface by the electrode surface linker.

Embodiment 37: The enzymatic reactor cell of embodiment 36, wherein the reactor cells includes more than one enzyme in a multi-step enzymatic pathway.

Embodiment 38: The enzymatic reactor cell of embodiment 37, wherein the multi-step pathway is a biological pathway.

Embodiment 39: The enzymatic reactor cell of any of embodiment 31-38, wherein the surface or electrode surface is the anode, the cathode or both.

Embodiment 40: The enzymatic reactor cell of any one of embodiment 31-39, wherein the enzyme comprises hydrogenase, formate dehydrogenase, formaldehyde dehydrogenase, and/or alcohol dehydrogenase.

Embodiment 41: The enzymatic reactor cell of embodiment 40, wherein the enzyme comprises hydrogenase.

Embodiment 42: The enzymatic reactor cell of embodiment 41, wherein the enzymatic reactor cell produces hydrogen.

Embodiment 43: The enzymatic reactor cell of embodiment 41 or 42, wherein the enzymatic reactor cell comprises $H_2O$, wherein the enzyme hydrogenase is linked to the electrode surface and catalyzes protons and elections to hydrogen ($2H^+ + 2e''$ to $H_2$).

Embodiment 44: The enzymatic reactor cell of embodiment 40, wherein the oxidoreductase enzyme comprises formate dehydrogenase, formaldehyde dehydrogenase, and/or alcohol dehydrogenase Embodiment 45: The enzymatic reactor cell of any one of embodiments 31-44, wherein the enzymatic reactor cell comprises methane monooxygenase.

Embodiment 46: The enzymatic reactor cell of embodiment 45, wherein the methane monooxygenase is immobilized or not immobilized on the electrode surface.

Embodiment 47: The enzymatic reactor cell of embodiment 44, wherein the enzymatic reactor cell comprises formate dehydrogenase, formaldehyde dehydrogenase, or alcohol dehydrogenase immobilized on the electrode surface.

Embodiment 48: The enzymatic reactor cell of any one of embodiments 1-40 or 44-47, wherein the enzymatic reactor cell produces methanol.

Embodiment 49: The enzymatic reactor cell of embodiment 48, wherein a starting agent or substrate comprises carbon dioxide, formic acid, or formaldehyde.

Embodiment 50: The enzymatic reactor cell of embodiment 48, wherein a starting agent or substrate comprises carbon dioxide and/or methane.

Embodiment 51: A plurality of the enzymatic reactor cells of embodiments 1-50.

Embodiment 52: The plurality of enzymatic reactor cells of embodiment 51, wherein the plurality of the enzymatic reactor cells or in a series or are parallel.

Embodiment 53: A method of performing an enzymatic reaction or enzymatic pathway with the use of an enzymatic reactor cell of any one of embodiments 1-50 or a plurality of enzymatic reactor cells of embodiment 51 or 52.

EXAMPLES

Example 1: Producing Hydrogen

The following example utilizes the use of hydrogenase to produce hydrogen in an enzymatic reactor cell. The configuration is used as provided in FIG. 1 wherein the reactor cell comprises an anode and cathode. The enzyme (hydrogenase) is immobilized to a planar surface of the reactor cell by the use of a linker that specifically binds to the surface using a surface binding moiety. The linker is covalently attached to the hydrogenase via the use of a metal-sulphur bond. The reactor cell includes water which is used in the reactor as the proton source. See FIG. 1. The surface with the immobilized enzyme is used as the cathode for electron transfer of electrons with the protons used to create hydrogen ($H_2$). The hydrogen is produced in the reactor cell under the following conditions: temperature range: 20-40° C.; pH range: 5.5-8.5; current density: 0.01 to 200 mA/cm$^2$ with a resistance (1 m2 electrode area) of <1000Ω and a voltage range: <2.5V. The reactor cell provides a purity of 50-90 percent and a yield of 50-90 percent.

Example 2: Producing Methanol from Carbon Dioxide-Multiple Reactor Cells

The following example utilizes formate dehydrogenase, formaldehyde dehydrogenase, and/or alcohol dehydrogenase to produce methanol in an enzymatic reactor cell. The configuration is used as provided in FIG. 2 wherein the reactor cell comprises an anode and cathode. In this example, the enzymes are immobilized a surface wherein the enzymes are immobilized to the surface as the cathode. Formate dehydrogenase utilizes carbon dioxide, which is added to the reactor cell to produce formic acid. The formic acid is introduced to a separate reactor cell, wherein the formic acid is converted by formaldehyde dehydrogenase to formaldehyde. In this second reactor cell, the formaldehyde dehydrogenase is immobilized to the cathode surface by the use of a linker that specially binds to the cathode surface by a surface binding moiety. In a third reactor cell, the formaldehyde is then introduced and converted to methanol by alcohol dehydrogenase wherein the enzyme is immobilized to the cathode surface. The methanol is produced in the reactor cells under the following conditions: temperature range: 20-40° C.; pH range: 5.5-8.5; current density 0.01 to 200 mA/cm$^2$ with a resistance (1 m2 electrode area) of <1000Ω and a voltage range: <3V. The reactor cell provides a purity of 50-90 percent and a yield of 50-90 percent.

Example 3: Producing Methanol from Carbon Dioxide-Single Reactor Cell

Methanol is produced under the same conditions as Example 2, but all three enzymatic reactions in the pathway are performed in a single reaction cell, wherein each enzyme is immobilized onto the cathode surface.

Example 4: Producing Methanol from Carbon Dioxide and Methane

Figure 3:
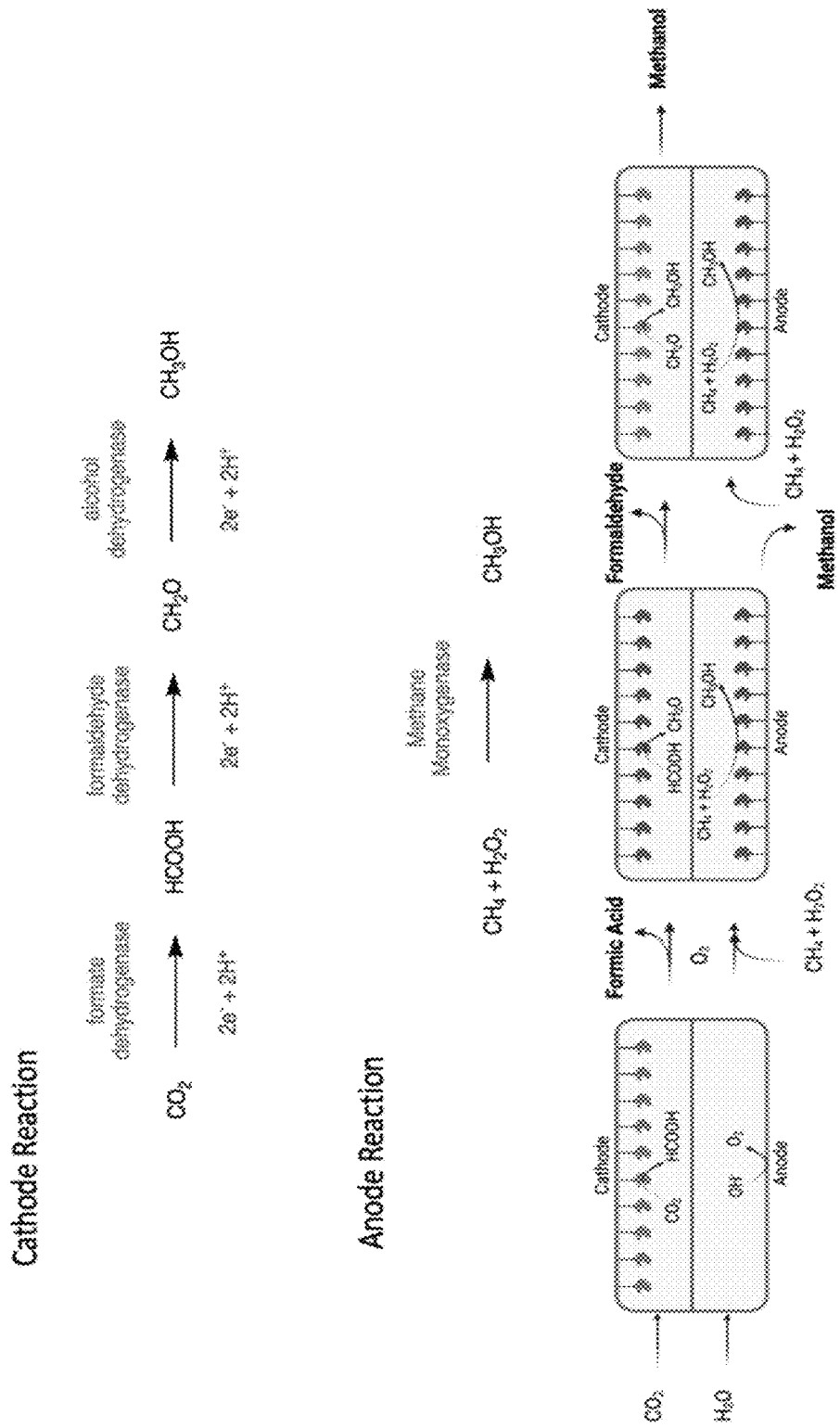
FIG. 3 illustrates a series of reactor cells for producing methanol from carbon dioxide and methane.

The following example utilizes formate dehydrogenase, formaldehyde dehydrogenase, alcohol dehydrogenase and methane monooxygencase to produce methanol in an enzymatic reactor cell. The configuration is used as provided in FIG. 3 wherein the reactor cell comprises an anode and cathode. In this example, separate enzymes are immobilized on either the cathode surface or the anode surface. Formate dehydrogenase utilizes carbon dioxide, which is added to the reactor cell to produce formic acid. The formic acid is introduced to a separate reactor cell, wherein the formic acid is converted by formaldehyde dehydrogenase to formaldehyde. In this second reactor cell, the formaldehyde dehydrogenase is immobilized to the cathode surface by the use of a linker that specially binds to the cathode surface by a surface binding moiety. In a third reactor cell, the formaldehyde is then introduced and converted to methanol by alcohol dehydrogenase wherein the enzyme is immobilized to the cathode surface. Methane can also be introduced in all reactors wherein methane monooxygenase is immobilized to the cathode surface and converts methane to methanol. The methanol in each scenario is produced in the reactor cells under the following conditions: temperature range: 20-40° C.; pH range: 5.5-8.5; current density: 0.01 to 200 mA/cm$^2$ with a resistance (1 m2 electrode area) of <10000Ω and a voltage range: <3V. The reactor cell provides a purity of 50-90 percent and a yield of 50-90 percent.

Example 5: Assess the Current Flowing Through Different Reactor Cells

Figure 4:
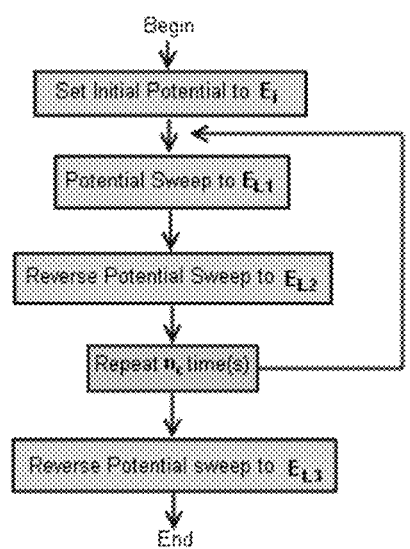
FIG. 4 provides a general diagram for cyclic voltammetry

The reactor cells of the present invention are tested for current at a range of different voltages. The reactor cells of the present invention were tested for current at a range of different voltages. Specifically, to a cleaned and polished working electrode (e.g., 0.197 Glassy Carbon Disk, Pine Research Instrumentation) cm2) a volume of biomaterial was deposited such that the electrode surface was entirely covered by the droplet (e.g., 30 μL). After an appropriate amount of time (e.g., 10 minutes) the excess solution was rinsed from the electrode surface. To an appropriate container (3-electrode flask, h-cell, etc.), the counter electrode was added (e.g., Pt wire, Graphite Rod.), saturated Ag/AgCl reference electrode, electrolyte (e.g., 1×PBS, to test alcohol dehydrogenase: 20 mM NaPi+10 mM formaldehyde pH 6.5). A cyclic voltammetry run was then carried out. For reactor cells with alcohol dehydrogenase, the parameters used were: starting voltage: 0V vs NHE; final voltage: -1 V vs NHE, scan rate: 3 mV/s; number of cycles: 3-10. FIG. 4 provides a general diagram for this test.

Example 6: Assess the Stability and Activity of the Reactor Cell

To a cleaned and polished working electrode (e.g., 0.09 cm$^2$ basal plane pyrolytic graphite surrounded by a non-conductive epoxy) deposit a volume of biomaterial (such as enzyme and a linker with a material binding peptide) such that the electrode surface is entirely covered by the droplet (e.g., 5 μL). After about 30 seconds, the excess solution is removed off of the electrode surface.

To an appropriate container (3-electrode flask, crucible, etc.), the platinum counter electrode (e.g., mesh, wire, flag, etc.), saturated Ag/AgCl reference electrode, electrolyte (e.g., 1×PBS, to test alcohol dehydrogenase: 20 mM NaPi+5 mM formaldehyde pH 6), with an optional stir bar is added.

The chronoamperometry run is then carried out. The stability of the material binding peptide is tested with the parameters as follows: Time: 30 minutes; and Fixed potential: −0.5 V vs SHE, −1 V vs SHE, −1.5 V vs SHE.

The activity and stability of the enzyme, such as alcohol dehydrogenase is tested with the following parameters: Time: 30 minutes; Fixed potential: −0.7 V vs SHE. In another method, the reactor cells of the present invention are tested for current at a range of different voltages. Specifically, to a cleaned and polished working electrode (e.g., 0.197 Glassy Carbon Disk, Pine Research Instrumentation) cm2) a volume of biomaterial is deposited such that the electrode surface is entirely covered by the droplet (e.g., 30 μL). After an appropriate amount of time (e.g., 10 minutes) the excess solution is rinsed from the electrode surface. To an appropriate container (3-electrode flask, h-cell, etc.), the counter electrode is added (e.g., Pt wire, Graphite Rod.), saturated Ag/AgCl reference electrode, electrolyte (e.g., 1×PBS, to test alcohol dehydrogenase: 20 mM NaPi+10 mM formaldehyde pH 6.5). A chronoamperometry run is then carried out. For reactor cells with alcohol dehydrogenase, the parameters used are: −1 V vs NHE for 2 hours or longer as needed.

Example 7: Electrical Impedance Spectroscopy Study

This study determines the resistance intrinsic to the reactor cell. To a cleaned and polished working electrode e.g., 0.197 cm2 Glassy Carbon Disk, Pine Research Instrumentation) a volume of biomaterial is deposited such that the electrode surface is entirely covered by the droplet (e.g., 30 μL). After about 10 minutes, the excess solution is removed off of the electrode surface. To an appropriate container (3-electrode flask, crucible, etc.), the counter electrode (e.g., Pt mesh, Pt wire, graphite rod, etc.), saturated Ag/AgCl reference electrode, electrolyte (e.g., 1×PBS, to test alcohol dehydrogenase: 20 mM NaPi+10 mM formaldehyde pH 6.5). The electrical impedance is then run with a fixed current or voltage, applying a perturbation, and scan across a range of frequencies.

Example 8: Enzyme Activity Assay

To test for the production of formic acid in the reactor cell, to a 100 μL sample, add 200 μL citric acid reactant solution (50 mg citric acid and 1 mg acetamide dissolved in 10 mL IPA).

Centrifuge slightly cloudy solutions for 10 minutes using a bench centrifuge. Add the supernatant (~300 μL) to 8 μL sodium acetate solution (30% w/v). Then add 700 μL acetic anhydride. Next the sample is incubated for 2 hours at 50° C. Formic acid samples produced from the reactor cells turn red, and samples are recorded at record $A_{515}$.

To test for the production of formaldehyde in the reactor cell, mix 700 μL reaction mixture with 700 μL Nash's reagent (3.08 g ammonium acetate, 0.04 mL acetyl acetone, 0.06 mL glacial acetic acid, water up to 20 mL). Then heat the mixture for 10 minutes at 60° C. before cooling to room temperature for 10 minutes. Formaldehyde samples produced from the reactor cells turns yellow, and samples are recorded at $A_{412}$.

To test for the activity of formaldehyde dehydrogenase in the reactor cells, prepare appropriate buffer (e.g., buffer A=100 mM NaPi, pH 6.0, buffer B=100 mM phosphate buffer, pH 6.50). Then 10 mM NADH is added to the reactor cell comprising the formaldehyde dehydrogenase. A sample is then tested by monitoring NADH oxidation by change in absorbance at 340 nm. To test for the activity of alcohol dehydrogenase in the reactor cells, the same test is performed on the reactor cell comprising alcohol dehydrogenase.

In another method, to test for the activity of formaldehyde dehydrogenase in the reactor cells, prepare appropriate buffer (e.g., 50 mM sodium phosphate, 0.25 mM formaldehyde) and combine with 5 mM NAD+, then apply to enzyme sample. When combined with a sample containing formaldehyde dehydrogenase NAD+ reduction may be monitored by a change in absorbance at 340 nm to verify enzyme activity. To test for the activity of alcohol dehydrogenase the same concept is applied to the reactor cell comprising alcohol dehydrogenase. The same concept is applied to the reactor cell comprising formate dehydrogenase.

Example 9: Conjugating a Material Binding Peptide to a PEG Based Nanowire

A PEG of preferred MW was prepared in a stock solution (e.g., 1.4 mg into 100 μL DMSO). The material binding peptide was then primed (e.g., 550 μL of 0.75 mg/mL in 100 mM NaPi, 150 mM NaCl, pH 7.0), and the PEG solution (e.g., 50 μL, 5 eq.) was added. The solution was stirred for an appropriate amount of time (e.g., 5 minutes, 7 minutes) in the absence of light at room temperature. The reaction mixture was loaded directly to 4 pre-equilibrated PD-G10 columns. 400 μL of equilibration buffer (10 mM NaPi, 150 mM NaCl pH=6.5) was used to wash the columns before a further 500 μL of this same buffer was used to elute the peptide. Both 1:1 and 2:1 (PEG:MBP) ratios should be observed.

Example 10: Conjugating a Material Binding Peptide Linked to a PEG Based Nanowire with Dithiol Degas $H_2O$ and DMSO by bubbling $N_2$ through solutions for ~30 min. The material binding peptide-PEG (0.485 mg in 900 μL 10 mM phosphate, 150 mM NaCl, pH 6.5,) is then degassed by bubbling $N_2$ for ~1 min. 1.6 hexanedithiol is dissolved (3.5 mg, 50 eq.) and degassed in DMSO (100 μL). TCEP-HCl (65 mg, 0.23 mmol) is then dissolved and in 90 μL of degassed 1 M NaOH. TCEP-HCl is added to the dithiol solution (approximately 90 μL of each, 5 eq. vs 1,6-hexanedithiol). 90 μL of DMSO is further added. Head space is flushed with $N_2$ and allow to react at room temp, under $N_2$, for 90 minutes. The reduced hexanedithiol is then added (100 μL, 29 eq.) to the degassed peptide solution. The Reaction is completely clear and colourless and then stirred, in the absence of light, at room temperature for 5 h. The reaction mixture is moved to G10 columns, for purification using manufacturer instructions.

Example 11: Conjugating a Material Binding Peptide Linked to a PEG Based Nanowire and Dithiol to an Enzyme An appropriate excess amount of mutant alcohol dehydrogenase or enzyme of choice (e.g., 200 μL of 0.91 mg/mL) is added with the material binding peptide-PEG-dithiol construct (e.g., 20 µL, 0.44 mg/mL) and allow to react for a suitable amount of time (e.g., 1 hour).

Example 12: Enzymatic Reactor Cell Including Alcohol Dehydrogenase

The assembly of an enzymatic reactor cell utilising a 96 well polystyrene plate is described below.

In this example, the surface of the reactor cell is polystyrene and is attached to a surface linker using a polystyrene MBP (SEQ ID NO: 17) and the use of a dsDNA nanowire (combination of amine modified SEQ ID NOs: 52 and 53) directly attached to alcohol dehydrogenase.

The assembly of this reactor cell in each well of the polystyrene plate is as follows:

Step 1—100 µL of 1 mg/ml of SEQ ID NO: 17, 140.2 µL of 10 mg/mL disuccinimidyl suberate (DSS), and 182.7 µL of ssDNA2 (amine modified SEQ ID NO: 53) were combined and diluted to 600 µL. This reaction was then allowed to proceed for 3 h30 m in the dark at room temperature. Reaction mixture was run on a pre-equilibrated PD-G10 column into $H_2O$ (as per manufacturer's instructions).

Step 2—50 eq. of DSS, 1.2 eq. of alcohol dehydrogenase, and 1 eq. of ssDNA1 (amine modified SEQ ID NO: 52) were combined and diluted to 300 µL. This reaction was then allowed to proceed for 3 h30 m in the dark at room temperature. Reaction mixture was run on a pre-equilibrated PD-G10 column into $H_2O$ (as per manufacturer's instructions).

Step 3—The product of Step 1 and the product of Step 2 were combined at a ratio of 2:1 respectfully and allowed to react for 30 minutes at room temperature in the dark. The mixture was then concentrated twice on a 10K centrifugal concentrator by adding 200 µL of 10 mM sodium phosphate buffer, with 150 mM sodium chloride (NaCl), pH 6.5 and spinning at 12000 RCF for 10 minutes. This concentration step was repeated using 500 µL of buffer instead.

Step 4—50 µL of 0.2 mg/mL of either the product of Step 3 above or a negative control of just alcohol dehydrogenase was loaded on a 96-well plate comprising polystyrene surface. After 2 hours of incubation, solutions were removed and wells were washed with 50 µL of water ($H_2O$). Reaction buffers were added to each well including buffers for the control reactions and the absorbance at 340 nm ($A_{340}$) was collected immediately for 1 hour.

The $A_{280}$ of the products from Step 3 or the just alcohol dehydrogenase was measured before and after addition to the 96-well plate.

The initial concentration of the product of Step 3 was measured before being loaded to the polystyrene and was calculated as 8.99 µM. The same solution after the reaction to the polystyrene surface of step 4 was at 4.37±1.98 µM in the removed solution, indicating that about 4.62±1.98 µM of the product from Step 3 was loaded to the polystyrene surface.

Enzymatic activity of the alcohol dehydrogenase reactor cell was determined by an NADH consumption assay. Reaction buffers comprising NADH were added to each well including buffers for the control reactions and the absorbance at 340 nm ($A_{340}$) was collected immediately for 1 hour.

Figure 5:
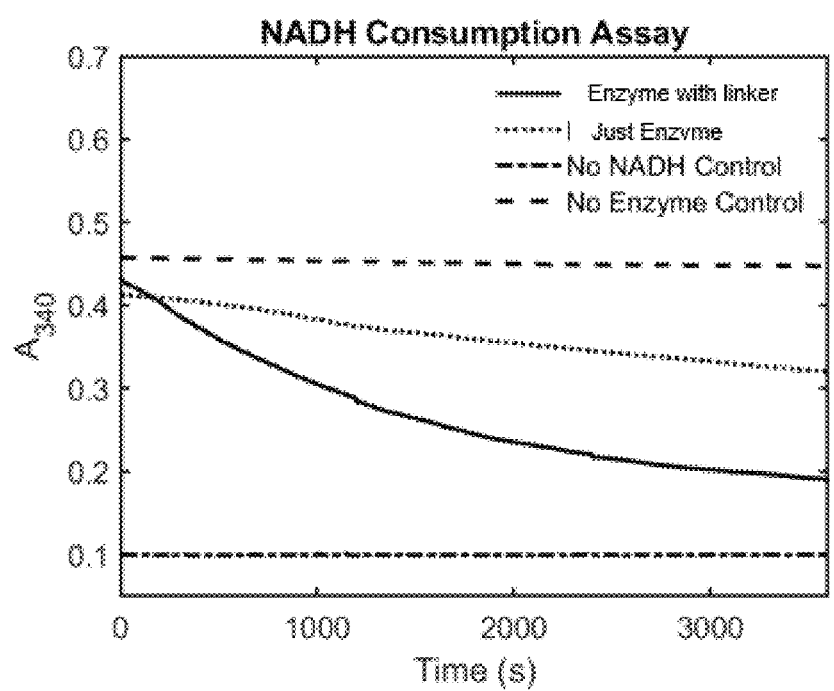
FIG. 5 illustrates an NADH consumption assay in the reactor cell alcohol dehydrogenase attached to a linker and attached to a polystyrene surface in comparison to just alcohol dehydrogenase alone.

As shown in FIG. 5, this figure demonstrates higher enzyme activity when the alcohol dehydrogenase attached to a linker and attached to a polystyrene surface over just the enzyme alone (no linker), although some residual activity can be seen for enzyme alone. The increase in activity of the enzyme with the linker is expected due to the polystyrene binding sequence attached to the enzyme. The small amount of activity observed for enzyme only is likely due to non-specific binding to the 96-well plate. The positive control (no enzyme) shows the maximum amount of NADH with no conversion possible. The negative control shows the lower limit at which no NADH is detected.

Example 13: Enzymatic Reactor Cell Including Alcohol Dehydrogenase on Carbon Surface The assembly of an enzymatic reactor cell utilising a reactor cell with a glassy carbon surface is described below. First, a TFP-dPEG$_2$Mal stock was prepared by dissolving 1.5 mg into 150 µL of DMF (21 mM). A peptide (graphite MBP (SEQ ID NO: 25)), was prepared (300 µL of 1 mg/mL, freshly dissolved) in Buffer A (50 mM NaPi, pH 7.5. 5% DMF). The PEG$_2$MAL solution was added to the peptide (14 µL stock solution+14 µL DMF, 1.5 eq.) and stir for 7 min After 7 min remove 300 µL to a pre-equilibrated (see equilibration buffer below) PD-G10 columns. Columns were equilibrated following manufacturer directions with Equilibration Buffer (Buffer B): 10 mM NaPi, 150 mM NaCl pH=6.5. To each a further 400 µL of equilibration buffer was added and allowed to fill the bed volume. Finally, 500 µL of equilibration buffer was added to elute the peptide Reserved 20 µL for MALDI and a further 50 µL for other controls.

Enzyme 100 µL (6.7 mg/mL, 178 µM) was combined with 225 µL of MBP-PEG eluted from the column above. In parallel a control with enzyme alone (100 µL) was combined with pH 6.5 buffer (225 µL). Stir at room temp for a total Reaction time: 3 h At 3 h remove full reaction mixture to a 10k MWCO spin column. Successful conjugation was determined by Ellman's assay.

The assembly of this reactor cell of on the carbon surface is thus similar to Example 6 above. The enzyme-linker-surface construct for this reactor cell as follows: Alcohol dehydrogenase with an R108C mutation as the enzyme, the material binding peptide is a graphite MBP (SEQ ID NO: 25), wherein the enzyme and graphite MBP are linked per maleimide functionalized PEG linker.

In a negative control, the enzyme alcohol dehydrogenase was added just as an enzyme, i.e., no MBP means to bind to the glassy carbon surface.

Figure 6:
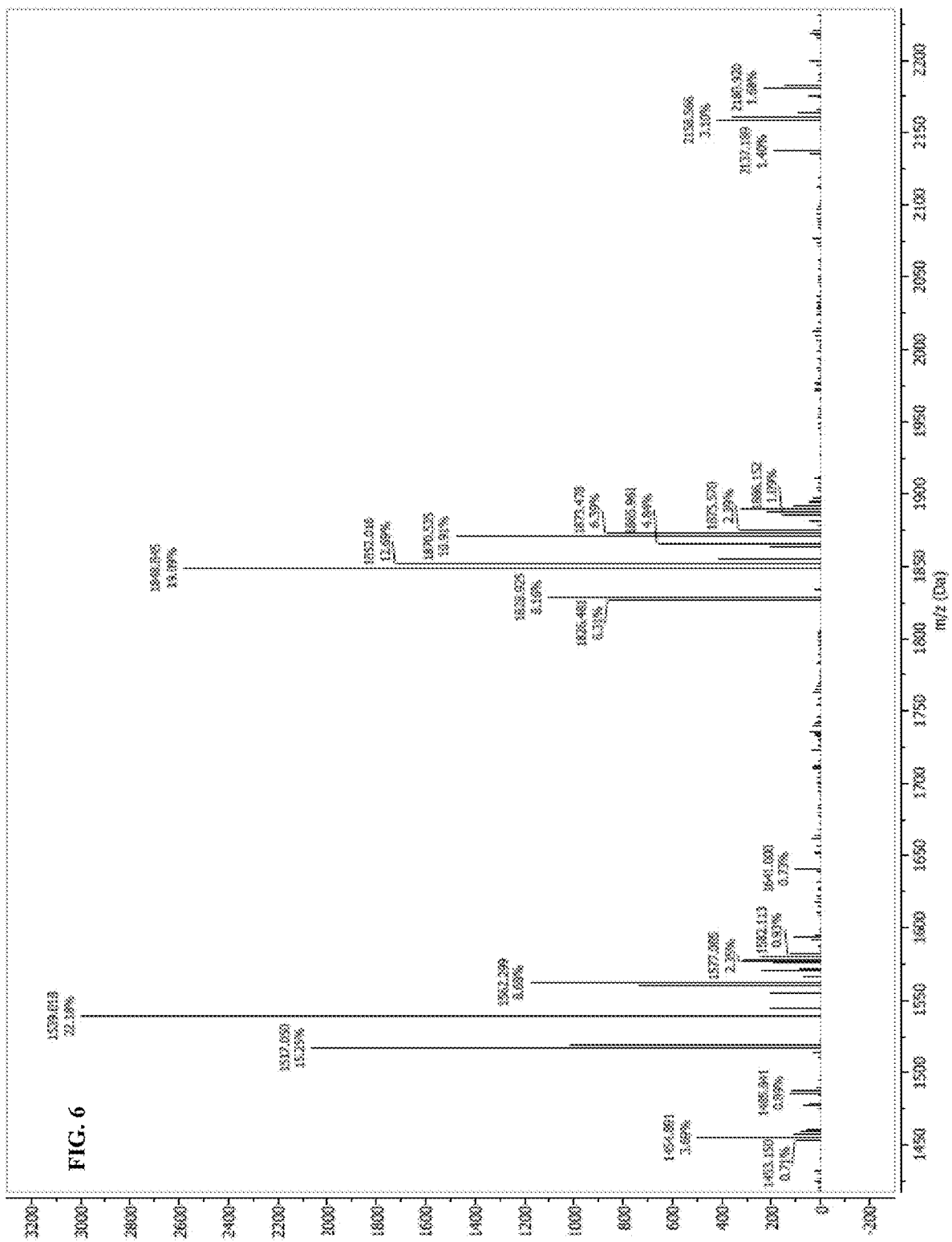
FIG. 6 illustrates mass spectrometry data of modified graphite MBP and unmodified graphite MBP.

The mass spectrometry data shown in FIG. 6 demonstrates the successful coupling of the pegylated nanowire (maleimide functionalized PEG linker) and graphite MBP. Masses for unmodified MBP and the modified MBP are both observed (+310 Da) at 1517.050 Da and 1828.925 Da, respectively. It is important to note that further conjugation reactions lead to the removal of any unmodified MBP so the peak at 1517.050 Da is not a concern.

Figure 7:
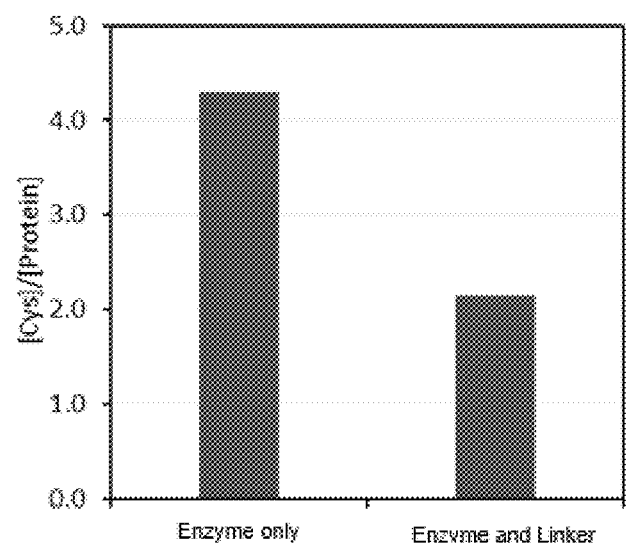
FIG. 7 illustrates conjugation of alcohol dehydrogenase to a graphite MBP linker.

FIG. 7 demonstrates the successful conjugation of alcohol dehydrogenase to the graphite MBP linker. Briefly, plots were obtained by treatment of protein samples with Ellman's reagent and the resultant 412 nm absorbance used to compare samples (values are normalized to total protein concentration and converted to concentration via a calibration curve). As shown, fewer surface cysteines were detected for enzyme plus linker (lower [Cys]/[Protein] ratio) relative to the untreated enzyme, indicating linker attachment to cysteine residues of the enzyme alcohol dehydrogenase.

Figure 8:
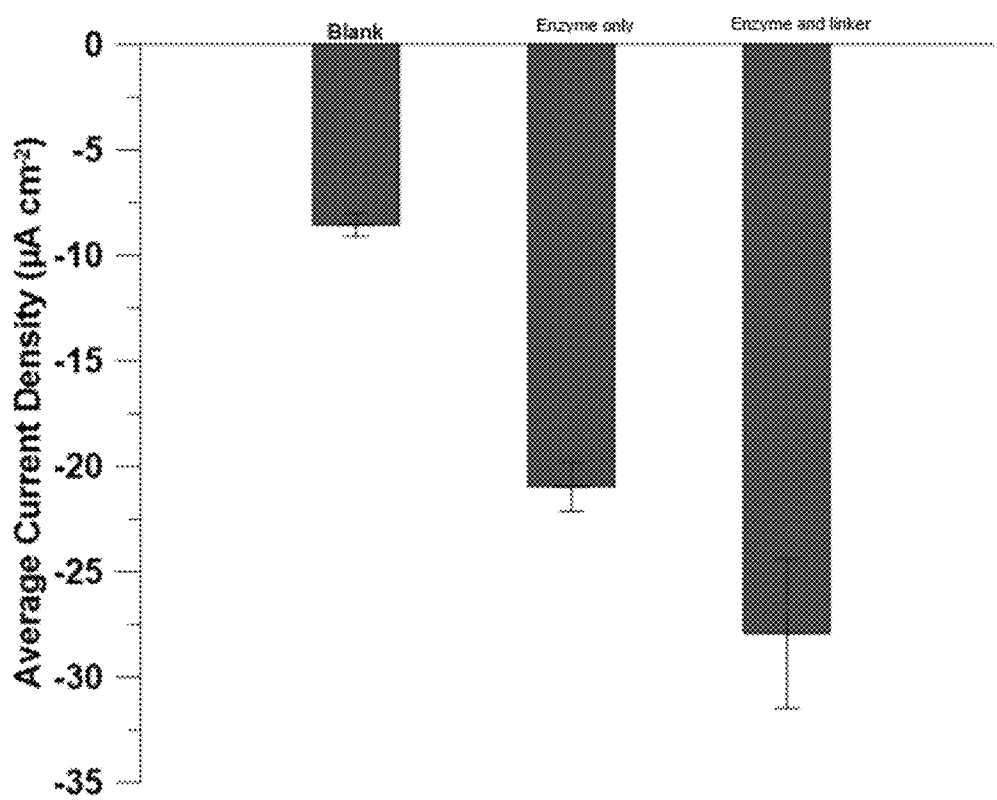
FIG. 8 illustrates average current density of 3 replicates for the blank, enzyme alcohol dehydrogenase only, and the contrast of alcohol dehydrogenase pegylated with a graphite MBP on the glassy carbon surface.

FIG. 8 shows a bar chart of the average current density of 3 replicates for the blank, enzyme only, and enzyme-pegylated graphite MBP construct on the glassy carbon surface, indicating an increase of binding and to the surface compared to just the enzyme with no peptide linker and thus an increase in catalytic activity.

Figure 9:
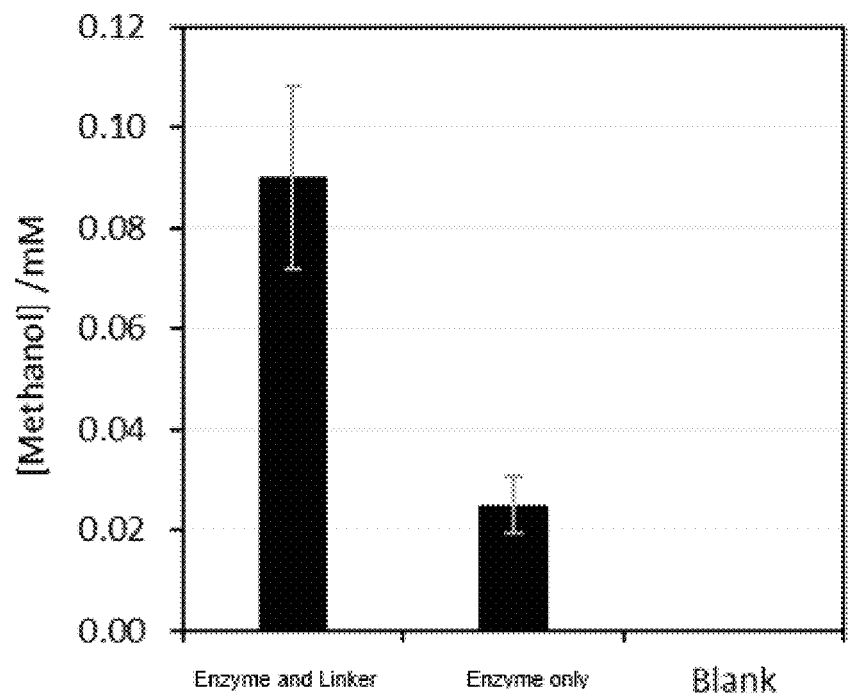
FIG. 9 illustrates methanol production in a reactor cell comparing alcohol dehydrogenase conjugated to a pegylated graphite MBP construct or just the enzyme alone.

The confirmation of successful conjugation and activity of alcohol dehydrogenase were confirmed by measuring existence of methanol in the reactor cell. As shown in FIG. 9, methanol production was shown to be significantly higher for alcohol dehydrogenase conjugated to a pegylated graphite MBP construct (n=4, where n is the number of replicates) than observed for just alcohol dehydrogenase (n=4, where n is the number of replicates). Concentrations determined by gas chromatography, samples tested were produced from 5 hour chronoamperometry experiments (−1.0 V). For this blank (n=2, where n is the number of replicates) the buffer without formaldehyde was treated in the same conditions as the above for 16 hrs.

Example 14: Enzymatic Reactor Cell Including Formaldehyde Dehydrogenase on Carbon Surface The assembly of an enzymatic reactor cell utilising a reactor cell with a glassy carbon surface is described below.

The assembly of this reactor cell of on the carbon surface is similar to Example 6 above. The enzyme-linker-surface construct for this reactor cell as follows: Formaldehyde dehydrogenase as the enzyme, the material binding peptide is a graphite MBP (SEQ ID NO. 25). The nanowire that connects the graphite MBP to the enzyme is by chemical means with a glutaraldehyde nanowire.

Figure 10:
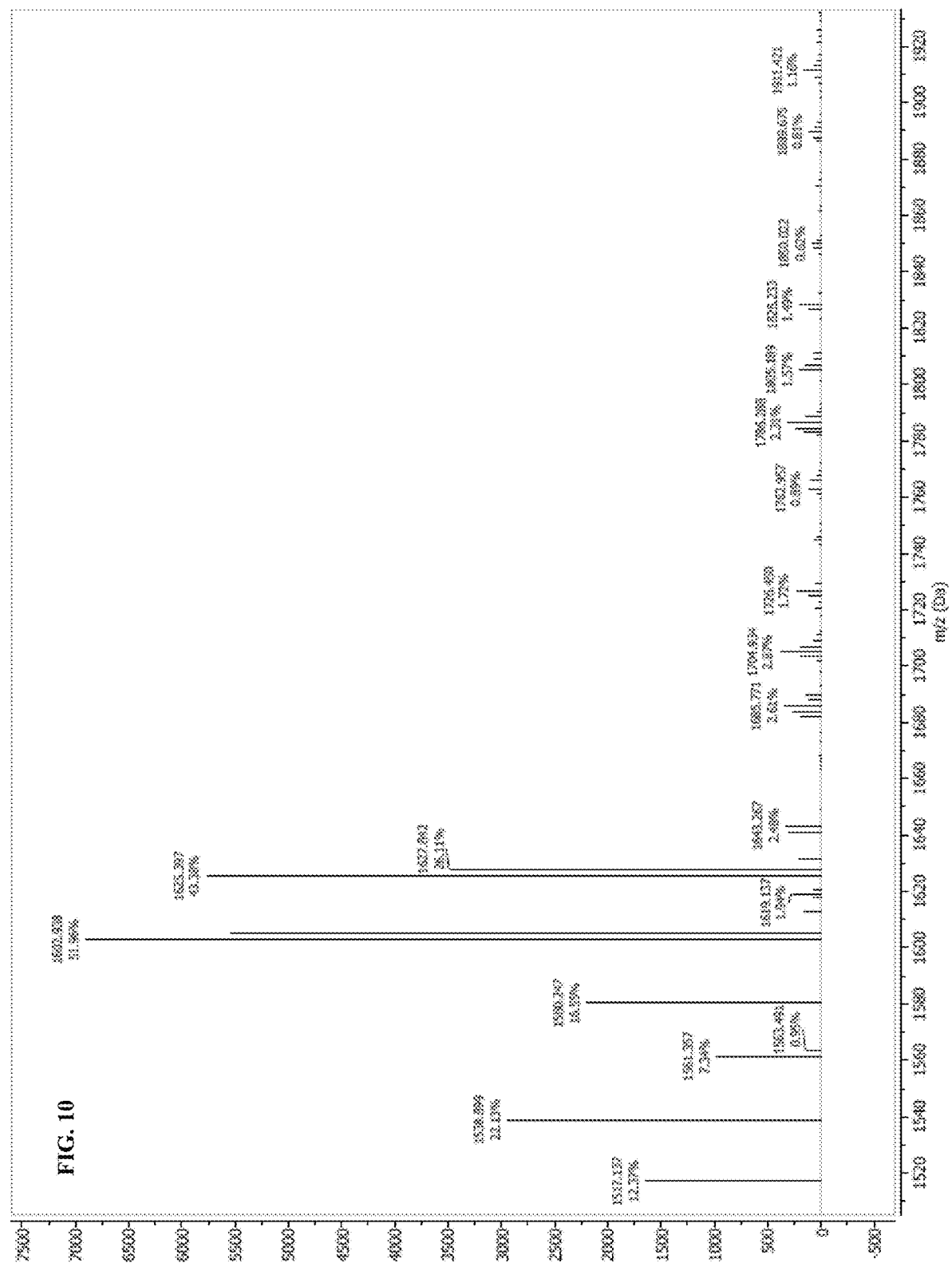
FIG. 10 illustrates a mass spectrometry data indicating the successful coupling of graphite MBP to the glutaraldehyde nanowire.

The conjugation of the graphite MBP to the glutaraldehyde nanowire as step 1 is confirmed by the mass spectrometry in FIG. 10. Specifically, FIG. 10 demonstrates the successful coupling of graphite MBP to the glutaraldehyde nanowire. Masses for unmodified graphite MBP peptide and the graphite MBP-glutaraldehyde conjugate were both observed (+84 Da) at 1517.050 Da and 1602.9 Da, respectively. It is important to note that further conjugation reactions lead to the removal of any unmodified peptide so the peak at 1517.050 Da is not a concern.

In the next step, the enzyme is conjugated to the graphite MBP-glutaraldehyde conjugate and due to the graphite MBP, attached to the glassy carbon surface. Specifically, this was achieved by the use of glassy carbon disks, which were polished using an 0.3 um Alumina slurry that went through a double-rinsing step followed by an Ar blow dry. 30 μL of the formaldehyde dehydrogenase conjugate was deposited via pipette onto the glassy carbon surface with a 10 minute deposition wait period. Then, the glassy carbon surface with the deposited formaldehyde dehydrogenase conjugate was rinsed off with deionized water (18.2 MOhm) and loaded into a rotating disk electrode (RDE) tip and attached to a commercial RDE shaft. The RDE tip (with the formaldehyde dehydrogenase conjugate) was then immersed into a 3-electrode cell with a graphite rod counter electrode (CE) and a Ag/AgCl (3.4 M) reference electrode. The electrolyte (100 mM NaPi, 100 mM formate, pH 7) was degassed with Argon for 15 minutes and the reactor cell was heated to 25° C. prior to testing.

Figure 11:
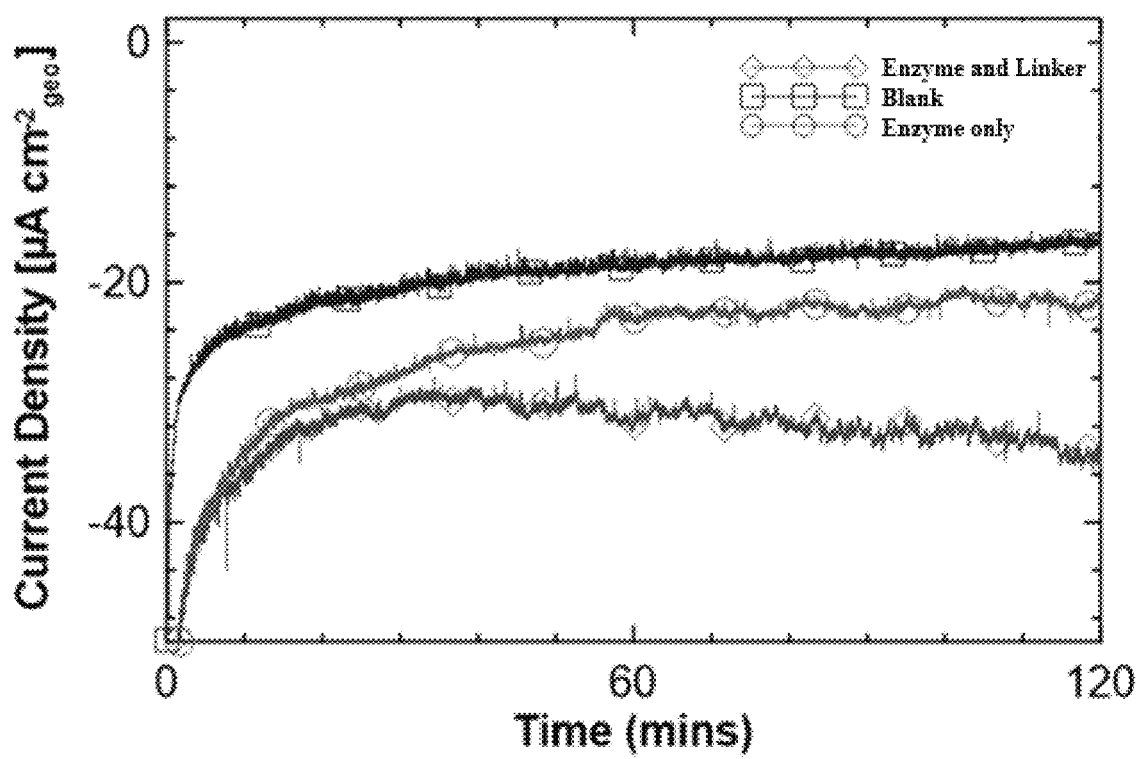
FIG. 11 shows electrochemical activity by a representative 120 minute chronoamperometric curves for the fully assembled enzyme to linker construct bound to the surface, the blank (MBP without formate in electrolyte), and enzyme only.
Figure 12:
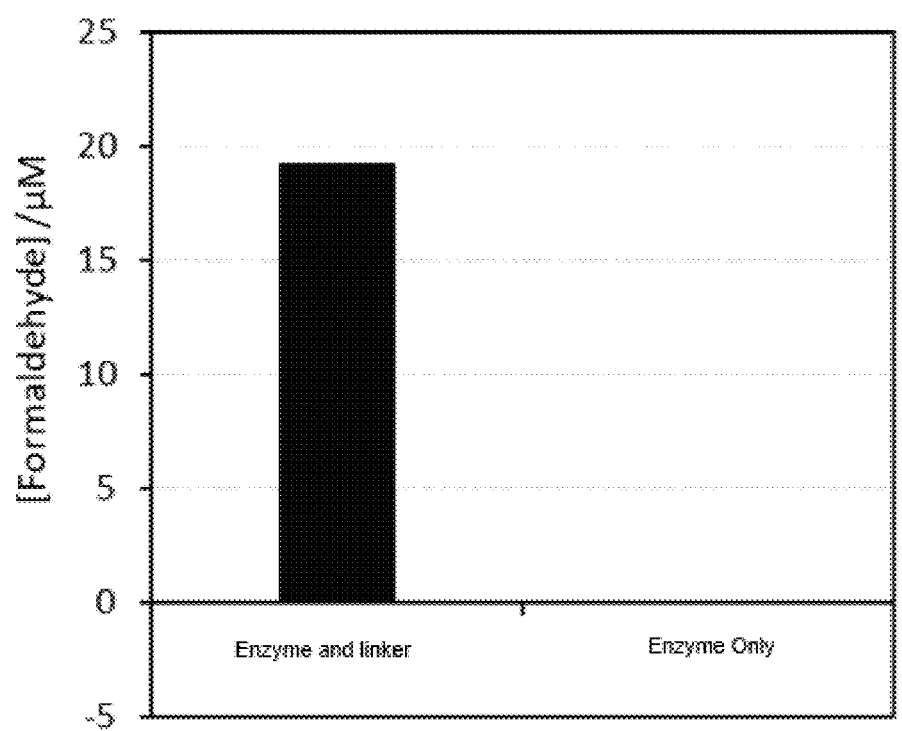
FIG. 12 shows activity of formaldehyde dehydrogenase showing the average concentration of formaldehyde after 2 hour chronoamperometry reactions for fully assembled enzyme construct to the surface (n=2) and just enzyme alone with no binding peptide (n=1).

The reactor cell was tested to confirm activity of the formaldehyde dehydrogenase conjugate. FIG. 11 specifically shows a representative 120 minute chronoamperometric curves for the fully assembled construct to the surface, the blank (MBP without formate in electrolyte), and enzyme only. The select chronoamperometric curves shown in FIG. 11 are a representation of the electrochemical activity and the relative rankings between the 3 samples. For a qualitative comparison, a lower curve for cathodic reactions indicates a higher production of product. In this case, the curve of the fully assembled construct to the surface is lowest, indicating enzymatic activity. FIG. 12 additionally confirms this, showing the average concentration of formaldehyde after 2 hour chronoamperometry reactions for fully assembled enzyme construct to the surface (n=2) and just enzyme alone with no binding peptide (n=1). The concentration of formaldehyde was determined by Nash's method.

Example 15: Enzymatic Reactor Cell Including Formaldehyde Dehydrogenase on Titanium Surface The assembly of an enzymatic reactor cell utilising a reactor cell with a titanium surface is described below. To assemble the construct on the surface, first a 21 mM solution of bis-MAL-dPEG$_3$ was freshly prepared in 100% dimethylsulfoxide (DMSO). A 1 mg/mL solution of a fusion protein compound of Ti MBP (SEQ ID NO. 50) and nanowire (SEQ ID NO. 51), i.e., SEQ ID NOs 50 and 51 were synthesised together as a continuous peptide by standard peptide synthesis protocol known in the art, was mixed with bis-MAL-dPEG$_3$ in a 1:5 molar ratio before being diluted to 300 μL with 10 mM sodium phosphate (NaPi), 150 mM sodium chloride (NaCl), pH 6.5. The reaction was stirred for 2 h40 m in the dark at room temperature. A PD-G10 column was pre-equilibrated with 10 mM NaPi, 150 mM NaCl, pH 6.5 according to the manufacturer's instructions. After the reaction was completed, it was buffer exchanged on the pre-equilibrated PD-G10 according to manufacturer's instructions.

The product from the pervious step was then added in a 5:1 molar ratio with formaldehyde dehydrogenase and diluted to 300 μL of 10 mM NaPi, 150 mM NaCl, pH 6.5. The reaction was stirred for 3 hours in the dark at room temperature. The reaction mixture was concentrated using a 10K centrifugal concentrator by being loaded with 500 μL of solution and being spun at 12000 RCF for 10 minutes. An Ellman's assay was performed using this concentrated solution as follows: 12.5 μL of sample was combined with 125 μL of 100 mM NaPi, 1 mM ethylenediaminetetraacetic acid (EDTA), pH 8, and 2.5 μL of 4 mg/mL Ellman's reagent; This solution was incubated at room temperature for 15 minutes; and the absorbance at 412 nm ($A_{412}$) was measured to determine the free thiol concentration.

Figure 13:
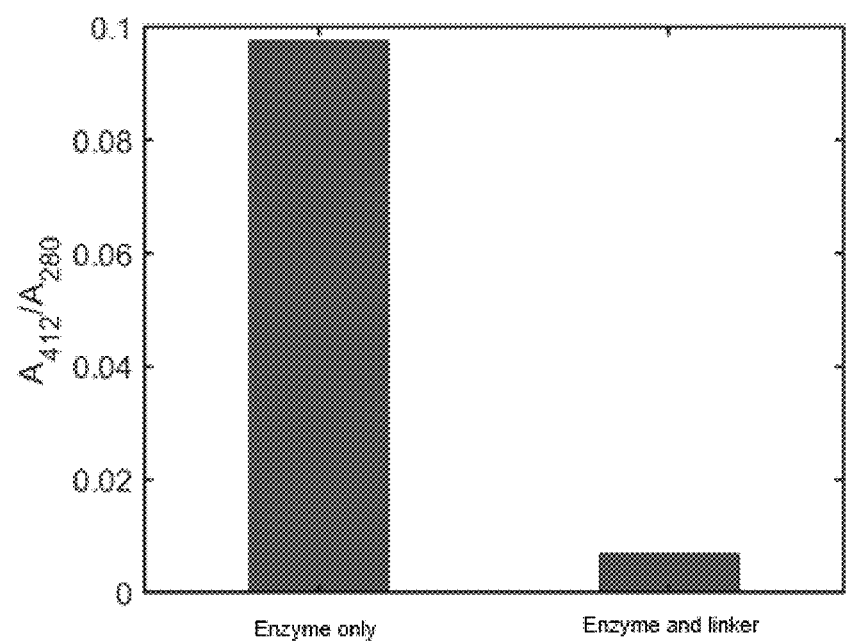
FIG. 13 shows successful conjugation of enzyme to produce TiMBP to the nanowire (fusion of SEQ ID NO: 50 to SEQ ID NO 51) and the enzyme formaldehyde dehydrogenase

The Ellman's assay measures the absorbance of a chemical species that is produced by the reaction of the Ellman's reagent with free sulfhydryls (cysteine residues). The more free sulfhydryls in the sample, the larger the absorbance value at 412 nm ($A_{412}$) will be. FIG. 13 suggests successful conjugation of enzyme to produce TiMBP to the nanowire (SEQ ID NOs: 50 and 51 fusion) and the enzyme formaldehyde dehydrogenase. This is represented by the decrease in the $A_{412}$ values that is seen as the cysteine residue of the enzyme formaldehyde dehydrogenase at residue 374 reacts with Ti MBP fusion protein.

The attachment of the conjugate to the Ti surface was performed similarly to the surface attachment as above in Example 14, but with the use of Ti surface disks.

Figure 14:
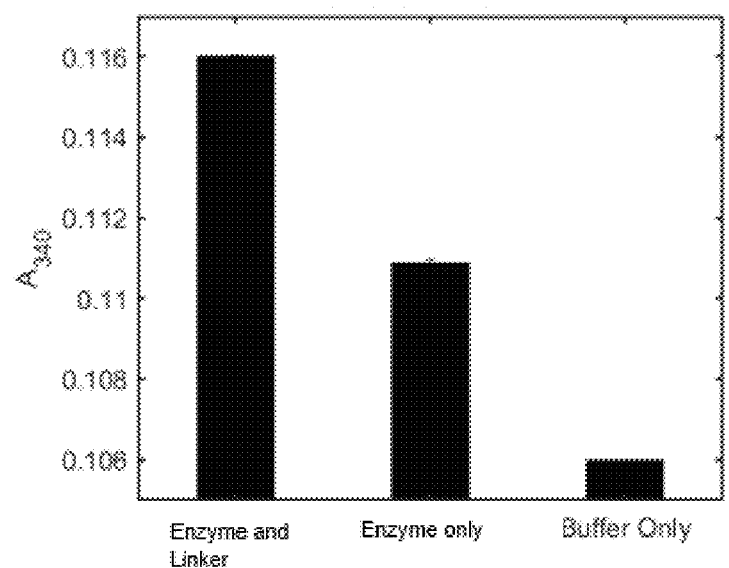
FIG. 14 shows an NADH consumption assay in a reactor cell with the enzyme formaldehyde dehydrogenase conjugate or non-conjugated enzyme.

Confirmation of the enzyme-linker conjugate binding to the titanium surface in the reactor cell was also confirmed. Specifically, the SEQ ID NO. 50-SEQ ID NO. 51-Enzyme conjugate and enzyme alone were separately deposited on titanium surfaces for 20 minutes at room temperature before being washed with $H_2O$. Buffer containing NAD+ and formaldehyde was then deposited to allow for the conversion of NAD+ to NADH over a 30 minute time period. The absorbance at 340 nm ($A_{340}$) can then be measured as a direct measure of NADH concentration, and thus, activity for the conversion of NAD+ to NADH. In FIG. 14, the concentration of NADH is higher for the enzyme conjugate than just enzyme alone, representing adhesion of the SEQ ID NO50-SEQ ID NO. 51-enzyme linker conjugate to the titanium surface. NADH formation can still be observed with enzyme only (compared to buffer only, where no reaction can occur) which is likely due to residual enzyme left behind between wash steps.

Figure 15:
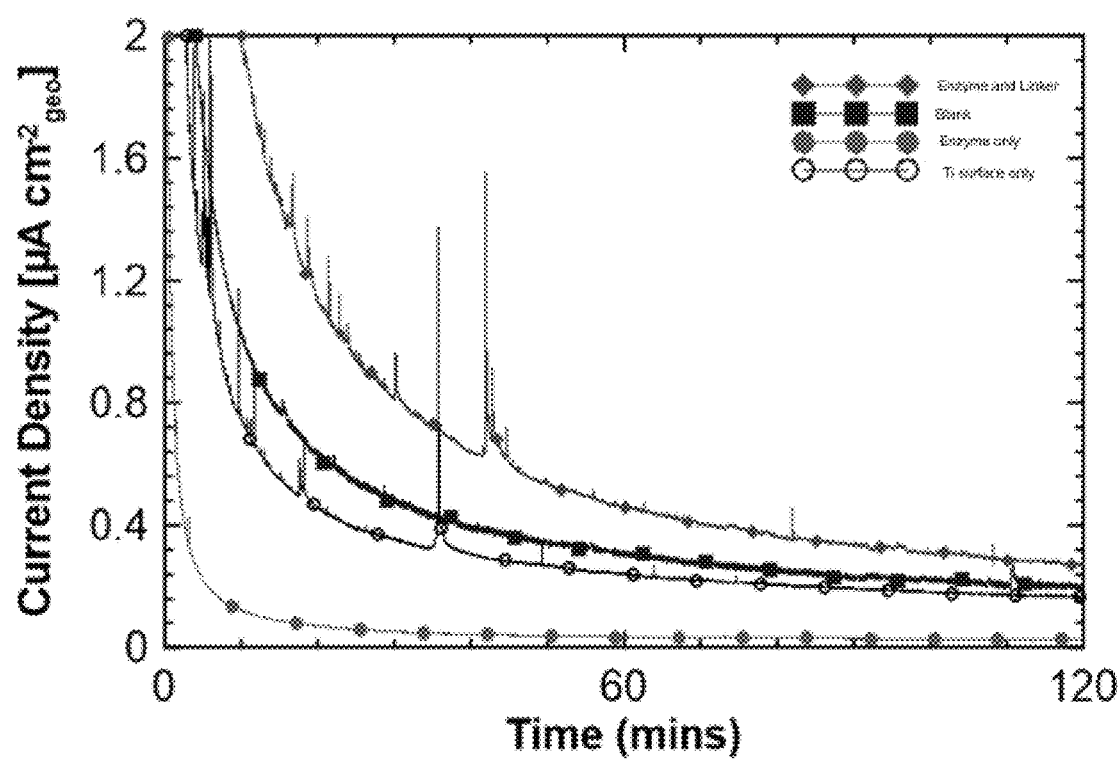
FIG. 15 shows current density vs time graphs that indicate electrochemical performance of the enzyme and linker (fully assembled bioconstruct on Ti surface) with the addition of formaldehyde; a blank where fully assembled bioconstruct on Ti surface was tested in formaldehyde-free buffer, enzyme only, and Ti disk only with nothing deposited on it.

The activity of the enzyme bound to the titanium surface was tested for current density. FIG. 15 shows current density vs time graphs that indicate electrochemical performance of the enzyme. Specifically, FIG. 15 shows 4 graphs of Raw anodic chronoamperometric (CA) plots for enzyme and linker (fully assembled bioconstruct on Ti surface) with the addition of formaldehyde; a blank where fully assembled bioconstruct on Ti surface was tested in formaldehyde-free buffer, enzyme only, and Ti disk only with nothing deposited on it.

Typically, the current in the last half of the experimental duration (in this case, from 60 to 120 minutes) is averaged and compared with other runs. The SEQ ID NO.50-SEQ ID NO. 51-Enzyme linker conjugate curve has roughly twice the current density compared to the blank and bare Ti disk surface only, and about 4× higher than enzyme only. The most important comparison is between the SEQ ID NO:50-SEQ ID NO:51-Enzyme linker conjugate and the blank curves as both have the same bioconstruct as the electrode of study but the former has formaldehyde reactant present and the latter does not.

Example 16: Enzymatic Reactor Cell Including Alcohol Dehydrogenase on Silica Coated Zinc Oxide Nanoparticles The assembly of an enzymatic reactor cell utilising a reactor cell with silica coated zinc oxide nanoparticles is described below. First, 126 mg of zinc oxide nanopowder (ZnO, <100 nm) was added to 10 mL of $H_2O$, 40 mL of 100% ethanol (EtOH), and 1.2 mL of concentrated ammonium hydroxide. This solution was sonicated for 1 hour. 430 µL of tetraethylorthosilicate (TEOS) was added dropwise and stirred at room temperature for 6 hours. The resulting solution was spun down at 6600 RCF for 15 minutes. The supernatant was removed from the centrifugation in step 4 and the remaining nanoparticles were washed 6 times with a 1:1 mixture of $H_2O$/EtOH. After each wash, the supernatant was removed and the nanoparticles resuspended in the washing solution. After the final centrifugation, the nanoparticles were left open to air and dried for 22 hours at 60° C. Infrared spectroscopy was performed on the dried nanoparticles. See FIG. 16.

Figure 16:
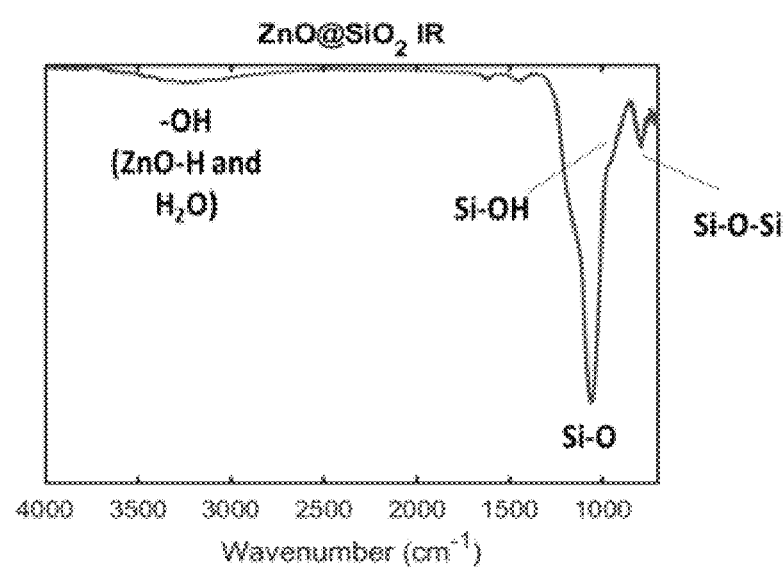
FIG. 16 shows infrared spectroscopy graph showing coating of ZnO nanoparticles with $SiO_2$.

FIG. 16 suggests successful coating of ZnO nanoparticles with $SiO_2$. Briefly, the values at ~3200 $cm^{-1}$ (ZnO—H and water), ~1100 $cm^{-1}$ (Si—O), ~950 $cm^{-1}$ (Si—OH), and ~800 $cm^{-1}$ (Si—O—Si) represent different vibrational stretches related to both Zn and Si. This result also was compared to the literature (Pham, et al. ACS Omega 2022, 7, 46).

The silicon MBP (SEQ ID NO. 20) to PEG linker was made as follows. A 10 mg/mL solution of MAL-dPEG$_2$-TFP was prepared in 100% dimethylformamide (DMF). A 1 mg/mL solution of peptide was prepared in 5% DMF, 50 mM sodium phosphate (NaPi), pH 7.5. A 1:1 mixture of MAL-dPEG$_2$-TFP and Si binding peptide (SEQ ID NO: 20) was made and 100% DMF was added to a final concentration of 10% in 300 µL. The reaction was stirred for 10 minutes in the dark at room temperature before being added to a pre-equilibrated PD-G10 column in 10 mM NaPi, 150 mM NaCl, pH 6.5 (as per manufacturer's instructions).

Figure 17:
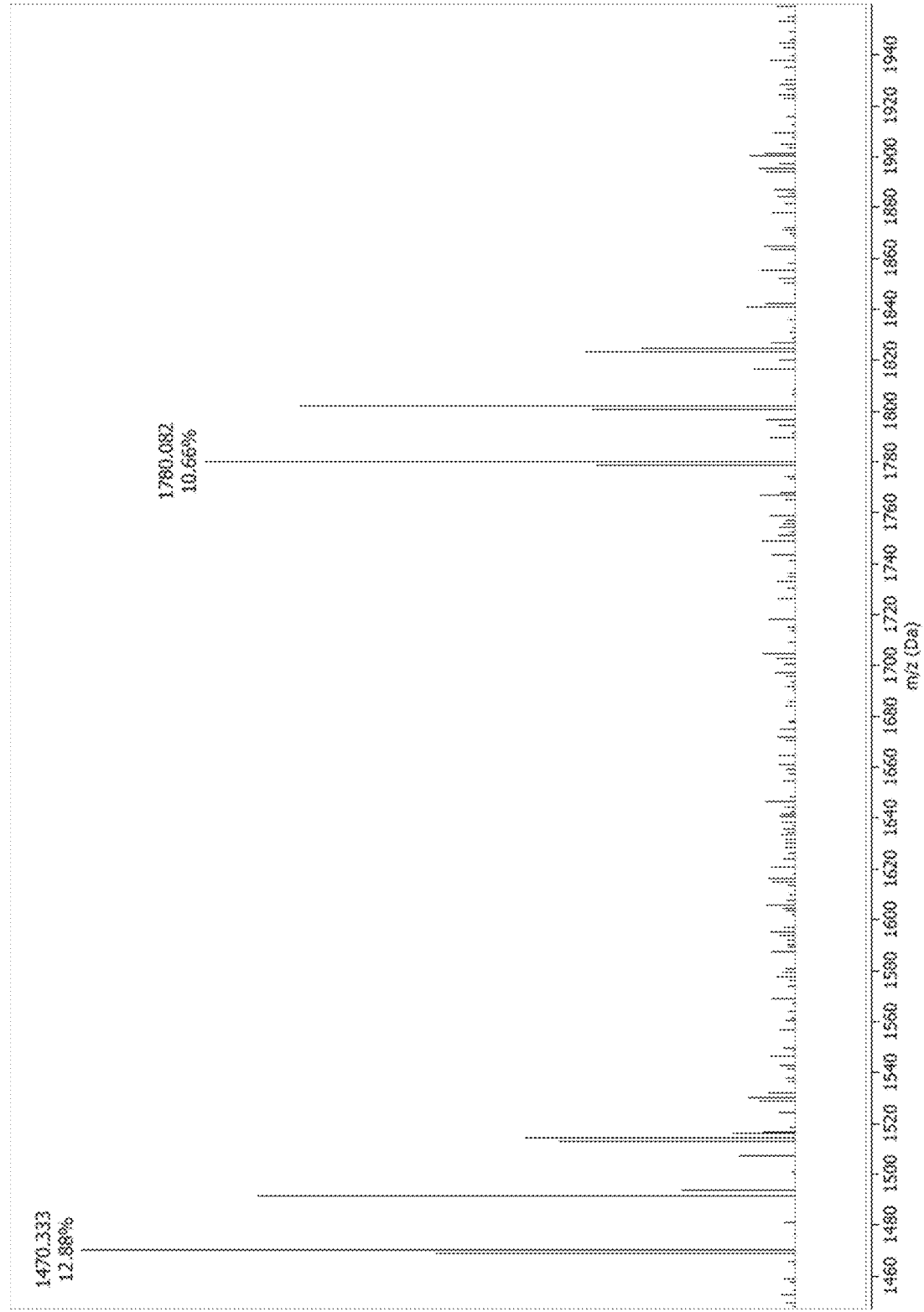
FIG. 17 shows mass spectrometry indicating conjugation of silicon MBP (SEQ ID NO. 20) to Pegylated TFP linker.

Mass spectrometry as shown in FIG. 17 confirms the creation of this construct. The values at 1470.333 Da and 1780.082 Da represent non- and mono-substituted products, respectively. It is important to note that further conjugation reactions lead to the removal of any unreacted material so the peak at 1470.333 Da is not a concern.

The Si MBP-TFP linker described above was additionally conjugated to the alcohol dehydrogenase as follows. A 1.5:1 molar ratio of enzyme to Si MBP-TFP linker was prepared in 10 mM NaPi, 150 mM NaCl, pH 6.5. Reaction was stirred for 3 h20 m in the dark at room temperature. Reaction mixture was concentrated in a 10K centrifugal concentrator at 10000 RCF with 3×450 µL washes of the same buffer. An Ellman's assay was performed using this concentrated solution as follows: 12.5 µL of sample was combined with 125 µL of 100 mM NaPi, 1 mM ethylenediaminetetraacetic acid (EDTA), pH 8, and 2.5 µL of 4 mg/mL Ellman's reagent; this solution was incubated at room temperature for 15 minutes; and the absorbance at 412 nm ($A_{412}$) was measured to determine the free thiol concentration.

Figure 18:
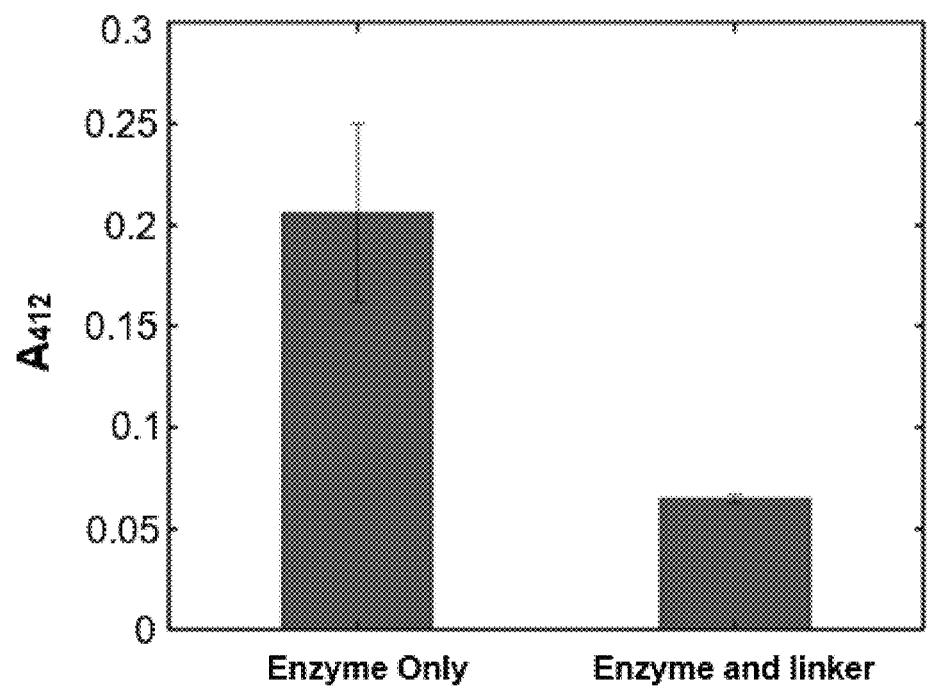
FIG. 18 shows absorbance spectrometry at 412 nm ($A_{412}$) indicating conjugation of silicon MBP linker to alcohol dehydrogenase.

In general, the Ellman's assay measures the absorbance of a chemical species that is produced by the reaction of the Ellman's reagent with free sulfhydryls (cysteine residues. The more free sulfhydryls in the sample, the larger the absorbance value at 412 nm ($A_{412}$) will be. FIG. 18 suggests successful conjugation of the Si MBP-TFP linker construct to alcohol dehydrogenase. This is represented by the decrease in the $A_{412}$ values that is seen as the cysteine residue at position 108 reacts with the linker. This is then compared to the $A_{412}$ of unreacted enzyme to show a difference in free vs. non-free sulfhydryls. It is important to note that a background of 0.05 is always seen in the $A_{412}$ and the decrease in absorbance above is representative of almost total biotinylation.

The linker enzyme construct was then adhered to the nanoparticles as follows. 102 mg of ZnO@SiO$_2$ was dispersed by sonication in 200 µL of 1× phosphate buffered saline (PBS) for 1 hour. 200 µL of 0.5 mg/mL Enzyme-linker conjugate was added and reacted at room temperature with 60 RPM shaking for 6 hours. A small portion of the 0.5 mg/mL solution was saved for absorbance measurements at 280 nm ($A_{280}$) to determine the pre-loading concentration of Enzyme-linker conjugate. The reaction mixture was spun down at 11000 RCF for 15 minutes and the supernatant was removed. The $A_{280}$ of the supernatant was measured to determine the post-loading concentration of Enzyme-linker conjugate Nanoparticle adherence was determined by measuring the concentration of enzyme in solution before and after loading to the nanoparticles. By observing a decrease in enzyme concentration, we can evaluate the loading efficiency and determine how much enzyme was loaded to the nanoparticles. This is best explained by there being less enzyme in solution after it was incubated with the solid support. The decrease in enzyme concentration of ~7.4 µM, suggests that ~7.4 µM of enzyme was loaded to the nanoparticles.

Figure 19:
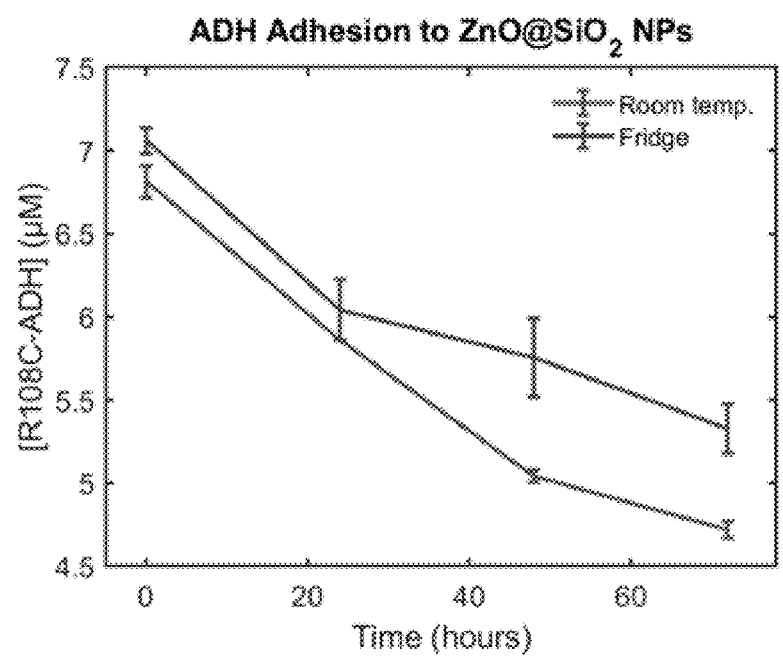
FIG. 19 shows a stability assay of enzyme conjugate to silicon nanoparticles.

Stability of the adherence of the enzyme conjugate to the nanoparticles was also performed. Specifically, adherence stability was evaluated by measuring the change in enzyme concentration on the nanoparticles over a 72 hour period. The enzyme concentration was measured at each time point and subtracted from the initial value. FIG. 19 suggests a loss of ~1 µM of enzyme from the solid support over every 24 hours, however, most enzyme loss is observed in the first 24 hours. A slight increase in adherence stability is also observed when enzyme-loaded Zno@SiO$_2$ are stored at 4° C. vs. room temperature.

Figure 20:
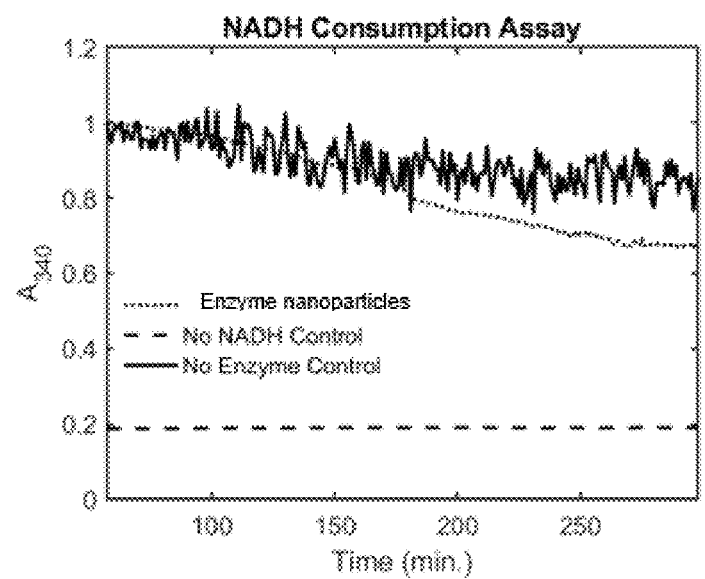
FIG. 20 shows an NADH consumption assay of enzyme conjugated nanoparticles and NADH, enzyme conjugated nanoparticles with no NADH, and no enzyme at all.

Activity of the enzyme conjugated nanoparticles was also tested. A solution of the enzyme conjugated nanoparticles were added directly to reaction buffers in a 96-well plate alongside control buffers. $A_{340}$ was measured immediately for 2 hours to detect NADH consumption. FIG. 20 shows a decrease in $A_{340}$ which represents the consumption of NADH. This figure shows the activity of enzyme linked nanoparticles in comparison to normal NADH degradation. Observed activity is low, however, it still out competes the normal degradation of NADH.

Figure 21:
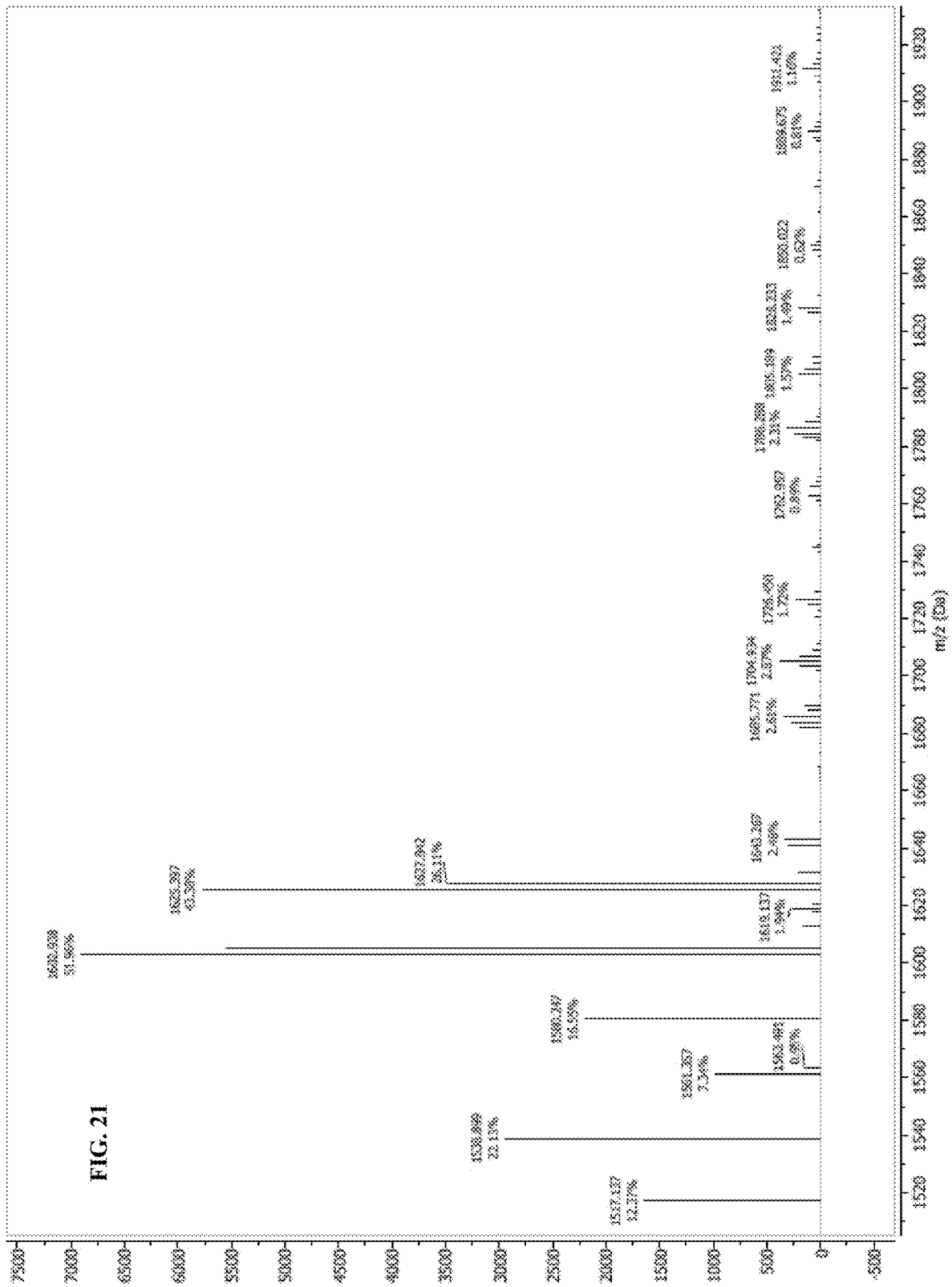
FIG. 21 illustrates by mass spectrometry the successful conjugation of graphite MBP (SEQ ID NO: 25) to a glutaraldehyde nanowire.

Example 17: Enzymatic Reactor Cell Including Formate Dehydrogenase on Carbon Surface The assembly of an enzymatic reactor cell utilising a reactor cell with a coated carbon surface is described below. The linker has been prepared by adding a graphite MBP (SEQ ID NO: 25) to a glutaraldehyde nanowire used for chemical linkage. Specifically, the graphite peptide and glutaraldehyde were added together and the Peptide-nanowire conjugate samples were desalted using a C18 Resin "ZipTip" following manufacturer directions. The resultant peptide solutions were evaporated on a plate using a sinapinic acid matrix. Spectra were collected on a Bruker microflex LT MALDI Biotyper mass spectrometer and analysis completed using MNova (MestreLab) software. FIG. 21 shows the successful conjugation of glutaraldehyde to SEQ ID NO. 25.

Figure 22:
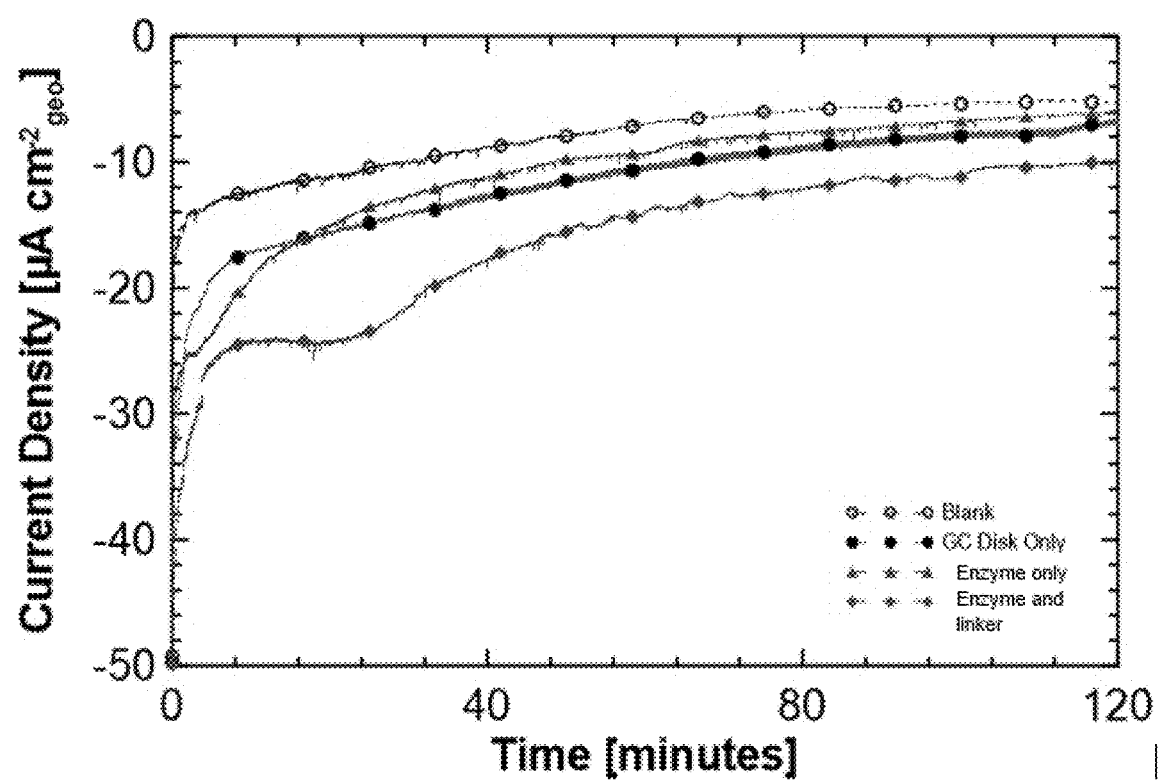
FIG. 22 illustrates current density of conjugated formate dehydrogenase absorbed to the glassy carbon disk surface in comparison to just enzyme or jus the glassy carbon disk.

Masses for unmodified peptide and the peptide conjugate are both observed (+84 Da) at 1517.050 Da and 1602.9 Da, respectively. The peptide conjugate was combined to the formate dehydrogenase by methods as described herein with glutaraldehyde linker chemistry, and subsequently the full conjugated enzyme-linker was adsorbed to the carbon surface. FIG. 22 shows a current density of blank (substrate free with the enzyme linker construct); glassy carbon disk only; enzyme only; and enzyme linker construct).

Activity of the enzyme on the carbon disks was also confirmed by testing for formate. Formate can be detected by monitoring the 1:1 conversion of formate to $CO_2$ by formate dehydrogenase which simultaneously uses NAD+ to produce NADH. By measuring the A340, which is a direct measure of NADH concentration, the concentration of formate that was consumed can be calculated.

Figure 23:
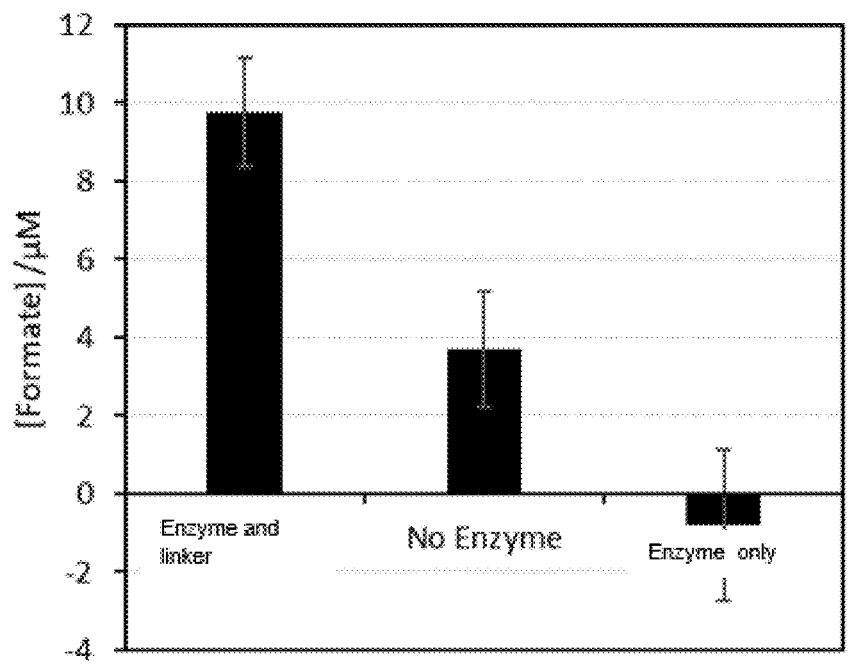
FIG. 23 shows the concentration of formate detected after 2 hour chronoamperometry reactions for enzyme-linker (n=3) and no enzyme (glassy carbon electrode alone) (n=3), and just enzyme with no linker (n=2).

Specifically, formate standards were prepared in 100 mM sodium bicarbonate, 100 mM Tris at 0.2, 0.1, 0.02, 0.01, and 0 mM. 200 mM Tris-HCl, pH 7.4 was prepared as an operating buffer. A 10 mg/mL stock of just formate dehydrogenase enzyme as a control was also prepared. A 3.6 mM NAD+, 164 mM Tris solution was prepared. 40 µL of analyte (formate standard or sample from 2 hour chronoamperometry), 5 µL of formate dehydrogenase, and 55 µL of the NAD+/Tris solution were combined and then the absorbance at 340 nm to measure the NADH formation. FIG. 23 shows the concentration of formate detected after 2 hour chronoamperometry reactions for enzyme-linker (n=3) and no enzyme (glassy carbon electrode alone) (n=3), and just enzyme with no linker (n=2). The concentration of formate was determined by the standard colorimetric assay (using formate dehydrogenase to consume formate and produce UV active NADH).

Example 18: Enzymatic Reactor Cell Including Alcohol Dehydrogenase on Cellulose Surface The assembly of an enzymatic reactor cell with alcohol dehydrogenase on a microcrystalline cellulose surface is described. Alcohol dehydrogenase in this example was a R108C mutant and is biotinylated. Specifically, a 10 mg/mL stock solution of biotin-maleimide was prepared in glacial acetic acid. The biotin maleimide was added to alcohol dehydrogenase in a 1:1 molar ratio and reacted in the dark at room temperature for 30 min. The reaction was then buffer exchanged into 10 mM sodium phosphate (NaPi), 150 mM sodium chloride (NaCl), pH 6.5. The linker was then assembled to the biotinylated enzyme. Specifically, A 1:4 mixture of C-Streptavidin cellulose binding protein fusion protein and the biotinylated enzyme were combined and allowed to incubate. The concentration of this solution was measured assuming complete conjugation. The cellulose binding protein linker linked to the enzyme by biotin-streptavidin binding was then adhered to the microcrystalline surface as follows. Specifically, 2 mg/mL solutions of just enzyme or enzyme with linker were prepared in 10 mM NaPi, 150 mM NaCl, pH 6.5. Tubes of 5 mg of 50 µm microcrystalline cellulose was resuspended in 1 mL of 10 mM NaPi, 150 mM NaCl, pH 6.5 as a pre-wash step.

Figure 24:
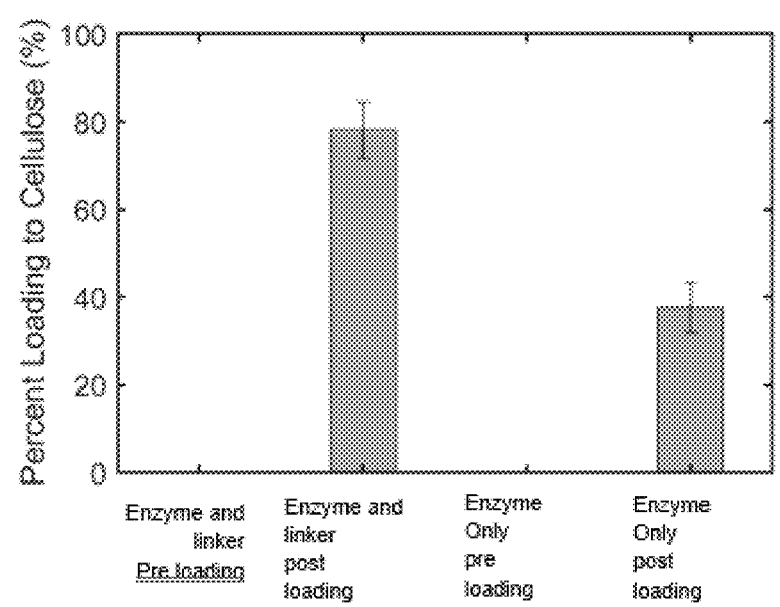
FIG. 24 shows the percent loading of conjugated alcohol dehydrogenase in comparison to just enzyme on cellulose surface.

The tubes of cellulose were then spun down at 18000 RCF for 10 min. The previous two steps were repeated twice. 200 µL of each sample were added to the cellulose and the binding reaction was carried out for 1 hour with 1200 rpm of shaking at room temp. The binding reactions were then spun down at 18000 RCF for 15 min. and supernatant was collected for $A_{280}$ measurements See FIG. 24. The last step was then repeated at 24, 48, and 144 hours for adhesion stability. Adherence to cellulose was determined by measuring the concentration of enzyme pre- and post-loading to cellulose and then converting it into a total percentage of enzyme that has been loaded onto the microcrystalline cellulose. FIG. 24 shows that approximately twice as much enzyme with linker over just enzyme loads to the cellulose suggesting the importance of the cellulose binding motif linker.

Figure 25:
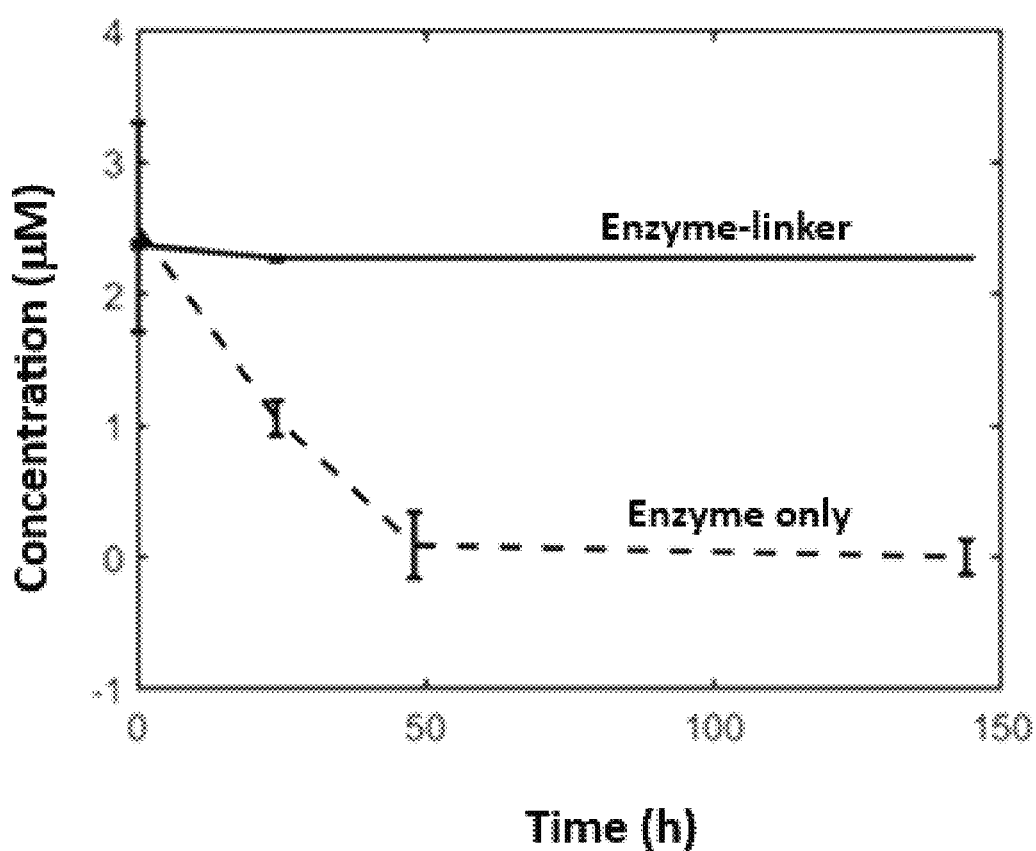
FIG. 25 shows the adhesion stability on the carbon surface of the enzyme conjugate or just enzyme.

Adhesion stability was also evaluated by measuring the change in enzyme concentration on microcrystalline cellulose over 144 hours. At each timepoint, the cellulose solution was centrifuged to pellet the cellulose and allow for the enzyme concentration to be measured in the remaining solution. FIG. 25 shows the change in concentration over time between enzyme with linker and enzyme only. We see that enzyme linker has a much higher adherence stability as almost all of the enzyme only construct has leached from the solution after 48 hours while the linker-enzyme construct remains loaded.

The activity of the enzyme adhered to the cellulose surface was also confirmed by an NADH consumption assay.

An In-Solution assay was first performed to confirm activity of the enzyme linker conjugate (FIG. 26). 90 µL of 20 mM NaPi, 10 mM formaldehyde, pH 6.5 was added to 10 µL of 2.5 mM NADH and 10 µL of 1.62 µM enzyme linker. $A_{340}$ values were collected over 20 min.

Figure 26:
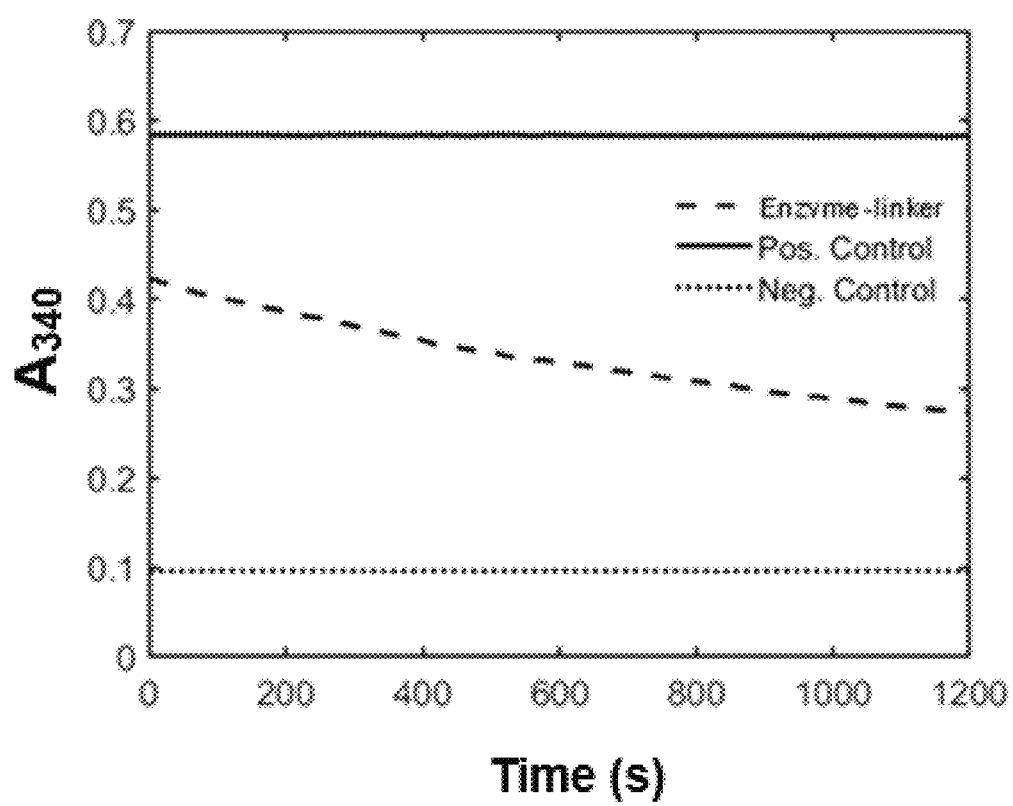
FIG. 26 shows $A_{340}$ values from in solution assay indicating activity of enzyme linker conjugate with NADH consumption, in comparison of controls with no NADH or no enzyme.

A positive control was prepared that contained NADH but no enzyme and a negative control was prepared that contained enzyme but no NADH. FIG. 26 confirms activity of the enzyme bound to the linker.

Figure 27:
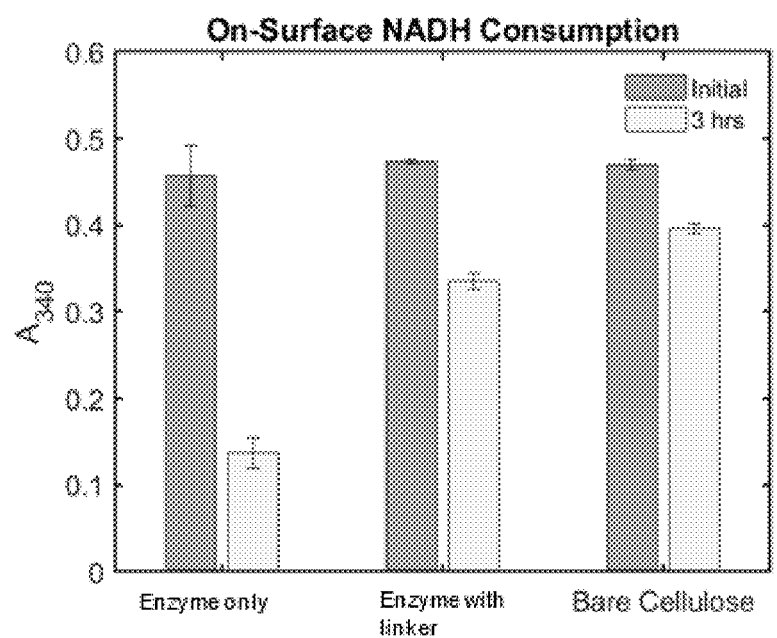
FIG. 27 shows on-surface NADH consumption assay comparing enzyme with linker, just enzyme with no linker, or just bare cellulose surface.

An On-Surface assay was then performed to confirm activity while bound to the cellulose surface. Tubes of 15 mg of 50 µm microcrystalline cellulose were resuspended in 1 mL of 10 mM NaPi, 150 mM NaCl, pH 6.5 as a pre-wash. Tubes were spun down at 18000 RCF for 10 min. This was repeated twice. 100 µL of enzyme with linker, just enzyme, or just buffer were added to the cellulose so that a 0.1 µM final concentration of enzyme could be achieved. The binding reactions were carried out for 1 hour with 1200 rpm of shaking at room temp. Tubes were then spun down at 18000 RCF for 15 min. and the supernatant was removed. The cellulose was then resuspended in 100 μL of 10 mM NaPi, 150 mM NaCl, pH 6.5 as a wash step. The tubes were spun down at 18000 RCF for 15 min. and the supernatant was removed. Solutions of 90 μL of 20 mM NaPi, 10 mM formaldehyde, pH 6.5, and 10 μL of 2.5 mM NADH were then prepared and the A340 was measured for the initial timepoint (t=0 hours). The solutions from the previous step were then added to the cellulose beads that had been loaded with enzyme with linker or just enzyme. Reactions were shaken at 1200 rpm at room temp. After 2 hours, tubes were removed from shaking and spun down at 18000 RCF for 15 min. Supernatants were removed and A340 measurements were taken. The previous three steps were then repeated for another timepoint to ensure activity stability (t=3 hours). FIG. 27 shows the NADH consumption assay results of the on-surface assay.

As in FIG. 26, a decrease in A340 is a direct measure of NADH consumption as it is converted to NAD+. FIG. 27 shows that over a period of 3 hours, the enzyme with linker is still showing some activity for NADH conversion. Just enzyme converts NADH to NAD+ much faster than the linked enzyme, but the major benefit is that linked enzyme remains adhered to the microcrystalline cellulose over a period of 144 hours vs. enzyme only which is no longer adhered after 48 hours.

While preferred embodiments have been described above and illustrated in the accompanying drawings, it will be evident to those skilled in the art that modifications may be made without departing from this disclosure. Such modifications are considered as possible variants comprised in the scope of the disclosure.

All publications, patents and patent applications, including any drawings and appendices therein are incorporated by reference in their entirety for all purposes to the same extent as if each individual publication, patent or patent application, drawing, or appendix was specifically and individually indicated to be incorporated by reference in its entirety for all purposes.

The invention claimed is:

1. An enzymatic reactor cell, comprising:
an electrode surface, a linker, and one or more enzymes, wherein the electrode surface is directly linked to the linker and the linker is further directly linked to one of the one or more enzymes, wherein the linker comprises a surface binding moiety (SBM) immobilized to the electrode surface and/or one of the one or more enzymes, and wherein the SBM comprises a material binding peptide (MBP) comprising a sequence selected from the group consisting of: (i) SEQ ID NO: 14, SEQ ID NO: 3, SEQ ID NO: 25, SEQ ID NO: 17, SEQ ID NO: 20, or SEQ ID NO: 50; (ii) sequences having at least 99% sequence identity to SEQ ID NO: 14; and (iii) sequences having at least 75% sequence identity to SEQ ID NO: 3, SEQ ID NO: 25, SEQ ID NO: 17, SEQ ID NO: 20, or SEQ ID NO: 50.

2. The enzymatic reactor cell of claim 1, wherein the enzymatic reactor cell has the following Formula II:

[electrode surface-surface linker-enzyme]$_{n(1-10)}$     (Formula II);

wherein when n is 2-10, each [electrode surface-surface linker-enzyme] comprises a different electrode surface, surface linker and/or enzyme from the other [electrode surface-surface linker-enzyme].

3. The enzymatic reactor cell of claim 1, wherein the electrode surface is a metal, a polymer, a biological surface and/or crystalline.

4. The enzymatic reactor cell of claim 3, wherein the electrode surface comprises graphite, graphene, glassy carbon, carbon paper, carbon felt, platinum, titanium, a metal oxide, cellulose, polystyrene, silica, gold, gold alloy, gold palladium alloy, or a combination thereof, wherein the metal oxide is zinc oxide, iron oxide, titanium oxide, or manganese oxide.

5. The enzymatic reactor cell of claim 4, wherein the electrode surface is planar, non-planar, spherical, in the shape of nanoparticles, disc-shaped, an aerogel, and/or fibrous.

6. The enzymatic reactor cell of claim 1, wherein the electrode surface is the anode and/or the cathode.

7. The enzymatic reactor cell of claim 1, wherein the linker comprises the SBM and a peptide, a protein, a chemical, a chemical polymer, a nanowire, or a polynucleotide.

8. The enzymatic reactor cell of claim 7, wherein the linker comprises a nanowire, and the nanowire is a chemical nanowire that (i) comprises glutaraldehyde, SMCC (Succinimidyl 4-(N-maleimidomethyl) cyclohexane-1-carboxylate), TFP-dPEG$_2$Mal, MBS (m-maleimido-benzoyl-N-hydroxysuccinimide ester), bis-MAL-dPEG$_3$, or a maleimide, or (ii) uses glutaraldehyde, SMCC (Succinimidyl 4-(N-maleimidomethyl) cyclohexane-1-carboxylate), TFP-dPEG$_2$Mal, MBS (m-maleimidobenzoyl-N-hydroxysuccinimide ester), bis-MAL-dPEG$_3$, or a maleimide for linking a) the SBM and/or one or more peptides, proteins, chemicals, chemical polymers, nanowires, or polynucleotides together, b) the linker to the electrode surface, and/or c) the linker to the enzyme.

9. The enzymatic reactor cell of claim 7, wherein the linker comprises a nanowire, and the nanowire is a single or double stranded DNA nanowire, wherein the single or double stranded DNA nanowire comprises a sequence selected from the group consisting of SEQ ID NOs: 86-89.

10. The enzymatic reactor cell of claim 7, wherein the linker comprises a peptide sequence comprising a sequence selected from the group consisting of SEQ ID NOs: 34-49, and 51.

11. The enzymatic reactor cell of claim 7, wherein the SBM is immobilized to a) the electrode surface, b) the peptide, protein, chemical, chemical polymer, nanowire, or polynucleotide, and/or (c) the enzyme by non-covalent bonding, covalent bonding, physisorption, and/or high affinity binding.

12. The enzymatic reactor cell of claim 1, wherein the MBP comprises SEQ ID NO: 25.

13. The enzymatic reactor cell of claim 1, wherein the enzymatic reactor cell comprises one enzyme and performs a single enzymatic reaction in said enzymatic reactor cell.

14. The enzymatic reactor cell of claim 1, wherein the enzymatic reactor cell comprises more than one enzyme and performs more than one enzymatic reaction in said enzymatic reactor cell.

15. The enzymatic reactor cell of claim 1, wherein the enzyme comprises a sequence selected from SEQ ID NOs: 80-85.

16. The enzymatic reactor cell of claim 1, wherein the enzymatic reactor cell comprises a wildtype or mutant form of formate dehydrogenase, formaldehyde dehydrogenase, and/or alcohol dehydrogenase.

17. The enzymatic reactor cell of claim 16, wherein the enzymatic reactor cell comprises a wildtype or mutant form of formate dehydrogenase.

18. The enzymatic reactor cell of claim 17, wherein the enzymatic reactor cell comprises a mutant form of formate dehydrogenase.

19. The enzymatic reactor cell of claim 1, wherein the enzymatic reactor cell further comprises one or more starting agents or substrates, and wherein the starting agent or substrate is carbon dioxide, formic acid, and/or formaldehyde.

20. The enzymatic reactor cell of claim 19, wherein the enzymatic reactor cell produces formate, formic acid, formaldehyde, and/or methanol.

21. The enzymatic reactor cell of claim 1, wherein the enzyme is an oxidoreductase enzyme.

22. The enzymatic reactor cell of claim 1, wherein the SBM is immobilized to the electrode surface and/or the enzyme by non-covalent bonding, covalent bonding, physisorption, and/or high affinity binding.

23. The enzymatic reactor cell of claim 22, wherein the SBM is covalently bonded by click chemistry, dithiol bond formation, Michael addition, nucleophilic substitution, a metal-sulfur bond linkage, or enzyme catalyzed conjugation.

24. The enzymatic reactor cell of claim 1, wherein the SBM is immobilized to the electrode surface by high affinity non-covalent binding.

25. The enzymatic reactor cell of claim 7, wherein the SBM is immobilized to (a) the electrode surface, (b) the peptide, protein, chemical, chemical polymer, nanowire, or polynucleotide, and/or (c) the enzyme.

26. The enzymatic reactor cell of claim 25, wherein the SBM is immobilized to the electrode surface by high affinity non-covalent binding.

27. The enzymatic reactor cell of claim 7, wherein the linker comprises streptavidin and/or a biotinylated peptide/protein for linkage to the SBM or linkage to the enzyme, wherein the enzyme is optionally biotinylated.

28. The enzymatic reactor cell of claim 11, wherein the SBM is covalently bonded by click chemistry, dithiol bond formation, Michael addition, nucleophilic substitution, a metal-sulfur bond linkage, or enzyme catalyzed conjugation.

29. The enzymatic reactor cell of claim 28, wherein the SBM is a continuous protein with (a) the peptide or protein the, (b) with the enzyme, or (c) with the peptide or protein and the enzyme.

30. An enzymatic reactor cell, comprising:
an electrode surface, a linker, and one or more enzymes, wherein the electrode surface is directly linked to the linker and the linker is further directly linked to one of the one or more enzymes, wherein the linker comprises:
i) a peptide, a protein, a chemical, a chemical polymer, a nanowire, or a polynucleotide that links a) one or more peptides, proteins, chemicals, chemical polymers, nanowires, or polynucleotides of the linker together, b) the linker to the electrode surface and/or c) the linker to the enzyme; and
ii) a peptide sequence of SEQ ID NO: 51.

31. A method of performing an enzymatic reaction or enzymatic pathway with the use of an enzymatic reactor cell of claim 1.

32. A method of performing an enzymatic reaction or enzymatic pathway with the use of a plurality of enzymatic reactor cells of claim 1.

\* \* \* \* \*

```
                      SEQUENCE LISTING

Sequence total quantity: 89
SEQ ID NO: 1           moltype = AA  length = 42
FEATURE                Location/Qualifiers
source                 1..42
                       mol_type = protein
                       organism = synthetic construct
SEQUENCE: 1
MHGKTQATSG TIQSMHGKTQ ATSGTIQSMH GKTQATSGTI QS                       42

SEQ ID NO: 2           moltype = AA  length = 98
FEATURE                Location/Qualifiers
source                 1..98
                       mol_type = protein
                       organism = synthetic construct
SEQUENCE: 2
MHGKTQATSG TIQSMHGKTQ ATSGTIQSMH GKTQATSGTI QSMHGKTQAT SGTIQSMHGK    60
TQATSGTIQS MHGKTQATSG TIQSMHGKTQ ATSGTIQS                            98

SEQ ID NO: 3           moltype = AA  length = 12
FEATURE                Location/Qualifiers
source                 1..12
                       mol_type = protein
                       organism = synthetic construct
SEQUENCE: 3
WAGAKRLVLR RE                                                        12

SEQ ID NO: 4           moltype = AA  length = 10
FEATURE                Location/Qualifiers
source                 1..10
                       mol_type = protein
                       organism = synthetic construct
SEQUENCE: 4
HFSSWETQQG                                                           10

SEQ ID NO: 5           moltype = AA  length = 10
FEATURE                Location/Qualifiers
source                 1..10
                       mol_type = protein
                       organism = synthetic construct
SEQUENCE: 5
WYEKWQKANW                                                           10

SEQ ID NO: 6           moltype = AA  length = 8
FEATURE                Location/Qualifiers
source                 1..8
                       mol_type = protein
                       organism = synthetic construct
SEQUENCE: 6
VSGSSPDS                                                             8

SEQ ID NO: 7           moltype = AA  length = 36
```

```
FEATURE                 Location/Qualifiers
source                  1..36
                        mol_type = protein
                        organism = synthetic construct
SEQUENCE: 7
SSKKSGSYSG SKGSRRILGG GGMHGKTQAT SGTIQS                                 36

SEQ ID NO: 8            moltype = AA   length = 30
FEATURE                 Location/Qualifiers
source                  1..30
                        mol_type = protein
                        organism = synthetic construct
SEQUENCE: 8
MSPHPHPRHH HTGGGGMHGK TQATSGTIQS                                        30

SEQ ID NO: 9            moltype = AA   length = 30
FEATURE                 Location/Qualifiers
source                  1..30
                        mol_type = protein
                        organism = synthetic construct
SEQUENCE: 9
RGRRRRLSCR LLGGGGMHGK TQATSGTIQS                                        30

SEQ ID NO: 10           moltype = AA   length = 30
FEATURE                 Location/Qualifiers
source                  1..30
                        mol_type = protein
                        organism = synthetic construct
SEQUENCE: 10
DSARGFKKPG KRGGGGMHGK TQATSGTIQS                                        30

SEQ ID NO: 11           moltype = AA   length = 30
FEATURE                 Location/Qualifiers
source                  1..30
                        mol_type = protein
                        organism = synthetic construct
SEQUENCE: 11
HPPMNASHPH MHGGGGMHGK TQATSGTIQS                                        30

SEQ ID NO: 12           moltype = AA   length = 30
FEATURE                 Location/Qualifiers
source                  1..30
                        mol_type = protein
                        organism = synthetic construct
SEQUENCE: 12
HKDHHANQHV HMGGGGMHGK TQATSGTIQS                                        30

SEQ ID NO: 13           moltype = AA   length = 16
FEATURE                 Location/Qualifiers
source                  1..16
                        mol_type = protein
                        organism = synthetic construct
SEQUENCE: 13
HPPMNASHPH MHGGGG                                                       16

SEQ ID NO: 14           moltype = AA   length = 108
FEATURE                 Location/Qualifiers
source                  1..108
                        mol_type = protein
                        organism = synthetic construct
SEQUENCE: 14
PTTGSCAVTY TANGWSGGFT AAVTLTNTGT TALSGWTLGF AFPSGQTLTQ GWSARWAQSG       60
SSVTATNEAW NAVLAPGASV EIGFSGTHTG TNTAPATFTV GGATCTTR                    108

SEQ ID NO: 15           moltype = AA   length = 108
FEATURE                 Location/Qualifiers
source                  1..108
                        mol_type = protein
                        organism = synthetic construct
SEQUENCE: 15
SGPAGCQVLW GVNQWNTGFT ANVTVKNTSS APVDGWTLTF SFPSGQQVTQ AWSSTVTQSG       60
SAVTVRNAPW NGSIPAGGTA QFGFNGSHTG TNAAPTAFSL NGTPCTVG                    108

SEQ ID NO: 16           moltype = AA   length = 12
FEATURE                 Location/Qualifiers
source                  1..12
                        mol_type = protein
                        organism = synthetic construct
SEQUENCE: 16
```

```
RAFIASRRIR RP                                                              12

SEQ ID NO: 17           moltype = AA  length = 8
FEATURE                 Location/Qualifiers
source                  1..8
                        mol_type = protein
                        organism = synthetic construct SEQUENCE: 17
RIIIRRIR                                                                    8

SEQ ID NO: 18           moltype = AA  length = 12
FEATURE                 Location/Qualifiers
source                  1..12
                        mol_type = protein
                        organism = synthetic construct SEQUENCE: 18
RGRRRRLSCR LL                                                              12

SEQ ID NO: 19           moltype = AA  length = 18
FEATURE                 Location/Qualifiers
source                  1..18
                        mol_type = protein
                        organism = synthetic construct SEQUENCE: 19
SSKKSGSYSG SKGSRRIL                                                        18

SEQ ID NO: 20           moltype = AA  length = 12
FEATURE                 Location/Qualifiers
source                  1..12
                        mol_type = protein
                        organism = synthetic construct SEQUENCE: 20
MSPHPHPRHH HT                                                              12

SEQ ID NO: 21           moltype = AA  length = 12
FEATURE                 Location/Qualifiers
source                  1..12
                        mol_type = protein
                        organism = synthetic construct SEQUENCE: 21
DSARGFKKPG KR                                                              12

SEQ ID NO: 22           moltype = AA  length = 12
FEATURE                 Location/Qualifiers
source                  1..12
                        mol_type = protein
                        organism = synthetic construct SEQUENCE: 22
HPPMNASHPH MH                                                              12

SEQ ID NO: 23           moltype = AA  length = 12
FEATURE                 Location/Qualifiers
source                  1..12
                        mol_type = protein
                        organism = synthetic construct SEQUENCE: 23
HKDHHANQHV HM                                                              12

SEQ ID NO: 24           moltype = AA  length = 12
FEATURE                 Location/Qualifiers
source                  1..12
                        mol_type = protein
                        organism = synthetic construct SEQUENCE: 24
NPSSLFRYLP SD                                                              12

SEQ ID NO: 25           moltype = AA  length = 12
FEATURE                 Location/Qualifiers
source                  1..12
                        mol_type = protein
                        organism = synthetic construct SEQUENCE: 25
HSSYWYAFNN KT                                                              12

SEQ ID NO: 26           moltype = AA  length = 12
FEATURE                 Location/Qualifiers
source                  1..12
                        mol_type = protein
                        organism = synthetic construct
```

```
SEQUENCE: 26
EAHVMHKVAP RP                                                           12

SEQ ID NO: 27           moltype = AA  length = 12
FEATURE                 Location/Qualifiers
source                  1..12
                        mol_type = protein
                        organism = synthetic construct
SEQUENCE: 27
HHGHSPTSPQ VR                                                           12

SEQ ID NO: 28           moltype = AA  length = 30
FEATURE                 Location/Qualifiers
source                  1..30
                        mol_type = protein
                        organism = synthetic construct
SEQUENCE: 28
MVMPGDNIKM VVTLIHPIAM DDGLRFAIRE                                        30

SEQ ID NO: 29           moltype = AA  length = 45
FEATURE                 Location/Qualifiers
source                  1..45
                        mol_type = protein
                        organism = synthetic construct
SEQUENCE: 29
VGPNNVPYIV ATITSNSAGG QPVSLANLKA MYSIAKKYDI PVVMD                       45

SEQ ID NO: 30           moltype = AA  length = 31
FEATURE                 Location/Qualifiers
source                  1..31
                        mol_type = protein
                        organism = synthetic construct
SEQUENCE: 30
NNSWTRVAFA GLKFQDVGSF DYGRNYGVVY D                                      31

SEQ ID NO: 31           moltype = AA  length = 120
FEATURE                 Location/Qualifiers
source                  1..120
                        mol_type = protein
                        organism = synthetic construct
SEQUENCE: 31
QVQLVESGAE VKKPGESLKI SCKGSGYSFP SYWINWVRQM PGKGLEWMGM IYPADSDTRY        60
SPSFQGHVTI SADKSINTAY LQWAGLKASD TAIYYCARLG IGGRYMSRWG QGTLVTVSSA        120

SEQ ID NO: 32           moltype = AA  length = 10
FEATURE                 Location/Qualifiers
source                  1..10
                        mol_type = protein
                        organism = synthetic construct
SEQUENCE: 32
LEYKRGYKPR                                                              10

SEQ ID NO: 33           moltype = AA  length = 20
FEATURE                 Location/Qualifiers
source                  1..20
                        mol_type = protein
                        organism = synthetic construct
SEQUENCE: 33
DYKDDDDKAY SSGAPPMPPF                                                   20

SEQ ID NO: 34           moltype = AA  length = 61
FEATURE                 Location/Qualifiers
source                  1..61
                        mol_type = protein
                        organism = synthetic construct
SEQUENCE: 34
FTLIELLIVV AIIGILAAIA IPQFSAYRVK AYNSAASSDL RNLKTALESA FADDQTYPPE        60
S                                                                       61

SEQ ID NO: 35           moltype = AA  length = 144
FEATURE                 Location/Qualifiers
source                  1..144
                        mol_type = protein
                        organism = synthetic construct
SEQUENCE: 35
FTLIELMIVV AIIGILAAIA IPQYQNYVAR SEGASALASV NPLKTTVEEA LSRGWSVKSG        60
TGTEDATKKE VPLGVAADAN KLGTIALKPD PADGTADITL TFTMGGAGPK NKGKIITLTR        120
TAADGLWKCT SDQDEQFIPK GCSR                                              144
```

```
SEQ ID NO: 36              moltype = AA  length = 167
FEATURE                    Location/Qualifiers
source                     1..167
                           mol_type = protein
                           organism = synthetic construct
SEQUENCE: 36
MASNFKFKLL SQLKKRAEGG FTLIELLVVV IIIGVLAAIA LPNLLGQVGK ARESEAKSTI   60
GALNRAQQGY FTEKGTFATD TETLEVPAPD GNFFSFAVNT ADNTEAIQDA TALNWEADGT  120
RSMSGGTFYD SGTRAFSTVV CRAEAGSEDT PPTPGGANDC GGAEVIK                167

SEQ ID NO: 37              moltype = AA  length = 28
FEATURE                    Location/Qualifiers
source                     1..28
                           mol_type = protein
                           organism = synthetic construct
SEQUENCE: 37
ELKAIAQEFK AIAKEFAIAF EFKAIAQK                                      28

SEQ ID NO: 38              moltype = AA  length = 7
FEATURE                    Location/Qualifiers
source                     1..7
                           mol_type = protein
                           organism = synthetic construct
SEQUENCE: 38
YYACAYY                                                              7

SEQ ID NO: 39              moltype = AA  length = 7
FEATURE                    Location/Qualifiers
source                     1..7
                           mol_type = protein
                           organism = synthetic construct
SEQUENCE: 39
GNNQQNY                                                              7

SEQ ID NO: 40              moltype = AA  length = 9
FEATURE                    Location/Qualifiers
source                     1..9
                           mol_type = protein
                           organism = synthetic construct
SEQUENCE: 40
KVQIINKKL                                                            9

SEQ ID NO: 41              moltype = AA  length = 5
FEATURE                    Location/Qualifiers
source                     1..5
                           mol_type = protein
                           organism = synthetic construct
SEQUENCE: 41
VGGLG                                                                5

SEQ ID NO: 42              moltype = AA  length = 8
FEATURE                    Location/Qualifiers
source                     1..8
                           mol_type = protein
                           organism = synthetic construct
SEQUENCE: 42
VGGLGHHH                                                             8

SEQ ID NO: 43              moltype = AA  length = 8
FEATURE                    Location/Qualifiers
source                     1..8
                           mol_type = protein
                           organism = synthetic construct
SEQUENCE: 43
VGGLGWWW                                                             8

SEQ ID NO: 44              moltype = AA  length = 8
FEATURE                    Location/Qualifiers
source                     1..8
                           mol_type = protein
                           organism = synthetic construct
SEQUENCE: 44
VGGLGYYY                                                             8

SEQ ID NO: 45              moltype = AA  length = 7
FEATURE                    Location/Qualifiers
source                     1..7
                           mol_type = protein
                           organism = synthetic construct
```

```
SEQUENCE: 45
VGGLFFF                                                                                    7

SEQ ID NO: 46           moltype = AA   length = 10
FEATURE                 Location/Qualifiers
source                  1..10
                        mol_type = protein
                        organism = synthetic construct
SEQUENCE: 46
SVNVTQVGFP                                                                                 10

SEQ ID NO: 47           moltype = AA   length = 13
FEATURE                 Location/Qualifiers
source                  1..13
                        mol_type = protein
                        organism = synthetic construct
SEQUENCE: 47
SVNVTQVGFP HHH                                                                             13

SEQ ID NO: 48           moltype = AA   length = 13
FEATURE                 Location/Qualifiers
source                  1..13
                        mol_type = protein
                        organism = synthetic construct
SEQUENCE: 48
SVNVTQVGFP WWW                                                                             13

SEQ ID NO: 49           moltype = AA   length = 13
FEATURE                 Location/Qualifiers
source                  1..13
                        mol_type = protein
                        organism = synthetic construct
SEQUENCE: 49
SVNVTQVGFP YYY                                                                             13

SEQ ID NO: 50           moltype = AA   length = 6
FEATURE                 Location/Qualifiers
source                  1..6
                        mol_type = protein
                        organism = synthetic construct
SEQUENCE: 50
RKLPDA                                                                                     6

SEQ ID NO: 51           moltype = AA   length = 9
FEATURE                 Location/Qualifiers
source                  1..9
                        mol_type = protein
                        organism = synthetic construct
SEQUENCE: 51
PPPYPPPWC                                                                                  9

SEQ ID NO: 52           moltype =      length =
SEQUENCE: 52
000

SEQ ID NO: 53           moltype =      length =
SEQUENCE: 53
000

SEQ ID NO: 54           moltype = AA   length = 7
FEATURE                 Location/Qualifiers
source                  1..7
                        mol_type = protein
                        organism = synthetic construct
SEQUENCE: 54
EPLQLKM                                                                                    7

SEQ ID NO: 55           moltype = AA   length = 12
FEATURE                 Location/Qualifiers
source                  1..12
                        mol_type = protein
                        organism = synthetic construct
SEQUENCE: 55
GAMHLPWHMG TL                                                                              12

SEQ ID NO: 56           moltype = AA   length = 12
FEATURE                 Location/Qualifiers
source                  1..12
                        mol_type = protein
```

```
SEQUENCE: 56
IMVTASSAYR RY                                                       12

SEQ ID NO: 57           moltype = AA   length = 16
FEATURE                 Location/Qualifiers
source                  1..16
                        mol_type = protein
                        organism = synthetic construct
SEQUENCE: 57
VIAGASLWWS EKLVIA                                                   16

SEQ ID NO: 58           moltype = AA   length = 13
FEATURE                 Location/Qualifiers
source                  1..13
                        mol_type = protein
                        organism = synthetic construct
SEQUENCE: 58
CALNNDEVDK FAM                                                      13

SEQ ID NO: 59           moltype = AA   length = 13
FEATURE                 Location/Qualifiers
source                  1..13
                        mol_type = protein
                        organism = synthetic construct
SEQUENCE: 59
KKNYSSSISS IHC                                                      13

SEQ ID NO: 60           moltype = AA   length = 15
FEATURE                 Location/Qualifiers
source                  1..15
                        mol_type = protein
                        organism = synthetic construct
SEQUENCE: 60
CGGHSSKLQF WYFWY                                                    15

SEQ ID NO: 61           moltype = AA   length = 12
FEATURE                 Location/Qualifiers
source                  1..12
                        mol_type = protein
                        organism = synthetic construct
SEQUENCE: 61
HWSAWWIRSN QS                                                       12

SEQ ID NO: 62           moltype = AA   length = 12
FEATURE                 Location/Qualifiers
source                  1..12
                        mol_type = protein
                        organism = synthetic construct
SEQUENCE: 62
IMVTESSDYS SY                                                       12

SEQ ID NO: 63           moltype = AA   length = 12
FEATURE                 Location/Qualifiers
source                  1..12
                        mol_type = protein
                        organism = synthetic construct
SEQUENCE: 63
IMVTASSAYD DY                                                       12

SEQ ID NO: 64           moltype = AA   length = 12
FEATURE                 Location/Qualifiers
source                  1..12
                        mol_type = protein
                        organism = synthetic construct
SEQUENCE: 64
IMVTQSSNYS SY                                                       12

SEQ ID NO: 65           moltype = AA   length = 12
FEATURE                 Location/Qualifiers
source                  1..12
                        mol_type = protein
                        organism = synthetic construct
SEQUENCE: 65
IMVTKSSDYS SY                                                       12

SEQ ID NO: 66           moltype = AA   length = 12
FEATURE                 Location/Qualifiers
source                  1..12
```

```
                            mol_type = protein
                            organism = synthetic construct
SEQUENCE: 66
HSSAAAAFNN KT                                                               12

SEQ ID NO: 67               moltype = AA   length = 12
FEATURE                     Location/Qualifiers
source                      1..12
                            mol_type = protein
                            organism = synthetic construct
SEQUENCE: 67
HTSYWYAFNT KT                                                               12

SEQ ID NO: 68               moltype = AA   length = 12
FEATURE                     Location/Qualifiers
source                      1..12
                            mol_type = protein
                            organism = synthetic construct
SEQUENCE: 68
YTTHVLPFAP SS                                                               12

SEQ ID NO: 69               moltype = AA   length = 11
FEATURE                     Location/Qualifiers
source                      1..11
                            mol_type = protein
                            organism = synthetic construct
SEQUENCE: 69
HAWVDWIRPI H                                                                11

SEQ ID NO: 70               moltype = AA   length = 12
FEATURE                     Location/Qualifiers
source                      1..12
                            mol_type = protein
                            organism = synthetic construct
SEQUENCE: 70
HWKHPWGAWD TL                                                               12

SEQ ID NO: 71               moltype = AA   length = 7
FEATURE                     Location/Qualifiers
source                      1..7
                            mol_type = protein
                            organism = synthetic construct
SEQUENCE: 71
QQQLSTH                                                                      7

SEQ ID NO: 72               moltype = AA   length = 18
FEATURE                     Location/Qualifiers
source                      1..18
                            mol_type = protein
                            organism = synthetic construct
SEQUENCE: 72
GGPDSARGFK KPGKRGPC                                                         18

SEQ ID NO: 73               moltype = AA   length = 15
FEATURE                     Location/Qualifiers
source                      1..15
                            mol_type = protein
                            organism = synthetic construct
SEQUENCE: 73
GGGMHPNAGH GSLMR                                                            15

SEQ ID NO: 74               moltype = AA   length = 36
FEATURE                     Location/Qualifiers
source                      1..36
                            mol_type = protein
                            organism = synthetic construct
SEQUENCE: 74
TPQSHYGQCG GGYSGPTVCA SGTTCQVLNP YYSQCL                                     36

SEQ ID NO: 75               moltype = AA   length = 157
FEATURE                     Location/Qualifiers
source                      1..157
                            mol_type = protein
                            organism = synthetic construct
SEQUENCE: 75
GVVSVQFNNG SSPASSNSIY ARFKVTNTSG SPINLADLKL RYYYTQDADK PLTFWCDHAG           60
YMSGSNYIDA TSKVTGSFKA VSPAVTNADH YLEVALNSDA GSLPAGGSIE IQTRFARNDW          120
SNFDQSNDWS YTAAGSYMDW QKISAFVGGT LAYGSTP                                  157
```

```
SEQ ID NO: 76              moltype = AA   length = 12
FEATURE                    Location/Qualifiers
source                     1..12
                           mol_type = protein
                           organism = synthetic construct
SEQUENCE: 76
QPYLFATDSL IK                                                           12

SEQ ID NO: 77              moltype = AA   length = 12
FEATURE                    Location/Qualifiers
source                     1..12
                           mol_type = protein
                           organism = synthetic construct
SEQUENCE: 77
GHTHYHAVRT QT                                                           12

SEQ ID NO: 78              moltype = AA   length = 9
FEATURE                    Location/Qualifiers
source                     1..9
                           mol_type = protein
                           organism = synthetic construct
SEQUENCE: 78
RLLLRRLRR                                                                9

SEQ ID NO: 79              moltype = AA   length = 13
FEATURE                    Location/Qualifiers
source                     1..13
                           mol_type = protein
                           organism = synthetic construct
SEQUENCE: 79
KRAFIASRRI RRP                                                          13

SEQ ID NO: 80              moltype = AA   length = 411
FEATURE                    Location/Qualifiers
source                     1..411
                           mol_type = protein
                           organism = synthetic construct
SEQUENCE: 80
MHHHHHHENL YFQSGNRGVV YLGSGKVEVQ KIDYPKMQDP RGKKIEHGVI LKVVSTNICG        60
SDQHMVRGRT TAQVGLVLGH EITGEVIEKG RDVENLQIGD LVSVPFNVAC GRCRSCKEMH       120
TGVCLTVNPA RAGGAYGYVD MGDWTGGQAE YVLVPYADFN LLKLPDRDKA MEKIRDLTCL       180
SDILPTGYHG AVTAGVGPGS TVYVAGAGPV GLAAAASARL LGAAVIVGD LNPARLAHAK        240
AQGFEIADLS LDTPLHEQIA ALLGEPEVDC AVDAVGFEAR GHGHEGAKHE APATVLNSLM       300
QVTRVAGKIG IPGLYVTEDP GAVDAAAKIG SLSIRFGLGW AKSHSFHTGQ TPVMKYNRAL       360
MQAIMWDRIN IAEVVGVQVI SLDDAPCGYG EFDAGVPKKF VIDPHKTFSA A                411

SEQ ID NO: 81              moltype = AA   length = 350
FEATURE                    Location/Qualifiers
source                     1..350
                           mol_type = protein
                           organism = synthetic construct
SEQUENCE: 81
MHHHHHHENL YFQMKAAVVE QFKKPLQVKE VEKPKISYGE VLVRIKACGV CHTDLHAAHG        60
DWPVKPKLPL IPGHEGVGVI EEVGPGVTHL KVGDRVGIPW LYSACGHCDY CLSGQETLCE       120
CQQNAGYSVD GGYAEYCRAA ADYVVKIPDN LSFEEAAPIF CAGVTTYKAL KVTGAKPGEW       180
VAIYGIGGLG HVAVQYAKAM GLNVVAVDLG DEKLELAKQL GADLVVNPKH DDAAQWIKEK       240
VGGVHATVVT AVSKAAFESA YKSIRRGGAC VLVGLPPEEI PIPIFDTVLN GVKIIGSIVG       300
TRKDLQEALQ FAAEGKVKTI VEVQPLENIN DVFDRMLKGQ INGRVVLKVD                  350

SEQ ID NO: 82              moltype = AA   length = 377
FEATURE                    Location/Qualifiers
source                     1..377
                           mol_type = protein
                           organism = synthetic construct
SEQUENCE: 82
MHHHHHHENL YFQMKIVLVL YDAGKHAADE EKLYGCTENK LGIANWLKDQ GHELITTSDK        60
EGGNSVLDQH IPDADIIITT PFHPAYITKE RIDKAKKLKL VVVAGVGSDH IDLDYINQTG       120
KKISVLEVTG SNVVSAEHV LMTMLVLVRN FVPAHEQIIN HDWEVAAIAK DAYDIEGKTI        180
ATIGAGRIGY RVLERLVPFN PKELLYYDYQ ALPKDEEKV GARRVENIEE LVAQADIVTI        240
NAPLHAGTKG LINKELLSKF KKGAWLVNTA RGAICVAEDV AAALESGQLR GYGGDVWFPQ       300
PAPKDHPWRD MRNKYGAGNA MTPHYSGTTL DAQTRYAEGT KNILESFFTG KFDYRPQDII       360
LLNGEYITKA YGKHDKK                                                     377

SEQ ID NO: 83              moltype = AA   length = 399
FEATURE                    Location/Qualifiers
source                     1..399
                           mol_type = protein
                           organism = synthetic construct
SEQUENCE: 83
```

```
MSGNRGVVYL GSGKVEVQKI DYPKMQDPRG KKIEHGVILK VVSTNICGSD QHMVRGRTTA    60
QVGLVLGHEI TGEVIEKGRD VENLQIGDLV SVPFNVACGR CRSCKEMHTG VCLTVNPARA   120
GGAYGYVDMG DWTGGQAEYV LVPYADFNLL KLPDRDKAME KIRDLTCLSD ILPTGYHGAV   180
TAGVGPGSTV YVAGAGPVGL AAAASARLLG AAVVIVGDLN PARLAHAKAQ GFEIADLSLD   240
TPLHEQIAAL LGEPEVDCAV DAVGFEARGH GHEGAKHEAP ATVLNSLMQV TRVAGKIGIP   300
GLYVTEDPGA VDAAAKIGSL SIRFGLGWAK SHSFHTGQTP VMKYNRALMQ AIMWDRINIA   360
EVVGVQVISL DDAPCGYGEF DAGVPKKFVI DPHKTFSAA                         399

SEQ ID NO: 84           moltype = AA   length = 337
FEATURE                 Location/Qualifiers
source                  1..337
                        mol_type = protein
                        organism = synthetic construct
SEQUENCE: 84
MKAAVVEQFK KPLQVKEVEK PKISYGEVLV RIKACGVCHT DLHAAHGDWP VKPKLPLIPG    60
HEGVGVIEEV GPGVTHLKVG DRVGIPWLYS ACGHCDYCLS GQETLCECQQ NAGYSVDGGY   120
AEYCRAAADY VVKIPDNLSF EEAAPIFCAG VTTYKALKVT GAKPGEWVAI YGIGGLGHVA   180
VQYAKAMGLN VVAVDLGDEK LELAKQLGAD LVVNPKHDDA AQWIKEKVGG VHATVVTAVS   240
KAAFESAYKS IRRGGACVLV GLPPEEIPIP IFDTVLNGVK IIGSIVGTRK DLQEALQFAA   300
EGKVKTIEV QPLENINDVF DRMLKGQING RVVLKVD                            337

SEQ ID NO: 85           moltype = AA   length = 364
FEATURE                 Location/Qualifiers
source                  1..364
                        mol_type = protein
                        organism = synthetic construct
SEQUENCE: 85
MKIVLVLYDA GKHAADEEKL YGCTENKLGI ANWLKDQGHE LITTSDKEGG NSVLDQHIPD    60
ADIIITTPFH PAYITKERID KAKKLKLVVV AGVGSDHIDL DYINQTGKKI SVLEVTGSNV   120
VSVAEHVLMT MLVLVRNFVP AHEQIINHDW EVAAIAKDAY DIEGKTIATI GAGRIGYRVL   180
ERLVPFNPKE LLYYDYQALP KDAEEKVGAR RVENIEELVA QADIVTINAP LHAGTKGLIN   240
KELLSKFKKG AWLVNTARGA ICVAEDVAAA LESGQLRGYG GDVWFPQPAP KDHPWRDMRN   300
KYGAGNAMTP HYSGTTLDAQ TRYAEGTKNI LESFFTGKFD YRPQDIILLN GEYITKAYGK   360
HDKK                                                               364

SEQ ID NO: 86           moltype = DNA   length = 13
FEATURE                 Location/Qualifiers
source                  1..13
                        mol_type = other DNA
                        organism = synthetic construct
SEQUENCE: 86
gcaactaggc tcg                                                      13

SEQ ID NO: 87           moltype = DNA   length = 13
FEATURE                 Location/Qualifiers
source                  1..13
                        mol_type = other DNA
                        organism = synthetic construct
SEQUENCE: 87
cgagcctagt tgc                                                      13

SEQ ID NO: 88           moltype = DNA   length = 22
FEATURE                 Location/Qualifiers
source                  1..22
                        mol_type = other DNA
                        organism = synthetic construct
SEQUENCE: 88
gcacctgaac cgcatggact cg                                            22

SEQ ID NO: 89           moltype = DNA   length = 22
FEATURE                 Location/Qualifiers
source                  1..22
                        mol_type = other DNA
                        organism = synthetic construct
SEQUENCE: 89
cgagtccatg cggttcaggt gc                                            22
```